(12) United States Patent
Miyake

(10) Patent No.: US 9,269,315 B2
(45) Date of Patent: Feb. 23, 2016

(54) DRIVING METHOD OF SEMICONDUCTOR DEVICE

(71) Applicant: Semiconductor Energy Laboratory Co., Ltd., Atsugi-shi, Kanagawa-ken (JP)

(72) Inventor: Hiroyuki Miyake, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 137 days.

(21) Appl. No.: 14/196,368

(22) Filed: Mar. 4, 2014

(65) Prior Publication Data

US 2014/0253533 A1    Sep. 11, 2014

(30) Foreign Application Priority Data

Mar. 8, 2013  (JP) .................................. 2013-046111

(51) Int. Cl.
*G09G 3/36* (2006.01)
*G02F 1/1362* (2006.01)

(52) U.S. Cl.
CPC ........ *G09G 3/3655* (2013.01); *G02F 1/136213* (2013.01); *G09G 2300/0426* (2013.01)

(58) Field of Classification Search
CPC ....................... G09G 2330/021; G09G 3/3696
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,049,190 B2 | 5/2006 | Takeda et al. |
| 7,061,014 B2 | 6/2006 | Hosono et al. |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

(Continued)

*Primary Examiner* — Ricardo L Osorio

(74) *Attorney, Agent, or Firm* — Eric J. Robinson; Robinson Intellectual Property Law Office, P.C.

(57) ABSTRACT

A highly reliable semiconductor device and a method for driving the highly reliable semiconductor device is provided. In a semiconductor device in which a light-transmitting storage capacitor having a MOS capacitor structure is provided and a light-transmitting semiconductor film functioning as one electrode of the storage capacitor is electrically connected to a capacitor line, a shift of a threshold voltage of the storage capacitor in the positive direction is suppressed in a period during which an image is not displayed. For example, the shift of the threshold voltage of the storage capacitor in the positive direction is suppressed by application of a negative bias to a pixel electrode functioning as the other electrode of the storage capacitor.

20 Claims, 29 Drawing Sheets

(56) References Cited

U.S. PATENT DOCUMENTS

| | | |
|---|---|---|
| 7,064,346 B2 | 6/2006 | Kawasaki et al. |
| 7,105,868 B2 | 9/2006 | Nause et al. |
| 7,211,825 B2 | 5/2007 | Shih et al |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,932,888 B2 | 4/2011 | Miyake |
| 8,207,487 B2 | 6/2012 | Miyake |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0032435 A1 | 2/2011 | Kimura |
| 2011/0089927 A1 | 4/2011 | Yamazaki et al. |
| 2011/0279427 A1 | 11/2011 | Umezaki et al. |
| 2011/0285687 A1 | 11/2011 | Umezaki et al. |
| 2012/0062811 A1 | 3/2012 | Miyake |
| 2012/0274361 A1 | 11/2012 | Miyake |
| 2012/0287024 A1 | 11/2012 | Miyake |
| 2013/0033475 A1 | 2/2013 | Miyake |
| 2013/0285711 A1 | 10/2013 | Miyake |
| 2013/0320848 A1 | 12/2013 | Miyake et al. |
| 2014/0014948 A1 | 1/2014 | Matsukura |
| 2014/0034954 A1 | 2/2014 | Yamazaki et al. |
| 2014/0042432 A1 | 2/2014 | Yamazaki |
| 2014/0042443 A1 | 2/2014 | Yamazaki |
| 2014/0061636 A1 | 3/2014 | Miyake et al. |
| 2014/0061654 A1 | 3/2014 | Yamazaki et al. |
| 2014/0070208 A1 | 3/2014 | Yamazaki |
| 2014/0070209 A1 | 3/2014 | Yamazaki et al. |
| 2014/0070224 A1 | 3/2014 | Yamazaki |
| 2014/0077208 A1 | 3/2014 | Matsukura |
| 2014/0175432 A1 | 6/2014 | Yamazaki et al. |
| 2014/0175433 A1 | 6/2014 | Yamazaki et al. |
| 2014/0183523 A1 | 7/2014 | Endo |
| 2014/0183528 A1 | 7/2014 | Endo |
| 2014/0209897 A1 | 7/2014 | Kubota et al. |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2007-096055 | 4/2007 |
| JP | 2007-123861 | 5/2007 |
| JP | 2012-083738 | 4/2012 |
| WO | WO-2004/114391 | 12/2004 |

OTHER PUBLICATIONS

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

(56) References Cited

OTHER PUBLICATIONS

Cho.D et al., "21.2:AL and SN-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E at al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTS) for AMLCDS", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using CG-Silicon Technology", SID Digest '04: SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium—Gallium—Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel,YBFE2O4, and YB2FE3O7 Types of Structures for Compounds in the IN2O3 and SC2O3—A2O3—BO Sytems [A; FE, GA, or AL; B: MG, MN, FE, NI, CU, or ZN] at Temperatures over 1000 ° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7,8 , 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED ", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium—Oxide-Based Thin-Film Transistors by DC Sputtering", SID Digest '09 : SID International Symposium Digest of Technical Papers, May 31, 2009, pp. 191-193.

Li,C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350 ° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

(56) References Cited

OTHER PUBLICATIONS

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 in. QVGA AMOLED Display Using In—Ga—Zn—Oxide TFTS With a Novel Passivation Layer", SID Digest '09 : SID International Symposium Digest of Technical Papers, May 31, 2009, pp. 284-287.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Park.J et al., "Amorphous Indium—Gallium—Zinc Oxide TFTS and Their Application for Large Size Amoled", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium—Gallium—Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by Peald Grown ZnO TFT", IMID '07 Digest, 2007, pp. 1249-1252.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn—Oxide TFTS", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—IN2O3—ZnO) TFT", SID Digest '08 : SID International Symposium DIgest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

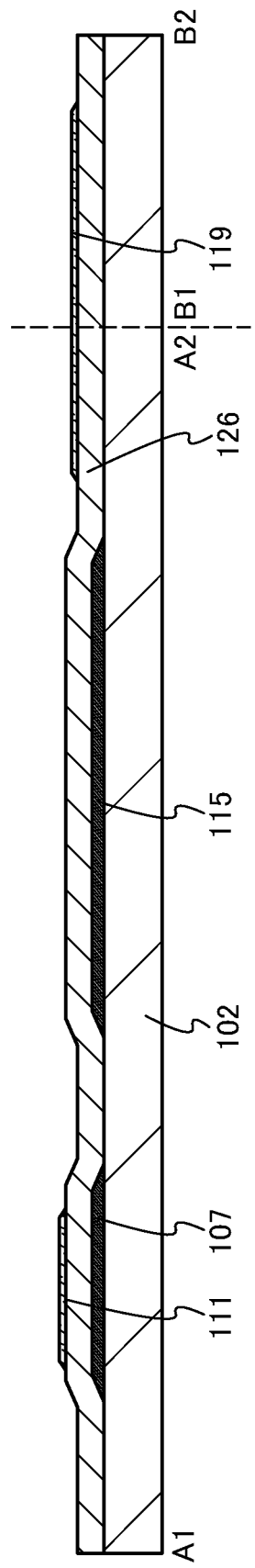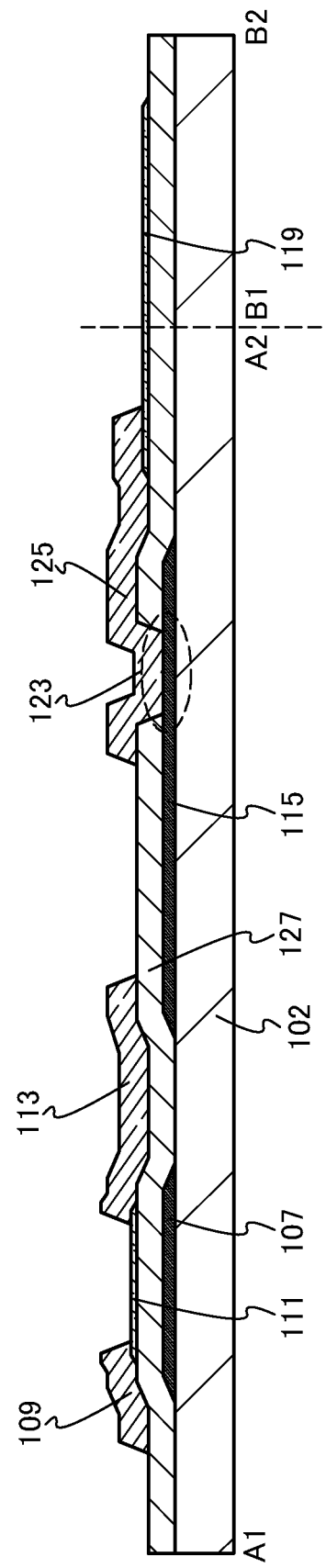

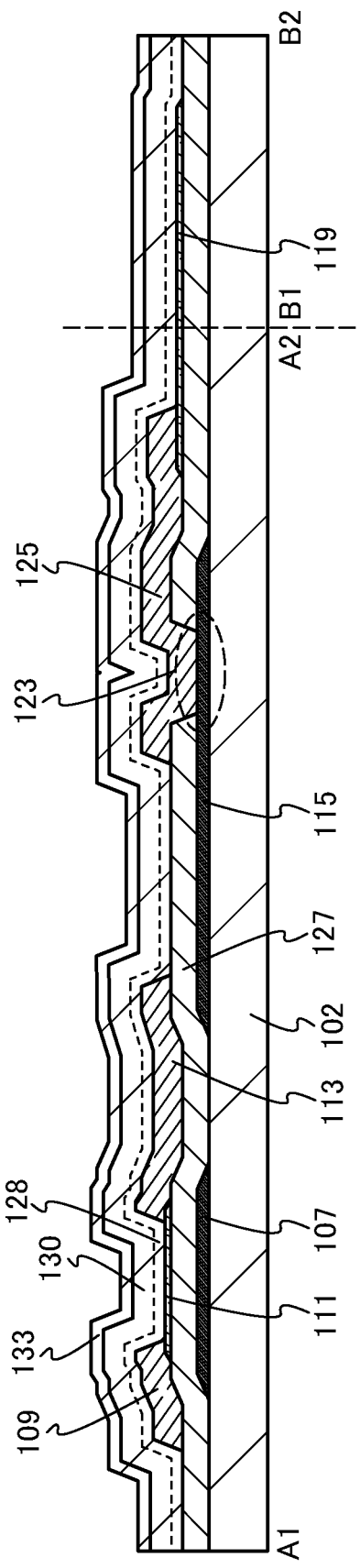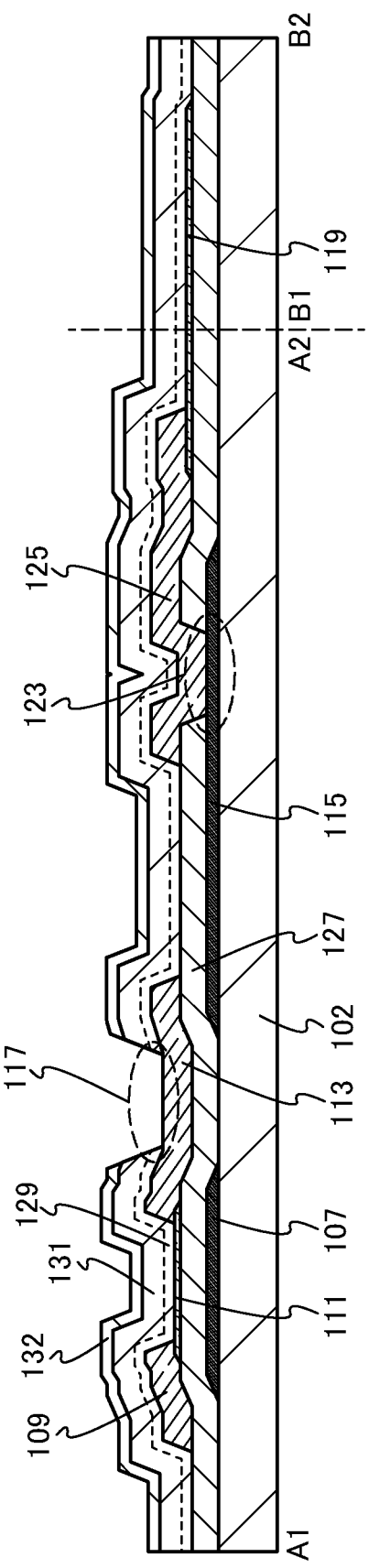

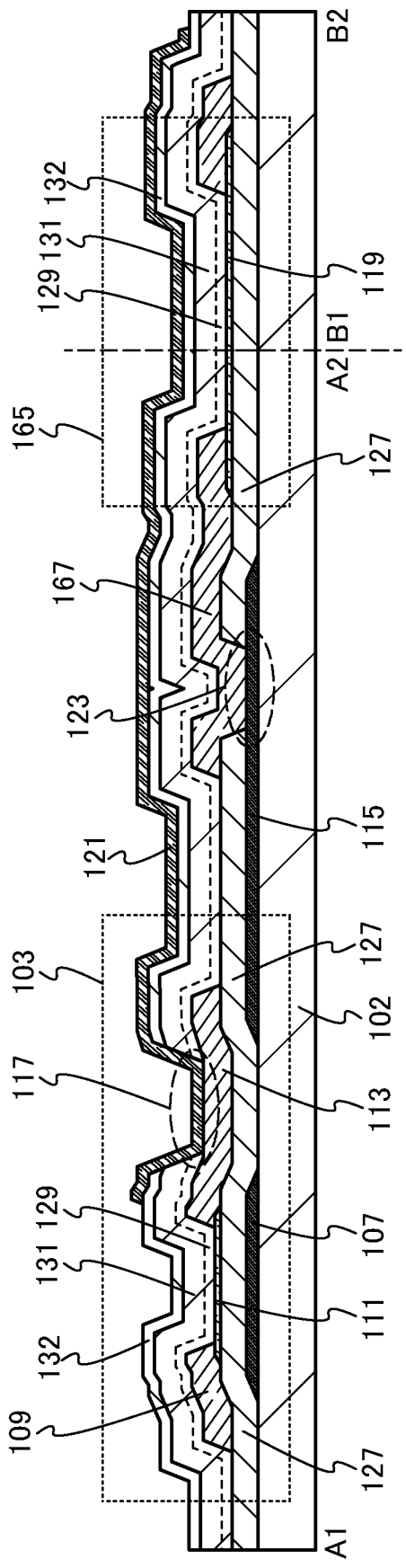
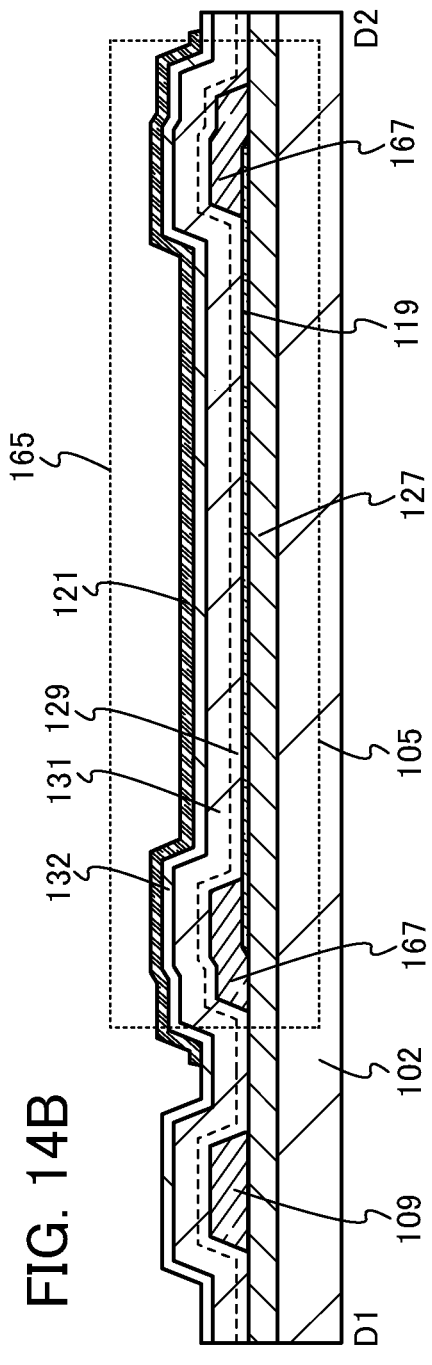

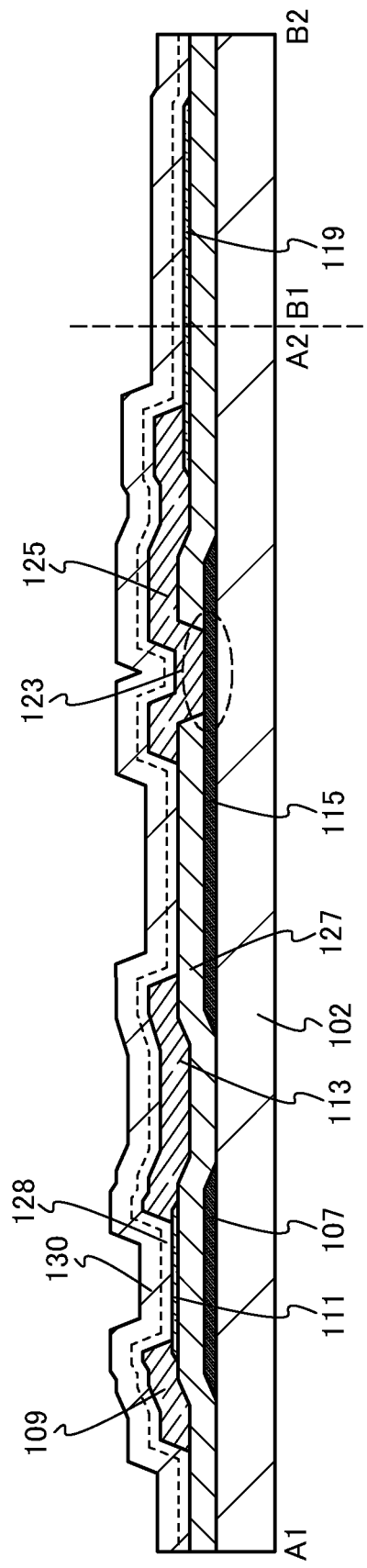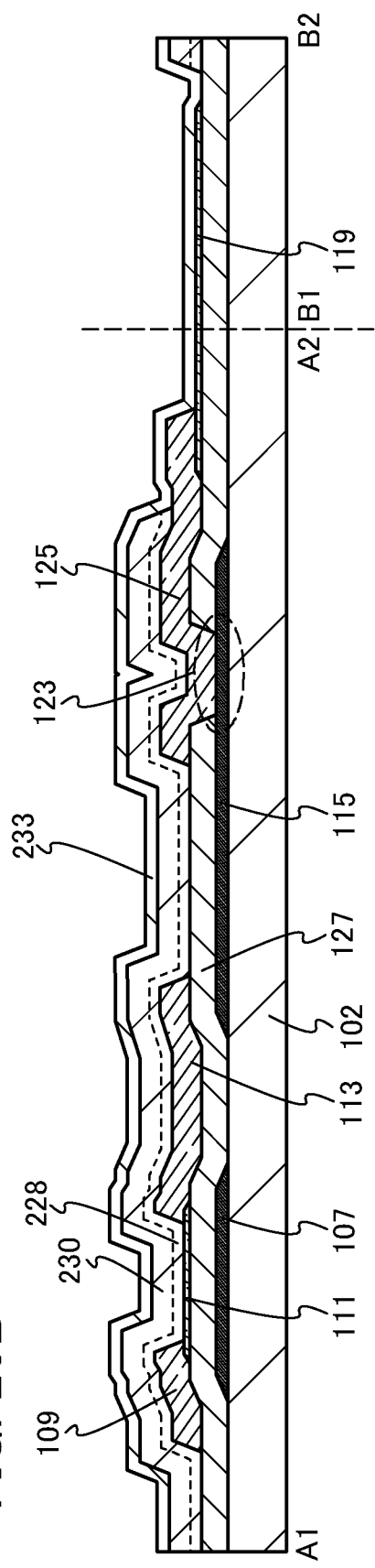

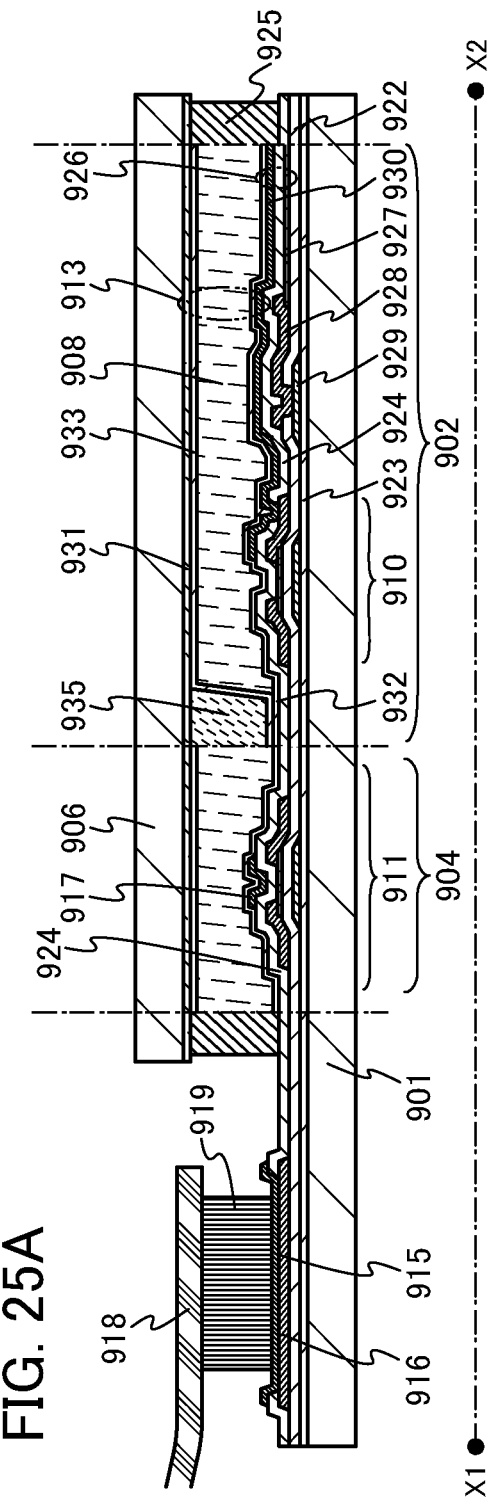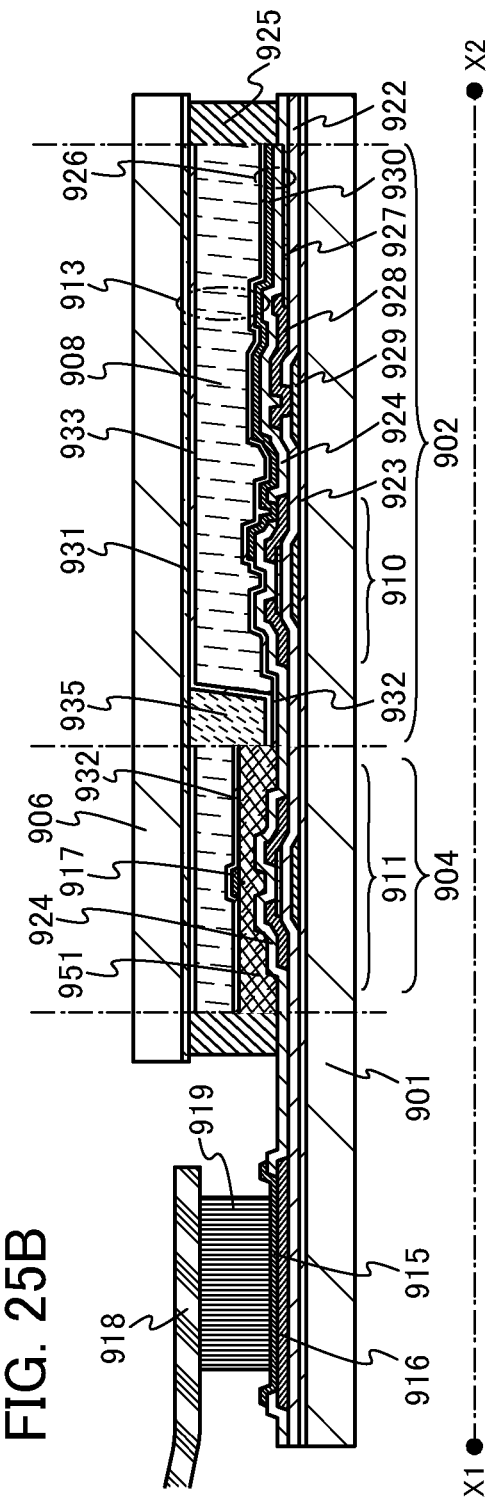

DRIVING METHOD OF SEMICONDUCTOR DEVICE

BACKGROUND OF THE INVENTION

1. Field of the Invention

The invention disclosed in this specification and the like relates to a driving method of a semiconductor device.

2. Description of the Related Art

In recent years, flat panel displays such as liquid crystal displays have been widespread. In each of pixels provided in the row direction and the column direction in a display device such as a liquid crystal display, a transistor serving as a switching element, a liquid crystal element electrically connected to the transistor, and a storage capacitor connected to the liquid crystal element in parallel are provided.

As a semiconductor material for forming a semiconductor film of the transistor, a silicon semiconductor such as amorphous silicon or polysilicon (polycrystalline silicon) is generally used.

Metal oxides having semiconductor characteristics (hereinafter referred to as oxide semiconductors) can be used for semiconductor films in transistors. For example, techniques for forming transistors including zinc oxide or an In—Ga—Zn-based oxide semiconductor are disclosed (see Patent Documents 1 and 2).

In the storage capacitor of the display device, a dielectric film is provided between a pair of electrodes at least one of which is formed, in many cases, using a light-blocking conductive film partly serving as a gate electrode, a source electrode, a drain electrode, or the like of the transistor.

With an increase in the capacitance value of the storage capacitor, the alignment of liquid crystal molecules of the liquid crystal element can be kept constant for a longer period in the state where an electric field is applied, leading to a reduction in power consumption of the display device.

For example, one of methods for increasing the charge capacity of the storage capacitor is to increase the area occupied by the storage capacitor, specifically, to increase the area of a region where the two electrodes of the storage capacitor overlap with each other. However, when the area of the light-blocking conductive film is increased to increase the area of the region where the two electrodes overlap with each other, the aperture ratio of a pixel is lowered and thus display quality of an image is degraded.

Thus, a technique has been disclosed, which enables desired charge capacity to be ensured without a decrease in the aperture ratio in such a manner that a light-transmitting storage capacitor formed using a light-transmitting material is provided in a display device (see Patent Document 3).

REFERENCE

Patent Document

[Patent Document 1] Japanese Published Patent Application No. 2007-123861
[Patent Document 2] Japanese Published Patent Application No. 2007-096055
[Patent Document 3] Japanese Published Patent Application No. 2012-083738

SUMMARY OF THE INVENTION

The storage capacitor of a liquid crystal display device disclosed in Patent Document 3 has a MOS capacitor structure in which a light-transmitting semiconductor film (specifically, an oxide semiconductor film) is used for one electrode, a light-transmitting conductive film (specifically, a pixel electrode) is used for the other electrode, and a light-transmitting insulating film is used for a dielectric film included in the storage capacitor. In the case where a capacitor line is electrically connected to the light-transmitting semiconductor film in the liquid crystal display device, a potential lower than that of a video signal is supplied to the capacitor line to operate the storage capacitor.

That is, the potential of the pixel electrode, which is the other electrode of the storage capacitor, is always higher than that of the capacitor line (the potential of the oxide semiconductor film, which is one electrode of the storage capacitor) when the display device is driven. In other words, a positive bias is always applied to the pixel electrode.

In the case where an oxide semiconductor is used for one electrode of the storage capacitor, the electrical characteristics of the storage capacitor are changed by the positive bias and, for example, the threshold voltage of the storage capacitor having a MOS capacitor structure is shifted in the positive direction. Accordingly, the storage capacitor might not stably operate with time. Therefore, the display device might not be stably driven with time.

Thus, an object of one embodiment of the present invention is to provide a highly reliable semiconductor device. Another object of one embodiment of the present invention is to provide a method for driving a highly reliable semiconductor device.

Another object is to provide a method for stably operating a storage capacitor having such a MOS capacitor structure with time, for example, in a semiconductor device (a display device) including the storage capacitor.

Another object is to provide a method for manufacturing a semiconductor device that can stably operate a storage capacitor with time.

In view of the above objects, in a semiconductor device of one embodiment of the present invention in which a light-transmitting storage capacitor having a MOS capacitor structure is provided and a light-transmitting semiconductor film functioning as one electrode of the storage capacitor is electrically connected to a capacitor line, a shift of a threshold voltage of the storage capacitor in the positive direction is suppressed in a period during which an image is not displayed. For example, the shift of the threshold voltage of the storage capacitor in the positive direction is suppressed by application of a negative bias to a pixel electrode functioning as the other electrode of the storage capacitor.

Specifically, a semiconductor device is driven by a driving method below, for example.

One embodiment of the present invention is a method for driving a semiconductor device including a pixel portion provided with a plurality of pixels each including a transistor, a storage capacitor, and a display element electrically connected to the transistor and the storage capacitor. The storage capacitor includes a light-transmitting semiconductor film functioning as one electrode, which is electrically connected to a capacitor line; a pixel electrode functioning as the other electrode, to which a predetermined potential is supplied from a signal line through the transistor; and a dielectric film between the one electrode and the other electrode. In a period during which an image is displayed in the pixel portion, the method for driving the semiconductor device includes the steps of supplying a potential higher than or equal to a threshold voltage of the transistor to a scan line including a portion functioning as a gate electrode of the transistor to turn on the transistor and supplying a predetermined potential to the pixel electrode from the signal line, supplying a potential at which a potential difference between the pixel electrode and the capacitor line corresponds to the threshold voltage of the storage capacitor or higher to the capacitor line, and holding the potential difference between the pixel electrode and the capacitor line to the storage capacitor for a certain period and displaying the image in the pixel portion through the display element. In a period during which display of the image is stopped, the method for driving the semiconductor device includes the step of supplying a potential higher than the predetermined potential supplied to the pixel electrode from the signal line to the capacitor line for a certain period after the display of the image is stopped.

The above method for driving the semiconductor device can also be applied to a semiconductor device including a liquid crystal element and a light source. Thus, another embodiment of the present invention is a method for driving a semiconductor device including a pixel portion provided with a plurality of pixels each including a transistor, a storage capacitor, and a liquid crystal element electrically connected to the transistor and the storage capacitor; and a light source emitting light to the pixel portion through the liquid crystal element. The storage capacitor includes a light-transmitting semiconductor film functioning as one electrode, which is electrically connected to a capacitor line; a pixel electrode functioning as the other electrode, to which a predetermined potential is supplied from a signal line through the transistor; and a dielectric film between the one electrode and the other electrode. The liquid crystal element includes liquid crystal provided between the pixel electrode and the light-transmitting semiconductor film. In a period during which an image is displayed in the pixel portion, the method for driving the semiconductor device includes the steps of turning on the light source, supplying a potential higher than or equal to a threshold voltage of the transistor to a scan line including a portion functioning as a gate electrode of the transistor to turn on the transistor and supplying a predetermined potential to the pixel electrode from the signal line, supplying a potential at which a potential difference between the pixel electrode and the capacitor line corresponds to the threshold voltage of the storage capacitor or higher to the capacitor line, and holding the potential difference between the pixel electrode and the capacitor line to the storage capacitor for a certain period and displaying the image in the pixel portion through the liquid crystal element. In a period during which display of the image is stopped, the method for driving the semiconductor device includes the step of supplying a potential higher than the predetermined potential supplied to the pixel electrode from the signal line to the capacitor line for a certain period after the display of the image is stopped.

Moreover, in the above method for driving the semiconductor device, it is preferable that the potential of the capacitor line be held at a higher level than the potential supplied to the pixel electrode in a period during which supply of power supply potential is stopped. In particular, it is preferable that the potential of the capacitor line corresponding to the threshold voltage of the storage capacitor or higher be held at a high level. In such a manner, in the case where one electrode of the storage capacitor is the light-transmitting semiconductor film, whose conductivity is not improved intentionally, since a negative bias can be applied to the pixel electrode functioning as the other electrode of the storage capacitor having a MOS capacitor structure in a period during which display of an image is stopped, the threshold voltage of the storage capacitor can be shifted in the negative direction; accordingly, the storage capacitor can be stably operated with time. Thus, the semiconductor device can be stably driven with time.

Note that in this specification and the like, a threshold voltage of a storage capacitor corresponds to a voltage at which charge capacity of the storage capacitor having a MOS capacitor structure including a light-transmitting semiconductor film, a pixel electrode, and an insulating film provided therebetween is increased by accumulation of carriers in the light-transmitting semiconductor film.

In any of the above semiconductor devices, it is preferable that a potential higher than the predetermined potential supplied to the pixel electrode from the signal line be supplied to the capacitor line for a certain period not only in the period during which the display of the image is stopped but also in a period before power supply of the semiconductor device is stopped. In such a manner, the semiconductor device can be stably driven even after the semiconductor device is powered on again.

Further, in the case where the liquid crystal element is used as the display element, liquid crystal is kept responded when a potential difference occurs between the pixel electrode and a counter electrode in a period during which supply of power supply is stopped and therefore a phenomenon called liquid crystal burn-in might occur in which an image corresponding to a video signal before the supply of the power supply slightly remains. Thus, in the method for driving the semiconductor device of one embodiment of the present invention, it is preferable that a potential of a pixel electrode and a potential of a conductive film (a counter electrode or a common electrode) facing the pixel electrode be the same in a period during which an image is not displayed, in particular, in a period after a potential of a capacitor line is made higher than the potential of the pixel electrode. Accordingly, occurrence of liquid crystal burn-in can be suppressed.

Moreover, in any of the above methods for driving the semiconductor device, the light-transmitting semiconductor film included in the storage capacitor preferably includes an oxide semiconductor.

The storage capacitor can be formed by utilizing a formation process of the transistor. The light-transmitting semiconductor film functioning as one electrode of the storage capacitor can be formed by utilizing a semiconductor film formed in the same process as a semiconductor film of the transistor. In that case, the light-transmitting semiconductor film functioning as one electrode of the storage capacitor is formed on the same surface as a light-transmitting semiconductor film included in the transistor. An oxide semiconductor film can be used for the light-transmitting semiconductor film of the transistor. The transistor including the oxide semiconductor film has an extremely low off-state current; thus, power consumption of a semiconductor device including such a transistor can be reduced.

Note that hereinafter, a semiconductor film of a transistor and a light-transmitting semiconductor film included in a storage capacitor are each described as an oxide semiconductor film.

In addition, an insulating film provided over the oxide semiconductor film of the transistor can be used for a dielectric film of the storage capacitor, and the pixel electrode functioning as the other electrode of the storage capacitor is electrically connected to the transistor. Since the storage capacitor has a light-transmitting property, with the above structure, the storage capacitor can be formed large (in a large area) in a region of the pixel except a portion where transistors are formed. Accordingly, one embodiment of the present invention can provide a semiconductor device whose aperture ratio and charge capacity are increased. Further, the semiconductor device can have an excellent display quality by improving the aperture ratio.

In the oxide semiconductor film functioning as one electrode of the storage capacitor of the semiconductor device of one embodiment the present invention, carrier density and conductivity are preferably increased. Thus, the threshold voltage of the storage capacitor having a MOS capacitor structure can be shifted in the negative direction; accordingly, the storage capacitor can be stably operated with time.

For example, the oxide semiconductor film functioning as one electrode of the storage capacitor can have increased carrier density and conductivity by being irradiated with electromagnetic waves such as visible light, ultraviolet rays, or X-rays. Note that it is preferable that the oxide semiconductor film of the transistor be not irradiated with electromagnetic waves, and it is preferable to emit electromagnetic waves from the rear side of a substrate over which the transistor is provided in such a manner that a gate electrode is provided to have a larger region than the oxide semiconductor film including a channel formation region in the plane view of the transistor. Alternatively, in the case where electromagnetic waves are emitted from the surface side of the substrate over which the transistor is provided, a mask which blocks the electromagnetic waves is provided in a region where the transistor is provided.

Alternatively, the following method can be used instead of the electromagnetic wave irradiation to increase the carrier density (to have n-type conductivity) and conductivity of the oxide semiconductor film of the storage capacitor. For example, it is a method for adding one or more elements selected from hydrogen, boron, nitrogen, fluorine, aluminum, phosphorus, arsenic, indium, tin, antimony, and a rare gas element to the oxide semiconductor film. An ion implantation method, an ion doping method, or the like may be employed to add the element to the oxide semiconductor film. Alternatively, the oxide semiconductor film may be exposed to plasma containing the element to add the element.

Alternatively, the carrier density of the oxide semiconductor film of the storage capacitor can be increased (can have n-type conductivity) and conductivity thereof can be increased in such a manner that a nitride insulating film is in contact with the oxide semiconductor film. When the nitride insulating film is in contact with the oxide semiconductor film, defect levels (interface levels) at the interface between the nitride insulating film and the oxide semiconductor film or diffusion of nitrogen contained in the nitride insulating film into the oxide semiconductor film leads to an increase in the conductivity of the oxide semiconductor film.

Note that with a structure in which the oxide semiconductor film of the storage capacitor is in contact with the nitride insulating film in this manner, a step of adding any of the above elements by an ion implantation method, an ion doping method, or the like can be skipped; thus, the yield of a semiconductor device can be improved and the manufacturing cost thereof can be reduced.

In the storage capacitor, the conductivity of the oxide semiconductor film which is increased is higher than or equal to 10 S/cm and lower than or equal to 1000 S/cm, preferably higher than or equal to 100 S/cm and lower than or equal to 1000 S/cm.

As described above, the conductivity of the oxide semiconductor film of the storage capacitor is increased, so that the oxide semiconductor film can serve as one electrode of the storage capacitor sufficiently and easily.

Note that the oxide semiconductor film having increased carrier density (n-type conductivity) and conductivity functions as a conductive film (a transparent conductive film). Note that in this specification and the like, such an oxide semiconductor film is described as an oxide semiconductor film.

Further, in the case where an oxide semiconductor film having increased conductivity is used as the light-transmitting semiconductor film functioning as one electrode of the storage capacitor, the amount of change in threshold voltage of the storage capacitor, which is shifted in the negative direction, varies depending on the conductivity of the oxide semiconductor film. Thus, in the case where the threshold voltage of the storage capacitor is largely shifted in the negative direction, a negative bias is not necessarily applied to the pixel electrode functioning as the other electrode of the storage capacitor. As in the method for the driving the semiconductor device of one embodiment of the present invention, a potential of a capacitor line may be held at a higher level than a potential of a video signal for a certain period in a period during which display of an image is stopped. With such a structure, the amount of change in threshold voltage of the storage capacitor, which is shifted in the positive direction, can be reduced and fluctuations in threshold voltage can be suppressed. Thus, the semiconductor device can be stably driven with time.

Note that one embodiment of the present invention includes not only the method for driving the semiconductor device but also the semiconductor device and a method for manufacturing the semiconductor device.

According to one embodiment of the present invention, in the semiconductor device including the storage capacitor having a MOS capacitor structure, it is possible to provide a method for stably operating the storage capacitor with time or a method for manufacturing a semiconductor device including the storage capacitor that can be stably operated. Further, according to one embodiment of the present invention, it is possible to provide a semiconductor device in which an aperture ratio is high, charge capacity of a storage capacitor is increased, and power consumption is reduced.

BRIEF DESCRIPTION OF THE DRAWINGS

FIGS. 8A and 8B are cross-sectional views illustrating a method for manufacturing the pixel of the semiconductor device.

FIGS. 9A and 9B are cross-sectional views illustrating the method for manufacturing the pixel of the semiconductor device.

FIGS. 14A and 14B are cross-sectional views illustrating the pixel of the semiconductor device.

FIGS. 20A and 20B are cross-sectional views illustrating a method for manufacturing the pixel of the semiconductor device.

FIGS. 25A and 25B are cross-sectional views each illustrating a semiconductor device.

DETAILED DESCRIPTION OF THE INVENTION

Figure 1A:
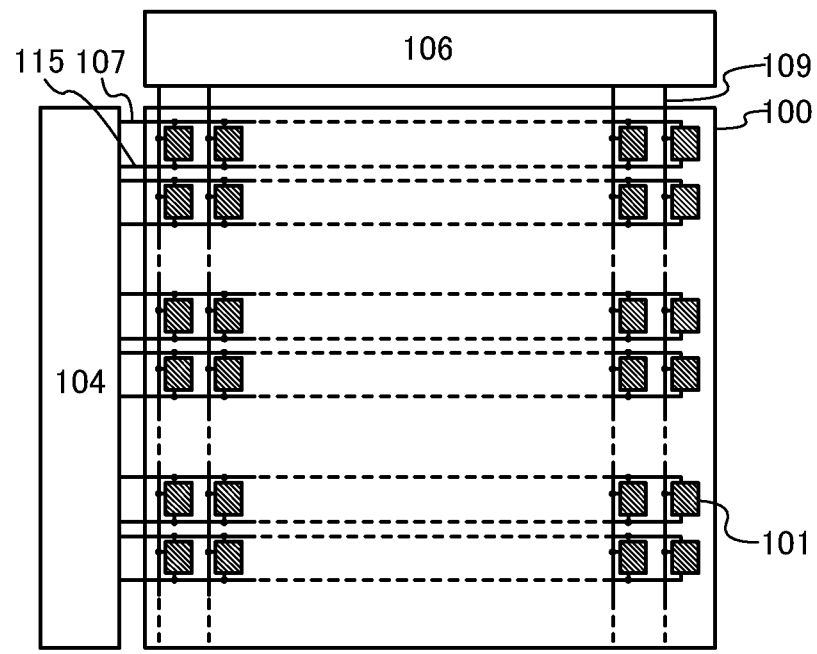
FIG. 1A is a diagram illustrating a semiconductor device.

Embodiments of the present invention will be described below in detail with reference to the drawings. However, the present invention is not limited to the description below, and it is easily understood by those skilled in the art that modes and details can be changed variously. In addition, the present invention is not to be construed as being limited to the following descriptions of the embodiments.

Note that in structures of the present invention described below, the same portions or portions having similar functions are denoted by the same reference numerals in different drawings, and description thereof is not repeated. Further, the same hatching pattern is applied to portions having similar functions, and in some cases the portions are not especially denoted by reference numerals.

Note that in each drawing described in this specification, the size, the film thickness, or the region of each component is in some cases exaggerated for simplicity. Therefore, embodiments of the present invention are not limited to such scales.

Note that the ordinal numbers such as "first" and "second in this specification and the like are used for convenience and do not indicate the order of steps or the stacking order of layers. In addition, the ordinal numbers in this specification and the like do not indicate particular names which specify the present invention.

Functions of a "source" and a "drain" in the present invention are sometimes replaced with each other when the direction of current flow is changed in circuit operation, for example. Therefore, the terms "source" and "drain" can be used to denote the drain and the source, respectively, in this specification.

Note that a voltage refers to a difference between potentials of two points, and a potential refers to electrostatic energy (electric potential energy) of a unit charge at a given point in an electrostatic field. In general, a difference between a potential of one point and a reference potential (e.g., a ground potential) is merely called a potential or a voltage, and a potential and a voltage are used in many cases as synonymous words. Thus, in this specification, a potential may be rephrased as a voltage and a voltage may be rephrased as a potential unless otherwise specified.

In this specification, in the case where etching treatment is performed after a photolithography process is performed, a mask formed in the photolithography process is removed after the etching treatment.

Embodiment 1

In this embodiment, a semiconductor device and a driving method of the semiconductor device that are embodiments of the present invention will be described with reference to drawings. Note that in this embodiment, a liquid crystal display device will be described as the semiconductor device of one embodiment of the present invention.

<Structure of Semiconductor Device>

FIG. 1A illustrates an example of a structure of a semiconductor device. A semiconductor device illustrated in FIG. 1A includes a pixel portion 100; a scan line driver circuit 104; a signal line driver circuit 106; m scan lines 107 which are arranged in parallel or almost in parallel to each other and whose potentials are controlled by the scan line driver circuit 104; and n signal lines 109 which are arranged in parallel or almost in parallel to each other and whose potentials are controlled by the signal line driver circuit 106. In addition, the pixel portion 100 includes a plurality of pixels 101 arranged in a matrix. Further, m capacitor lines 115 which are arranged in parallel or almost in parallel to the scan lines 107 are also included. Note that n capacitor lines 115 may be arranged in parallel or almost in parallel to the signal lines 109.

Each of the scan lines 107 is electrically connected to the n pixels 101 arranged in the corresponding row among the plurality of pixels 101 arranged in m rows and n columns in the pixel portion 100. Each signal line 109 is electrically connected to the m pixels 101 in the corresponding column among the pixels 101 arranged in m rows and n columns. Note that m and n are individually an integer of 1 or more. Each capacitor line 115 is electrically connected to the n pixels 101 in the corresponding row among the pixels 101 arranged in m rows and n columns. Note that in the case where the capacitor lines 115 are arranged in parallel or substantially in parallel along the signal lines 109, each capacitor line 115 is electrically connected to the m pixels 101 in the corresponding column among the pixels 101 arranged in m rows and n columns.

Figure 1B:
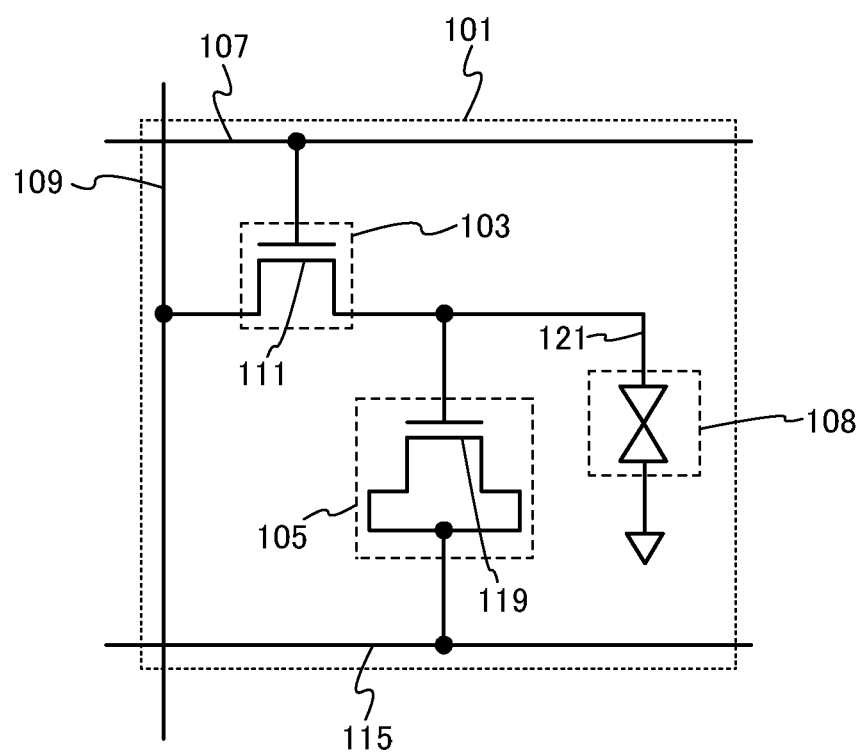
FIG. 1B is a circuit diagram of a pixel.

FIG. 1B is an example of a circuit diagram of a pixel 101 included in the semiconductor device illustrated in FIG. 1A. The pixel 101 illustrated in FIG. 1B includes a transistor 103 electrically connected to the scan line 107 and the signal line 109, a storage capacitor 105 one electrode of which is electrically connected to a capacitor line 115 which supplies a constant potential and the other electrode of which is electrically connected to a drain electrode of the transistor 103, and a liquid crystal element 108. A pixel electrode 121 of the liquid crystal element 108 is electrically connected to the drain electrode of the transistor 103 and the other electrode of the storage capacitor 105, and an electrode (counter electrode) facing the pixel electrode 121 is electrically connected to a wiring which supplies a counter potential.

The transistor 103 is a transistor including an oxide semiconductor. Note that when an oxide semiconductor film 111 is used for a channel formation region of the transistor, the off-state current of the transistor can be reduced. Therefore, the transistor 103 is a transistor with a small off-state current.

The storage capacitor 105 includes a dielectric film between the pair of electrodes and has a light-transmitting property. The storage capacitor 105 can be formed by utilizing a formation process of the transistor 103. One electrode of the storage capacitor 105 is an oxide semiconductor film 119 formed in the same process as the oxide semiconductor film 111 of the transistor 103. The oxide semiconductor film 119 functions as one electrode of the storage capacitor 105 when the oxide semiconductor film 119 is brought into a conductive state by controlling a potential supplied thereto. The dielectric film is a light-transmitting insulating film which is provided over the oxide semiconductor film 111 included in the transistor 103. The pixel electrode 121 functions as the other electrode of the storage capacitor 105. Thus, the storage capacitor 105 can be said to have a metal oxide semiconductor (MOS) capacitor structure.

Figure 2A:
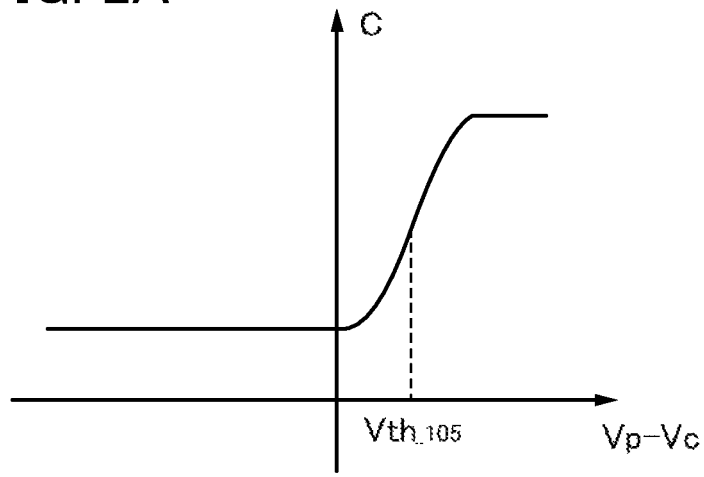
FIGS. 2A and 2B are graphs each showing the relation between voltage and capacitance of a storage capacitor included in a semiconductor device.
Figure 2B:
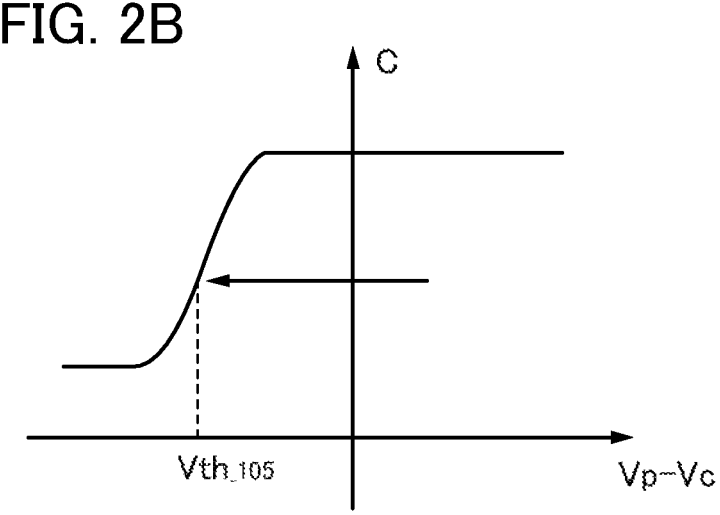

FIGS. 2A and 2B each show a CV curve of the storage capacitor 105. In FIGS. 2A and 2B, the horizontal axis represents a potential difference (Vp−Vc) between the pixel electrode 121 (potential (Vp)) and the capacitor line 115 (potential (Vc)), and the vertical axis represents capacitance (C) with respect to the potential difference. FIG. 2A shows a CV curve in the case where the carrier density of the oxide semiconductor film 119 included in the storage capacitor 105 is equal to that of the oxide semiconductor film 111 included in the transistor 103 in such a manner that the oxide semiconductor film 119 is formed in the same formation process as the oxide semiconductor film 111 without intentionally increasing carrier density (i.e., increasing conductivity). The storage capacitor 105 is sufficiently charged when the potential difference (Vp−Vc) between the pixel electrode 121 and the capacitor line 115 is higher than or equal to the threshold voltage of the storage capacitor 105 ($Vth_{\_105}$).

Moreover, the oxide semiconductor film 119 of the storage capacitor 105 can be an oxide semiconductor film having increased carrier density (n-type conductivity) and conductivity. In that case, the threshold voltage ($Vth_{\_105}$) of the storage capacitor 105 is shifted in the negative direction as shown in FIG. 2B.

In the case where the frequency of voltage at the time of the capacitance-voltage measurement (CV measurement) is lower than the frame frequency of the semiconductor device, CV curves as shown in FIGS. 2A and 2B are obtained.

The liquid crystal element 108 is an element which controls transmission or non-transmission of light utilizing an optical modulation action of liquid crystal. Liquid crystal is provided between the pixel electrode 121 and the counter electrode. The optical modulation action of liquid crystal is controlled by an electric field applied to the liquid crystal (including a vertical electric field and a diagonal electric field). The counter electrode (also referred to as a common electrode) may be formed over the substrate over which the pixel electrode is formed, and in that case, a lateral electric field is applied to the liquid crystal.

The scan line driver circuit 104 and the signal line driver circuit 106 are each roughly classified into a logic circuit portion, and a switch portion or a buffer portion. Although a specific structure of the scan line driver circuit 104 and the signal line driver circuit 106 is omitted here, a transistor is included in each of the scan line driver circuit 104 and the signal line driver circuit 106.

Note that one or both of the scan line driver circuit 104 and the signal line driver circuit 106 may include a transistor formed by utilizing the formation process of the transistor 103. That is, one or both of the scan line driver circuit 104 and the signal line driver circuit 106 can be provided over a substrate over which the transistor 103 and the pixel electrode 121 are provided. In this manner, one or both of the scan line driver circuit 104 and the signal line driver circuit 106 are formed over the same substrate, whereby the number of components of the semiconductor device can be reduced and the manufacturing cost can be reduced.

The storage capacitor 105 has a light-transmitting property and thus can be formed large (in a large area) in a region of the pixel 101 where the transistor 103 is not formed. Thus, the semiconductor device illustrated in FIGS. 1A and 1B is a semiconductor device whose aperture ratio and charge capacity are increased, and the display quality is excellent. For example, when the pixel density of the semiconductor device of one embodiment of the present invention is 300 ppi or more (specifically, about 300 ppi or more and 330 ppi or less), the aperture ratio of the pixel can be 50% or higher, 55% or higher, or even 60% or higher. The semiconductor device of one embodiment of the present invention is a semiconductor device whose aperture ratio of a pixel is made higher than that of a pixel in the conventional semiconductor device.

Now, a method for driving the semiconductor device of one embodiment of the present invention is described. The case where the threshold voltage ($Vth_{\_105}$) of the storage capacitor 105 is greater than 0 V (in the case of the CV curve in FIG. 2A) and the case where the threshold voltage thereof is less than or equal to 0 V (in the case of the CV curve in FIG. 2B) are described below.

<In the Case where Threshold Voltage ($Vth_{\_105}$) of Storage Capacitor 105 is Greater than 0 V>

Since the semiconductor device of one embodiment of the present invention includes the storage capacitor 105 having a MOS capacitor structure, a potential applied to the oxide semiconductor film 119 functioning as the one electrode of the storage capacitor 105 is set as follows when the storage capacitor 105 is operated.

The potential (Vp) of the pixel electrode 121 is changed in the positive direction and the negative direction relative to the center potential of a video signal input to the signal line 109. Here, a minimum potential of the pixel electrode 121 is called $Vp_{\_min}$, and a maximum potential thereof is called $Vp_{\_max}$. In order to operate the storage capacitor 105, in an operation period of the storage capacitor 105 (a period during which an image is displayed in the pixel portion 100), it is necessary to set the potential of the oxide semiconductor film 119 (i.e., the potential (Vc) of the capacitor line 115) to be lower than the minimum potential $Vp_{\_min}$ of the pixel electrode 121 by the threshold voltage ($Vth_{\_105}$) of the storage capacitor 105 (MOS capacitor) or more (see FIG. 3A).

Since the oxide semiconductor film 119 included in the storage capacitor 105 and the oxide semiconductor film 111 included in the transistor 103 are formed in the same formation process, the value of the threshold voltage ($Vth_{\_105}$) of the storage capacitor 105 is the same as the value of a threshold voltage of the transistor 103 ($Vth_{\_103}$). Thus, in the operation period of the storage capacitor 105, the potential of the oxide semiconductor film 119 may be set to be lower than the potential (Vp) of the pixel electrode 121 (e.g., lower than the minimum potential $Vp_{\_min}$ of the pixel electrode 121) by the threshold voltage ($Vth_{\_103}$) of the transistor 103 or more. In this manner, in the operation period of the storage capacitor 105, the oxide semiconductor film 119 can be constantly brought into conduction, so that the storage capacitor 105 can be operated constantly.

Figure 3A:
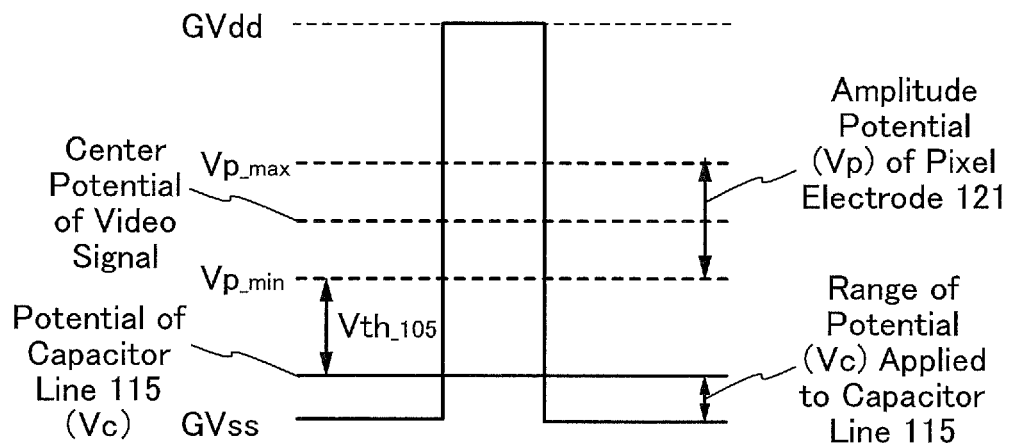
FIGS. 3A and 3B show a method for operating a storage capacitor included in a semiconductor device.

Note that in FIG. 3A, the minimum potential of the potentials supplied to the scan line 107 is set to GVss and the maximum potential thereof is set to GVdd.

As shown in FIG. 3A, in the case where the threshold voltage $Vth_{\_105}$ of the storage capacitor 105 is greater than 0 V, in the operation period of the storage capacitor 105, the potential (Vp) of the pixel electrode 121 is higher than the potential of the oxide semiconductor film 119 (i.e., higher than the potential (Vc) of the capacitor line 115). In other words, in that period, a positive bias is applied to the pixel electrode 121 and the threshold voltage $Vth_{\_105}$ of the storage capacitor 105 is shifted in the positive direction. When the threshold voltage of the storage capacitor 105 is shifted in the positive direction, the range of the potential applied to the capacitor line 115 to operate the storage capacitor 105 is narrowed; thus, it is difficult to stably operate the storage capacitor 105 with time. Note that in this specification and the like, a positive bias is relative to the potential of the oxide semiconductor film 119 (the capacitor line 115).

Thus, in the method for driving the semiconductor device of one embodiment of the present invention, a negative bias is applied to the pixel electrode 121 in the period during which an image is not displayed, for example, a period during which the storage capacitor 105 is not operated (e.g., when a light source such as a backlight of the semiconductor device which is a liquid crystal display device is turned off) or when the power supply of the liquid crystal display device is stopped. Accordingly, the threshold voltage $Vth_{\_105}$ of the storage capacitor 105 can be shifted in the negative direction during that period. Thus, the range of the potential applied to the capacitor line 115 to operate the storage capacitor 105 can be prevented from being narrowed; thus, the storage capacitor 105 can be stably operated with time. Note that in this specification and the like, a negative bias is relative to the potential of the oxide semiconductor film 119 (the capacitor line 115).

Figure 3B:
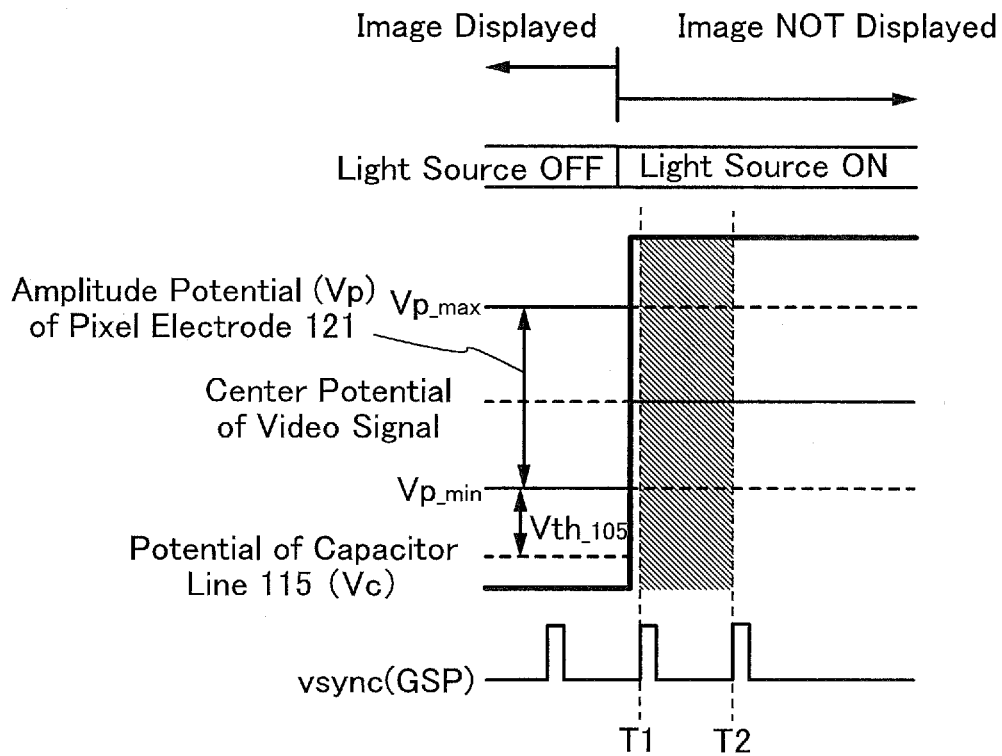

Specifically, in the period during which an image is not displayed in the pixel portion 100, the semiconductor device is driven in accordance with sequence shown in FIG. 3B, so that a negative bias can be applied to the pixel electrode 121 in that period.

In the period during which an image is displayed in the pixel portion 100 in FIG. 3B, the potential (Vc) of the capacitor line 115 is set to be lower than the potential (Vp) of the pixel electrode 121 by the threshold voltage ($Vth_{\_105}$) of the storage capacitor 105 or more as shown in FIG. 3A. Note that in FIG. 3B, vsync (GSP) is a horizontal synchronization signal, which corresponds to a frame rate of the semiconductor device.

After that, in a period during which display of the image is stopped, first, the light source such as a backlight is turned off, and then the potential (Vc) of the capacitor line 115 is held at a higher level than the potential (Vp) of the pixel electrode 121 (e.g., higher than the maximum potential $Vp_{\_max}$ of the pixel electrode 121) for a certain period (see FIG. 3B). In particular, it is preferable to set the potential (Vc) of the capacitor line 115 to be higher than the potential (Vp) of the pixel electrode 121 by the threshold voltage ($Vth_{\_105}$) of the storage capacitor 105 or more. In such a manner, a negative bias can be applied to the pixel electrode 121 in a certain period.

Alternatively, in the period during which display of the image is stopped (after the light source such as a backlight is turned off), the potential (Vc) of the capacitor line 115 may be higher than a constant potential such as a common potential because in many cases the center potential of a video signal has the constant potential such as the common potential.

Even after the potential (Vc) of the capacitor line 115 is set to be higher than the potential (Vp) of the pixel electrode 121, there is a potential difference between the oxide semiconductor film 119 of the storage capacitor 105 and the pixel electrode 121; therefore, liquid crystal of the liquid crystal element 108 responds in accordance with the potential difference. Then, since the transistor 103 is a transistor whose off-state current is extremely low and which controls the potential (Vc) of the capacitor line 115 to be constant, charge accumulated in the storage capacitor 105 does not leak; therefore, liquid crystal of the liquid crystal element 108 responds constantly. Thus, a phenomenon called liquid crystal burn-in might occur in which an image corresponding to a potential (a video signal) of the pixel electrode 121 just before setting the potential (Vc) of the capacitor line 115 to be higher than the potential (Vp) of the pixel electrode 121 remains.

In the frame after the potential (Vc) of the capacitor line 115 is set to be higher than the potential (Vp) of the pixel electrode 121 (a period T1T2), it is preferable that there be no potential difference between the pixel electrode 121 and the counter electrode, for example, the potential of the pixel electrode 121 is preferably set to the same potential as the counter electrode. Accordingly, occurrence of liquid crystal burn-in can be suppressed.

<In the Case where Threshold Voltage ($Vth_{105}$) of Storage Capacitor 105 is Less than or Equal to 0 V>

As shown in FIG. 2b, in the case where the oxide semiconductor film 119 of the storage capacitor 105 is an oxide semiconductor film having increased carrier density (n-type conductivity) and conductivity, the threshold voltage ($Vth_{\_105}$) of the storage capacitor 105 is shifted in the negative direction. The potential (Vc) applied to the capacitor line 115 is greater than or equal to GVss and less than or equal to ($Vp_{\_min}$-$Vth_{\_105}$); therefore, when the threshold voltage ($Vth_{\_105}$) of the storage capacitor 105 is shifted in the negative direction, the range of the potential (Vp) applied to the capacitor line 115 can be made broad, which is preferable.

Note that the amount of change in threshold voltage ($Vth_{\_105}$) of the storage capacitor 105, which is shifted in the negative direction, is changed depending on the degree of an increase in carrier density of the oxide semiconductor film 119.

Figure 4:
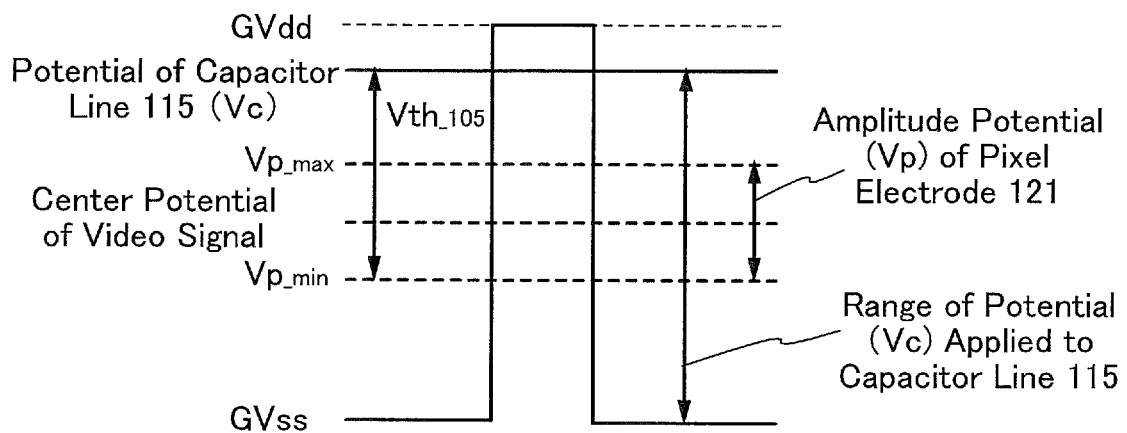
FIG. 4 shows a method for operating a storage capacitor included in a semiconductor device.

For example, the threshold voltage ($Vth_{\_105}$) of the storage capacitor 105 can be set to be less than 0 V depending on the carrier density of the oxide semiconductor film 119. In that case, the potential of the oxide semiconductor film 119 (i.e., the potential (Vc) of the capacitor line 115) can be set to be higher than the minimum potential ($Vp_{\_min}$) of the pixel electrode 121. Alternatively, in the case where the threshold voltage ($Vth_{\_105}$) of the storage capacitor 105 has a large negative value, the potential (Vc) of the capacitor line 115 can be set to be higher than the maximum value ($Vp_{\_max}$) of the pixel electrode 121 as shown in FIG. 4.

Further, in the case where the degree of an increase in carrier density of the oxide semiconductor film 119 is high and the threshold voltage ($Vth_{\_105}$) of the storage capacitor 105 is largely shifted in the negative direction, a negative bias is not necessarily applied to the pixel electrode 121 constantly even when the potential (Vc) of the capacitor line 115 is set to be higher than the potential (Vp) of the pixel electrode 121. In that case, in order to apply a negative bias to the pixel electrode 121, it is necessary to set the potential (Vc) of the capacitor line 115 to a potential at which the potential difference (Vp−Vc) between the pixel electrode 121 and the capacitor line 115 is lower than the threshold voltage (Vth_105) of the storage capacitor 105 (see FIG. 5A).

Figure 5A:
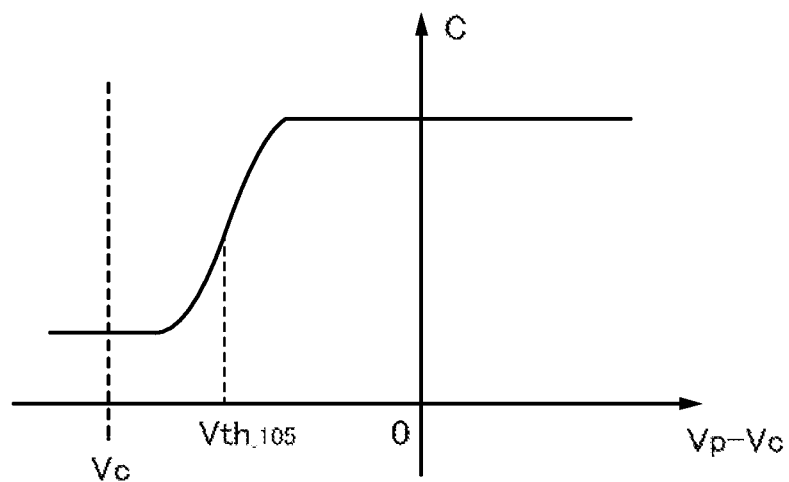
FIGS. 5A and 5B are graphs each showing the relation between voltage and capacitance of a storage capacitor included in a semiconductor device.
Figure 5B:
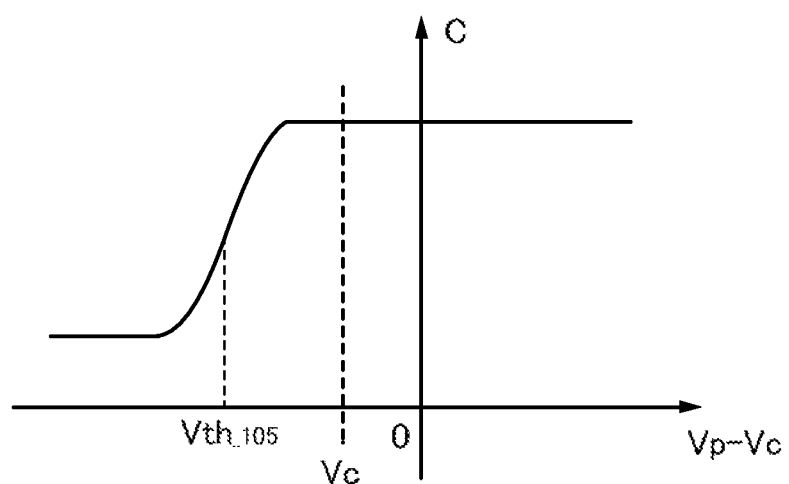

Note that FIGS. 5A and 5B are each a CV curve in the case where the threshold voltage (Vth_105) of the storage capacitor 105 is shifted in the negative direction. In FIGS. 5A and 5B, the horizontal axis represents the potential difference (Vp−Vc) between the pixel electrode 121 and the capacitor line 115, and the vertical axis represents capacitance (C) with respect to the potential difference.

In the case where the threshold voltage (Vth_105) of the storage capacitor 105 is largely shifted in the negative direction, in some cases, it is difficult to generate a potential applied to the capacitor line 115 on the basis of the minimum potential (GVss) and the maximum potential (GVdd) which are supplied to the scan line 107. In addition, in some cases, it is difficult to generate the potential applied to the capacitor line 115 on the basis of the maximum potential and the minimum potential applied to the scan line driver circuit 104 and the signal line driver circuit 106. In that case, it is necessary to use a power supply generation circuit which additionally generates a potential applied to the capacitor line 115.

However, as long as the threshold voltage (Vth_105) of the storage capacitor 105 is largely shifted in the negative direction in advance, a mode in which a positive bias is applied to the pixel electrode 121 may be employed (see FIG. 5B). In that case, although the threshold voltage (Vth_105) of the storage capacitor 105 is shifted in the positive direction, since the threshold voltage (Vth_105) of the storage capacitor 105 is largely shifted in the negative direction in advance, the amount of change in threshold voltage (Vth_105), which is shifted in the positive direction, is reduced; thus, the storage capacitor 105 can be stably operated with time. Thus, in the semiconductor device of one embodiment of the present invention, it is not necessary to provide a power supply generation circuit which additionally generates a potential applied to the capacitor line 115. Note that with the power supply generation circuit, a negative bias can be applied to the pixel electrode 121 even in the case where the threshold voltage (Vth_105) of the storage capacitor 105 is largely shifted in the negative direction.

Moreover, in one embodiment of the present invention, it is preferable to held the potential (Vc) of the capacitor line 115 at a higher level than the potential (Vp) of the pixel electrode 121 for a certain period also before the power supply of the semiconductor device is stopped. In such a manner, the semiconductor device can be stably driven even after the semiconductor device is powered on again.

Thus, with the driving method of one embodiment of the present invention, in the semiconductor device (the display device) including the storage capacitor having a MOS capacitor structure, the storage capacitor can be stably operated with time.

<Top Structure and Cross-Sectional Structure of Semiconductor Device>

Figure 6:
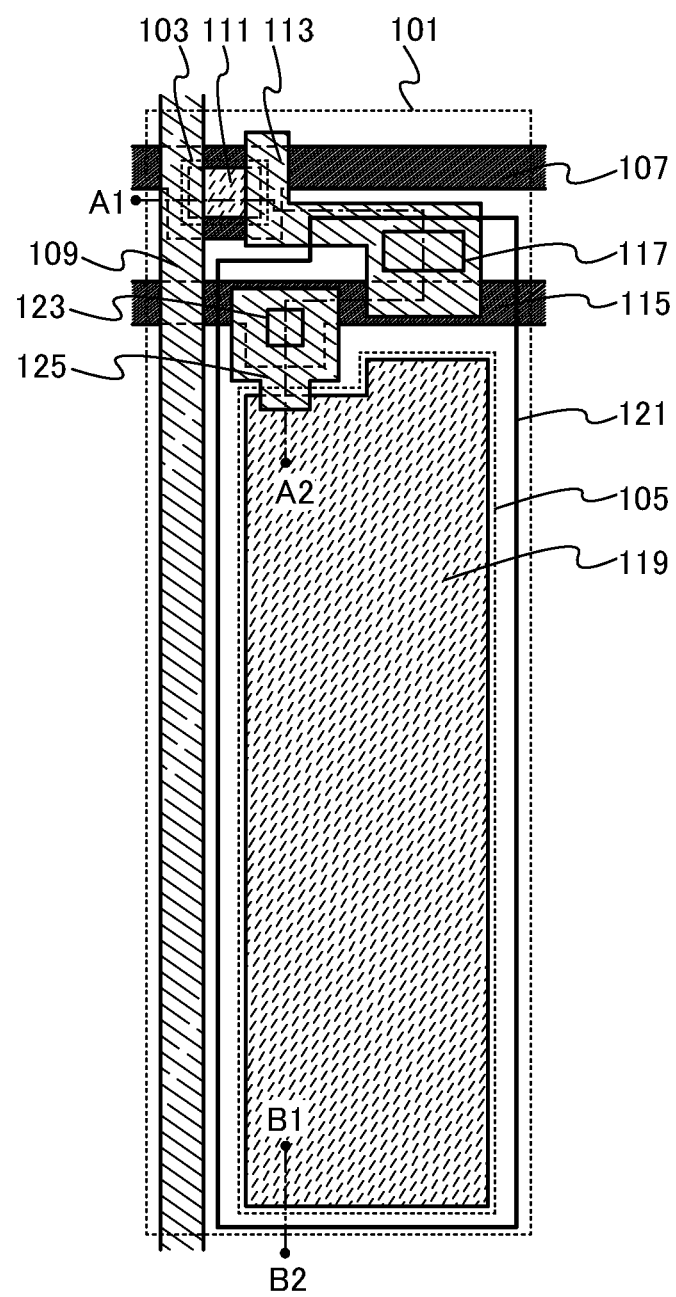
FIG. 6 is a top view illustrating a pixel of a semiconductor device.

Next, a specific structure of a semiconductor device is described. Here, the pixel 101 is described as an example. FIG. 6 is a top view of the pixel 101. Note that in FIG. 6, some components of the semiconductor device (e.g., the liquid crystal element 108) are omitted for clarity.

In FIG. 6, the scan line 107 extends in a direction substantially perpendicular to the signal line 109 (in the horizontal direction in the drawing). The signal line 109 extends in a direction substantially perpendicular to the scan line 107 (in the vertical direction in the drawing). The capacitor line 115 extends in the direction parallel to the scan line 107. The scan line 107 and the capacitor line 115 are electrically connected to the scan line driver circuit 104 (see FIG. 1A), and the signal line 109 is electrically connected to the signal line driver circuit 106 (see FIG. 1A).

The transistor 103 is provided in a region where the scan line 107 and the signal line 109 cross each other. The transistor 103 includes at least the oxide semiconductor film 111 including a channel formation region, a gate electrode, a gate insulating film (not illustrated in FIG. 6), a source electrode, and a drain electrode.

In addition, the scan line 107 includes a region functioning as the gate electrode of the transistor 103, and the signal line 109 includes a region functioning as the source electrode of the transistor 103. A conductive film 113 includes a region functioning as the drain electrode of the transistor 103 and is electrically connected to the pixel electrode 121 through an opening 117. Note that the pixel electrode 121 is illustrated without hatching in FIG. 6.

The region of the scan line 107, which serves as the gate electrode, is a region overlapping with at least the oxide semiconductor film 111. The region of the signal line 109, which serves as the source electrode, is a region overlapping with at least the oxide semiconductor film 111. The region of the conductive film 113, which serves as the drain electrode, is a region overlapping with at least the oxide semiconductor film 111. Note that in some cases, the term "scan line 107" is used also to denote the gate electrode of the transistor 103 and the term "signal line 109" is used also to denote the source electrode of the transistor 103 in the following description. In some cases, the conductive film 113 is used to denote the drain electrode of the transistor 103 in the following description.

Further, an edge of the scan line 107 is on the outer side than an edge of the semiconductor film when seen from above. Thus, the scan line 107 serves as a light-blocking film for blocking light from a backlight. For this reason, the oxide semiconductor film 111 included in the transistor is not irradiated with light, so that a change in the electrical characteristics of the transistor can be suppressed.

The storage capacitor 105 is provided in a region surrounded by the scan lines 107 and the signal lines 109. The storage capacitor 105 includes the oxide semiconductor film 119, the light-transmitting pixel electrode 121, and the light-transmitting insulating film (not illustrated in FIG. 6) which is included in the transistor 103, and the storage capacitor 105 has a light-transmitting property. The oxide semiconductor film 119 is in contact with the capacitor line 115 through a conductive film 125 provided in and over an opening 123; therefore, the storage capacitor 105 is electrically connected to the capacitor line 115.

Charge capacity accumulated in the storage capacitor is changed depending on the overlapped area of a pair of electrodes. In general, when the size of a pixel is reduced in order to increase the resolution, the size of a storage capacitor is also reduced, resulting in a small accumulated charge capacity. Accordingly, a liquid crystal element might not be operated sufficiently. Since the storage capacitor 105 transmits light, the storage capacitor 105 can be formed in the entire operation area of the liquid crystal element 108, and thus the storage capacitor 105 can be formed large (in a large area) as much as possible in the pixel. As long as the charge capacity that can sufficiently operate the liquid crystal element 108 can be ensured, the pixel density can be increased to have a high resolution.

Here, the characteristics of a transistor including an oxide semiconductor are described. The transistor including an oxide semiconductor is an n-channel transistor. Further, oxygen vacancies in the oxide semiconductor might generate carriers, which might degrade the electrical characteristics and reliability of the transistor. For example, in some cases, the threshold voltage of the transistor is shifted in the negative direction, and drain current flows when the gate voltage is 0 V. A transistor in which drain current flows when gate voltage is 0 V is referred to as a normally-on transistor, whereas a transistor in which substantially no drain current flows when gate voltage is 0 V is referred to as a normally-off transistor.

In view of the above, it is preferable that defects, typically oxygen vacancies in an oxide semiconductor film be reduced as much as possible when the oxide semiconductor film is used. For example, it is preferable that the spin density of the oxide semiconductor film (the density of defects in the oxide semiconductor film) at a g-value of 1.93 in electron spin resonance spectroscopy in which a magnetic field is applied in parallel to the film surface be reduced to lower than or equal to the lower detection limit of measurement equipment. When the defects typified by oxygen vacancies in the oxide semiconductor film are reduced as much as possible, the transistor can be prevented from being normally-on, leading to improvements in the electrical characteristics and reliability of a semiconductor device.

The shift of the threshold voltage of a transistor in the negative direction is caused in some cases by hydrogen (including a hydrogen compound such as water) contained in an oxide semiconductor film as well as by oxygen vacancies. Hydrogen contained in the oxide semiconductor film reacts with oxygen bonded to a metal atom to be water and forms vacancies (also referred to as oxygen vacancies) in a lattice from which oxygen is released (or a portion from which oxygen is released). In addition, when part of hydrogen reacts with oxygen, electrons functioning as carriers are generated. Thus, a transistor including an oxide semiconductor film which contains hydrogen is likely to have normally-on characteristics.

Accordingly, it is preferable that hydrogen be reduced as much as possible in the oxide semiconductor film 111 of the transistor 103. Specifically, the hydrogen concentration of the oxide semiconductor film 111, which is measured by secondary ion mass spectrometry (SIMS), is lower than $5 \times 10^{18}$ atoms/cm$^3$, preferably lower than or equal to $1 \times 10^{18}$ atoms/cm$^3$, further preferably lower than or equal to $5 \times 10^{17}$ atoms/cm$^3$, still further preferably lower than or equal to $1 \times 10^{16}$ atoms/cm$^3$.

Further, the concentration of alkali metals or alkaline earth metals in the oxide semiconductor film 111, which is measured by SIMS, is lower than or equal to $1 \times 10^{18}$ atoms/cm$^3$, preferably lower than or equal to $2 \times 10^{16}$ atoms/cm$^3$. This is because an alkali metal and an alkaline earth metal might generate carriers when bonded to an oxide semiconductor, in which case the off-state current of the transistor 103 might be increased.

Further, when nitrogen is contained in the oxide semiconductor, electrons functioning as carriers are generated and carrier density is increased, so that the oxide semiconductor film easily becomes n-type. As a result, a transistor including the oxide semiconductor film which contains nitrogen is likely to have normally-on characteristics. For this reason, nitrogen in the oxide semiconductor film 111 is preferably reduced as much as possible; the nitrogen concentration is preferably lower than or equal to $5 \times 10^{18}$ atoms/cm$^3$, for example.

Further, when a Group 14 element such as silicon and carbon is contained in the oxide semiconductor, electrons functioning as carriers are generated and the carrier density is increased, so that the oxide semiconductor film easily becomes n-type. Thus, in the transistor 103 including the oxide semiconductor film, in particular, at the interface between a gate insulating film 127 (not illustrated in FIG. 6) and the oxide semiconductor film 111, the silicon concentration which is measured by SIMS is lower than or equal to $3 \times 10^{18}$ atoms/cm$^3$, preferably lower than or equal to $3 \times 10^{17}$ atoms/cm$^3$. Note that at the interface, the carbon concentration which is measured by SIMS is lower than or equal to $3 \times 10^{18}$ atoms/cm$^3$, preferably lower than or equal to $3 \times 10^{17}$ atoms/cm$^3$.

As described above, when the highly purified oxide semiconductor film 111 in which impurities (such as hydrogen, nitrogen, silicon, carbon, an alkali metal, or an alkaline earth metal) are reduced as much as possible is used, the transistor 103 can be prevented from being normally-on, so that the off-state current of the transistor 103 can be significantly reduced. Thus, one embodiment of the present invention is a semiconductor device having favorable electrical characteristics and high reliability. Note that the highly purified oxide semiconductor can be regarded as an intrinsic semiconductor or a substantially intrinsic semiconductor.

Various experiments can prove low off-state current of a transistor including a highly-purified oxide semiconductor film. For example, even when an element has a channel width of $1 \times 10^6$ μm and a channel length (L) of 10 μm, the off-state current can be lower than or equal to the measurement limit of a semiconductor parameter analyzer, i.e., lower than or equal to $1 \times 10^{-13}$ A, at a voltage (drain voltage) between a source electrode and a drain electrode in the range of 1 V to 10 V. In that case, it can be found that the off-state current corresponding to a value obtained by dividing the off-state current by the channel width of the transistor is 100 zA/μm or less. In addition, a storage capacitor and a transistor were connected to each other and off-state current was measured using a circuit in which charge flowing to or from the storage capacitor is controlled by the transistor. In the measurement, a highly-purified oxide semiconductor film was used in the channel formation region of the transistor, and the off-state current of the transistor was measured from a change in the amount of charge of the storage capacitor per unit hour. As a result, it is found that in the case where the voltage between the source electrode and the drain electrode of the transistor is 3 V, lower off-state current of several tens of yoctoamperes per micrometer (yA/mm) can be obtained. Thus, the transistor including the highly purified oxide semiconductor film has a significantly low off-state current.

Figure 7:
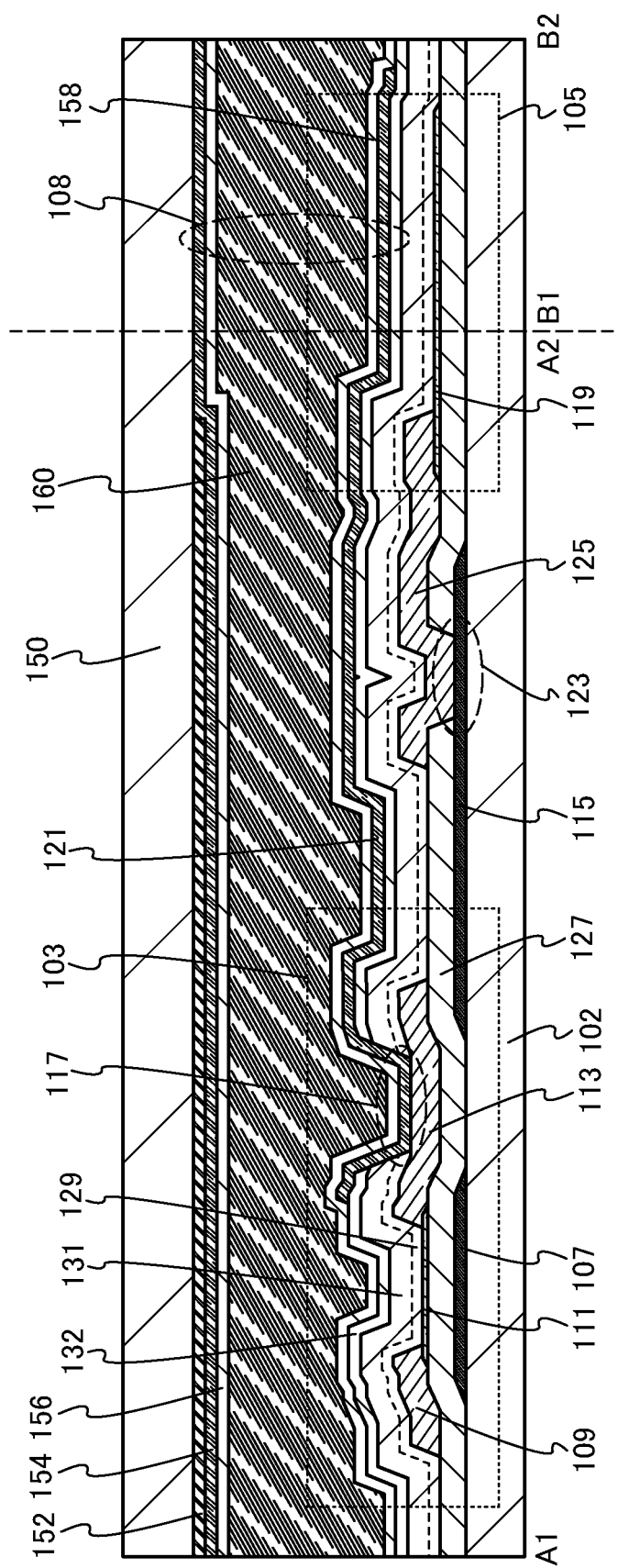
FIG. 7 is a cross-sectional view illustrating a pixel of the semiconductor device.

A cross-sectional view taken along dashed-dotted line A1-A2 and dashed-dotted line B1-B2 in FIG. 6 is illustrated in FIG. 7.

A cross-sectional structure along dashed-dotted line A1-A2 and dashed-dotted line B1-B2 is as follows. Over a substrate 102, the capacitor line 115 and the scan line 107 including a region functioning as the gate electrode are provided. A gate insulating film 127 is provided over the scan line 107. The oxide semiconductor film 111 is provided over a region of the gate insulating film 127, which overlaps with the scan line 107, and the oxide semiconductor film 119 is provided over the gate insulating film 127. The signal line 109 including a region functioning as the source electrode and the conductive film 113 including a region functioning as the drain electrode are each provided over the oxide semiconductor film 111 and the gate insulating film 127. The opening 123 reaching the capacitor line 115 is formed in part of the gate insulating film 127 in contact with the capacitor line 115, and the conductive film 125 is provided over the opening 123, the gate insulating film 127, and the oxide semiconductor film 119. An insulating film 129, an insulating film 131, and an insulating film 132 which function as protective insulating films of the transistor 103 are provided over the gate insulating film 127, the signal line 109, the oxide semiconductor film 111, the conductive film 113, the conductive film 125, and the oxide semiconductor film 119. The opening 117 reaching the conductive film 113 is provided in the insulating films 129, 131, and 132, and the pixel electrode 121 is provided in and over the opening 117. Note that a base insulating film may be provided between the substrate 102, and the scan line 107, the capacitor line 115, and the gate insulating film 127.

The cross-sectional structure of the liquid crystal element 108 is as follows. A light-blocking film 152 is provided on a surface of a substrate 150, which faces the substrate 102 to overlap with at least the transistor 103. A counter electrode 154 which is a light-transmitting conductive film is provided to cover the light-blocking film 152, and an alignment film 156 is provided to cover the counter electrode 154. An alignment film 158 is provided over the pixel electrode 121 and the insulating film 132. On the substrate 102 side, the alignment film 158 is provided over the insulating film 132 and the pixel electrode 121. A liquid crystal 160 is provided in contact with the alignment film 156 and the alignment film 158, and is sandwiched between the substrate 102 and the substrate 150.

Note that in the case where the semiconductor device of one embodiment of the present invention is a liquid crystal display device, a light source such as a backlight; an optical member (an optical substrate) such as a polarizing plate, which is provided on the substrate 102 side and the substrate 150 side; a sealant for fixing the substrate 102 and the substrate 150; and the like are needed. These components will be described later.

As described above, in the storage capacitor 105 described in this embodiment, the oxide semiconductor film 119 serves as one of a pair of electrodes, the pixel electrode 121 serves as the other of the pair of electrodes, and the insulating films 129, 131, and 132 serve as a dielectric film provided between the pair of electrodes.

The details of the components of the above-described cross-sectional structure are described below.

There is no particular limitation on the property of a material and the like of the substrate 102 as long as the material has heat resistance enough to withstand at least heat treatment performed in a formation process of the semiconductor device. Examples of the substrate are a glass substrate, a ceramic substrate, and a plastic substrate, and as the glass substrate, an alkali-free glass substrate such as a barium borosilicate glass substrate, an aluminoborosilicate glass substrate, or an aluminosilicate glass substrate is favorably used. Alternatively, a non-light-transmitting substrate such as a stainless alloy substrate may be used. In that case, a surface of the substrate is preferably provided with an insulating film. As the substrate 102, any of the following may alternatively be used: a quartz substrate, a sapphire substrate, a single crystal semiconductor substrate, a polycrystalline semiconductor substrate, a compound semiconductor substrate, a silicon on insulator (SOI) substrate, and the like. In the case where the semiconductor device of one embodiment of the present invention is a transmissive liquid crystal display device, a light-transmitting substrate is used as the substrate 102.

The scan line 107 and the capacitor line 115 are preferably formed to have a single-layer structure or a stacked-layer structure using a metal film, typically any of metal materials such as molybdenum (Mo), titanium (Ti), tungsten (W), tantalum (Ta), aluminum (Al), copper (Cu), chromium (Cr), neodymium (Nd), or scandium (Sc), or an alloy material which contains any of these materials as its main component.

Examples of the scan line 107 and the capacitor line 115 are a single-layer structure using aluminum containing silicon, a two-layer structure in which titanium is stacked over aluminum, a two-layer structure in which titanium is stacked over titanium nitride, a two-layer structure in which tungsten is stacked over titanium nitride, a two-layer structure in which tungsten is stacked over tantalum nitride, a two-layer structure in which copper is stacked over a copper-magnesium-aluminum alloy, and a three-layer structure in which titanium nitride, copper, and tungsten are stacked in this order.

As a material of the scan line 107 and the capacitor line 115, a light-transmitting conductive material which can be used for the pixel electrode 121 can be used. Note that in the case where the semiconductor device of one embodiment of the present invention is a reflective display device, a non-light-transmitting conductive material (e.g., a metal material) can be used for the pixel electrode 121. In that case, similarly, a non-light-transmitting substrate can be used as the substrate 102.

Further, as the material of the scan line 107 and the capacitor line 115, a metal oxide containing nitrogen, specifically, an In—Ga—Zn-based oxide containing nitrogen, an In—Sn-based oxide containing nitrogen, an In—Ga-based oxide containing nitrogen, an In—Zn-based oxide containing nitrogen, a Sn-based oxide containing nitrogen, an In-based oxide containing nitrogen, or a metal nitride (InN, SnN, or the like) film can be used. These materials each have a work function higher than or equal to 5 eV (electron volts). The use of a metal oxide containing nitrogen for the scan line (the gate electrode) allows the threshold voltage of the transistor 103 to be shifted in the positive direction, i.e., the transistor can have normally-off characteristics.

The scan line 107 and the capacitor line 115 are preferably formed using aluminum or copper, which are a low resistance material. With the use of aluminum or copper, signal delay is reduced, so that higher image quality can be achieved. Note that aluminum has low heat resistance; therefore, defects due to a hillock, a whisker, or migration tend to be caused. In order to prevent migration of aluminum, a layer of a metal material having a higher melting point than aluminum, such as molybdenum, titanium, or tungsten, is preferably stacked over an aluminum layer. Also in the case where copper is used, in order to prevent defects due to migration and diffusion of copper elements, a layer of a metal material having a higher melting point than copper, such as molybdenum, titanium, or tungsten, is preferably stacked over a copper layer.

As illustrated in FIG. 6 and FIG. 7, the scan line 107 is preferably provided so that the oxide semiconductor film 111 can be provided in a region overlapping with the scan line 107. It is preferable that the scan line 107 protrude to a region where the oxide semiconductor film 111 is provided and that the oxide semiconductor film 111 be provided in the region overlapping with the scan line 107, as illustrated in FIG. 6. In this manner, light entering from a surface (the rear surface) of the substrate 102, which is opposite to a surface provided with the scan line 107, (in a liquid crystal display device, such light corresponds to light from a light source such as a backlight) is shielded by the scan line 107; thus, a change or degradation of the electrical characteristics of the transistor 103 (e.g., threshold voltage) can be suppressed.

The gate insulating film 127 is formed to have a single-layer structure or a stacked-layer structure using, for example, any of insulating materials such as silicon oxide, silicon oxynitride, silicon nitride oxide, silicon nitride, aluminum oxide, hafnium oxide, gallium oxide, and a Ga—Zn-based metal oxide. Note that in order to improve the characteristics of the interface between the gate insulating film 127 and the oxide semiconductor film 111, a region of the gate insulating film 127 which is in contact with at least the oxide semiconductor film 111 preferably includes an oxide insulating film.

It is possible to prevent outward diffusion of oxygen contained in the oxide semiconductor film 111 and entry of hydrogen, water, or the like into the oxide semiconductor film 111 from the outside by providing an insulating film having a barrier property against oxygen, hydrogen, water, and the like for the gate insulating film 127. As for the insulating film having a barrier property against oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, and a silicon nitride film can be given as examples.

The gate insulating film 127 may be formed using a high-k material such as hafnium silicate ($HfSiO_x$), hafnium aluminate ($HfAlO_x$), hafnium silicate containing nitrogen, hafnium aluminate containing nitrogen, hafnium oxide, or yttrium oxide, so that gate leakage current of the transistor 103 can be reduced.

The gate insulating film 127 preferably has the following stacked-layer structure. In the structure, a silicon nitride film having fewer defects is provided as a first silicon nitride film, a silicon nitride film from which less hydrogen and ammonia are released is provided as a second silicon nitride film over the first silicon nitride film, and any of oxide insulating films which can be used as the gate insulating film 127 is provided over the second silicon nitride film.

As the second silicon nitride film, a nitride insulating film which releases hydrogen molecules less than $5\times10^{21}$ molecules/cm$^3$, preferably less than or equal to $3\times10^{21}$ molecules/cm$^3$, further preferably less than or equal to $1\times10^{21}$ molecules/cm$^3$, and ammonia molecules less than $1\times10^{22}$ molecules/cm$^3$, preferably less than or equal to $5\times10^{21}$ molecules/cm$^3$, further preferably less than or equal to $1\times10^{21}$ molecules/cm$^3$ by thermal desorption spectroscopy is preferably used. The first silicon nitride film and the second silicon nitride film are used as part of the gate insulating film 127, whereby a gate insulating film which has fewer defects and from which less hydrogen and ammonia are released can be formed as the gate insulating film 127. Accordingly, it is possible to reduce the amount of hydrogen and nitrogen in the gate insulating film 127, which are transferred to the oxide semiconductor film 111.

In the case where the trap level (also referred to as interface state) is present at the interface between an oxide semiconductor film and a gate insulating film or in the gate insulating film in a transistor including an oxide semiconductor, a change of the threshold voltage typified by a shift of the threshold voltage in the negative direction in the transistor and an increase in the subthreshold swing (S value) showing a gate voltage needed for changing the drain current by one digit when the transistor is turned on are caused. Thus, there is a problem in that electrical characteristics are changed among the transistors. For this reason, when, as the gate insulating film 127, the silicon nitride film having fewer defects is used, and the oxide insulating film is provided in a region of the gate insulating film 127 which is in contact with the oxide semiconductor film 111, a negative shift of the threshold voltage and an increase of an S value can be suppressed.

The thickness of the gate insulating film 127 is greater than or equal to 5 nm and less than or equal to 400 nm, preferably greater than or equal to 10 nm and less than or equal to 300 nm, further preferably greater than or equal to 50 nm and less than or equal to 250 nm.

The oxide semiconductor film 111 can have a single crystal structure or a non-single-crystal structure. The thickness of the oxide semiconductor film 111 is greater than or equal to 1 nm and less than or equal to 100 nm, preferably greater than or equal to 1 nm and less than or equal to 50 nm, further preferably greater than or equal to 1 nm and less than or equal to 30 nm, still further preferably greater than or equal to 3 nm and less than or equal to 20 nm.

Further, an oxide semiconductor which can be used for the oxide semiconductor film 111 has an energy gap of greater than or equal to 2 eV, preferably greater than or equal to 2.5 eV, further preferably greater than or equal to 3 eV. The use of such an oxide semiconductor having a wide energy gap can reduce the off-state current of the transistor 103.

An oxide semiconductor containing at least indium (In) or zinc (Zn) is preferably used for the oxide semiconductor film 111. Alternatively, the oxide semiconductor preferably contains both In and Zn. To reduce changes in electric characteristics of the transistors including the oxide semiconductor, the oxide semiconductor preferably contains one or more of stabilizers in addition to In and Zn.

As for stabilizers, gallium (Ga), tin (Sn), hafnium (Hf), aluminum (Al), and zirconium (Zr) can be given as examples. As another stabilizer, lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) can be given as examples.

For the oxide semiconductor that can be used for the oxide semiconductor film 111, the following can be used, for example: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide, an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, or the like.

Here, an "In—Ga—Zn-based oxide" means an oxide containing In, Ga, and Zn as its main components and there is no particular limitation on the ratio of In to Ga and Zn. The In—Ga—Z-based oxide may contain another metal element in addition to In, Ga, and Zn.

Alternatively, a material represented by $InMO_3(ZnO)_m$ (m>0) may be used as an oxide semiconductor. Note that M represents one or more metal elements selected from Ga, Fe, Mn, and Co, or the above element as a stabilizer.

For example, an In—Ga—Zn-based metal oxide with an atomic ratio of In to Ga and Zn being 1:1:1 (=1/3:1/3:1/3), 2:2:1 (=2/5:2/5:1/5), or 3:1:2 (=1/2:1/6:1/3) can be used. Alternatively, an In—Sn—Zn-based metal oxide with an atomic ratio of In to Sn and Zn being 1:1:1 (=1/3:1/3:1/3), 2:1:3 (=1/3:1/6:1/2), or 2:1:5 (=1/4:1/8:5/8) may be used. Note that the proportion of each atom in the atomic ratio of the metal oxide varies within a range of ±20% as an error.

However, the atomic ratio is not limited to those described above, and a material having the appropriate atomic ratio may be used depending on needed semiconductor characteristics and electrical characteristics (e.g., field-effect mobility and threshold voltage). In order to obtain needed semiconductor characteristics, it is preferable that the carrier density, the impurity concentration, the defect density, the atomic ratio of a metal element to oxygen, the interatomic distance, the density, and the like be set to be appropriate. For example, with an In—Sn—Zn-based oxide, a high field-effect mobility can be obtained with relative ease. Also in the case of using an In—Ga—Zn-based oxide, field-effect mobility can be increased by reducing the defect density in a bulk.

For the oxide semiconductor film 119, an oxide semiconductor which can be used for the oxide semiconductor film 111 can be used. Since the oxide semiconductor film 119 can be formed concurrently with the oxide semiconductor film 111, the oxide semiconductor film 119 contains a metal element of an oxide semiconductor included in the oxide semiconductor film 111.

In the case where the oxide semiconductor film 119 is an oxide semiconductor film including a region having increased carrier density and conductivity, the conductivity of the oxide semiconductor film 119 is higher than or equal to 10 S/cm and lower than or equal to 1000 S/cm, preferably higher than or equal to 100 S/cm and lower than or equal to 1000 S/cm.

As the oxide semiconductor film having the above conductivity, an oxide semiconductor film containing an element (dopant) which increases conductivity can be given as an example. Specifically, the oxide semiconductor film contains one or more elements selected from hydrogen, boron, nitrogen, fluorine, aluminum, phosphorus, arsenic, indium, tin, antimony, and a rare gas element as the dopant. Moreover, the concentration of the dopant contained in the oxide semiconductor film is preferably higher than or equal to $1 \times 10^{19}$ atoms/cm$^3$ and lower than or equal to $1 \times 10^{22}$ atoms/cm$^3$ to achieve the above conductivity.

As described above, the oxide semiconductor film 119 which is an oxide semiconductor film including a region having increased carrier density and conductivity can sufficiently function as one electrode of the storage capacitor 105. Note that in that case, it can be said that the oxide semiconductor film 119 is an oxide semiconductor film which has n-type conductivity because it includes the above element (dopant).

The insulating films 129, 131, and 132 which serve as the protective insulating films of the transistor 103 and as the dielectric film of the storage capacitor 105 are insulating films each formed using a material which can be used for the gate insulating film 127. It is particularly preferable that the insulating films 129 and 131 be oxide insulating films and the insulating film 132 be a nitride insulating film. Further, the use of a nitride insulating film as the insulating film 132 can suppress entry of impurities such as hydrogen and water into the transistor 103 (in particular, the oxide semiconductor film 111) from the outside. Note that the insulating film 129 is not necessarily provided.

In addition, one or both of the insulating film 129 and the insulating film 131 are each preferably an oxide insulating film which contains oxygen at a higher proportion than oxygen in the stoichiometric composition. In that case, oxygen can be prevented from being released from the oxide semiconductor film 111, and the oxygen contained in an oxygen excess region can be transferred to the oxide semiconductor film 111 to compensate oxygen vacancies. For example, the oxygen vacancies in the oxide semiconductor film 111 can be compensated by using an oxide insulating film having the following feature: the amount of oxygen released from the oxide insulating film by heat treatment at a temperature higher than or equal to 100° C. and lower or equal to 700° C., preferably higher than or equal to 100° C. and lower than or equal to 500° C. is greater than or equal to $1.0 \times 10^{18}$ molecules/cm$^3$ when measured by thermal desorption spectroscopy (hereinafter referred to as TDS). Note that an oxide insulating film partly including a region which contains oxygen at a higher proportion than oxygen in the stoichiometric composition (oxygen excess region) may be used as one or both of the insulating film 129 and the insulating film 131. When such an oxygen excess region is present in a region overlapping with at least the oxide semiconductor film 111, oxygen is prevented from being released from the oxide semiconductor film 111 and the oxygen contained in the oxygen excess region can be transferred to the oxide semiconductor film 111 to compensate oxygen vacancies.

In the case where the insulating film 131 is an oxide insulating film which contains oxygen at a higher proportion than oxygen in the stoichiometric composition, the insulating film 129 is preferably an oxide insulating film which transmits oxygen. Oxygen which enters the insulating film 129 from the outside does not completely penetrate through the insulating film 129 to be released and part thereof remains in the insulating film 129. Further, there is oxygen which is contained in the insulating film 129 in advance and is released from the insulating film 129 to the outside. Thus, the insulating film 129 is preferably an oxide insulating film having a high diffusion coefficient of oxygen.

Since the insulating film 129 is in contact with the oxide semiconductor film 111, the insulating film 129 is preferably an oxide insulating film which transmits oxygen and which is capable of reducing the interface state density with the oxide semiconductor film 111. For example, the insulating film 129 is preferably an oxide insulating film having a lower defect density than the insulating film 131. Specifically, the spin density of the oxide insulating film at a g-value of 2.001 (F-center) measured by electron spin resonance spectroscopy is lower than or equal to $3.0 \times 10^{17}$ spins/cm$^3$, preferably lower than or equal to $5.0 \times 10^{16}$ spins/cm$^3$. The spin density at a g-value of 2.001 measured by electron spin resonance spectroscopy corresponds to the number of dangling bonds in the insulating film 129.

The thickness of the insulating film 129 can be greater than or equal to 5 nm and less than or equal to 150 nm, preferably greater than or equal to 5 nm and less than or equal to 50 nm, further preferably greater than or equal to 10 nm and less than or equal to 30 nm. The thickness of the insulating film 131 can be greater than or equal to 30 nm and less than or equal to 500 nm, preferably greater than or equal to 150 nm and less than or equal to 400 nm.

When an oxide insulating film which transmits oxygen and which is capable of reducing the interface state density with the oxide semiconductor film 111 is used as the insulating film 129 provided over the oxide semiconductor film 111, and an oxide insulating film which includes an oxygen excess region or an oxide insulating film which contains oxygen at a higher proportion than oxygen in the stoichiometric composition is used as the insulating film 131, oxygen can be easily supplied to the oxide semiconductor film 111, the release of oxygen from the oxide semiconductor film 111 can be prevented, and the oxygen contained in the insulating film 131 can be transferred to the oxide semiconductor film 111 to compensate the oxygen vacancies in the oxide semiconductor film 111. Thus, the transistor 103 can be prevented from being normally-on.

In the case where a nitrogen-containing oxide insulating film, such as a silicon oxynitride film or a silicon nitride oxide film, is used as one or both of the insulating film 129 and the insulating film 131, the nitrogen concentration which is measured by SIMS is higher than or equal to the lower limit of measurement by SIMS and lower than $3 \times 10^{20}$ atoms/cm$^3$, preferably higher than or equal to $1 \times 10^{18}$ atoms/cm$^3$ and lower than or equal to $1 \times 10^{20}$ atoms/cm$^3$. In that case, the amount of nitrogen transferred to the oxide semiconductor film 111 in the transistor 103 can be reduced and the number of defects in the nitrogen-containing oxide insulating film itself can be reduced.

In the case where a nitride insulating film is used as the insulating film 132, an insulating film having a barrier property against nitrogen is preferably used as one or both of the insulating film 129 and the insulating film 131. For example, a dense oxide insulating film has a barrier property against nitrogen. Specifically, an oxide insulating film which can be etched at a rate of less than or equal to 10 nm per minute when the temperature is 25° C. and 0.5 wt % of fluoric acid is used is preferably used.

As the insulating film 132, a nitride insulating film with a low hydrogen content can be provided. The nitride insulating film is as follows, for example: the amount of hydrogen released from the nitride insulating film is less than $5.0 \times 10^{21}$ atoms/cm$^3$, preferably less than $3.0 \times 10^{21}$ atoms/cm$^3$, and further preferably less than $1.0 \times 10^{21}$ atoms/cm$^3$ when measured by TDS spectroscopy.

Further, the nitride insulating film has excellent step coverage and thus it can be advantageously used as a protective insulating film of the transistor 103.

The insulating film 132 has a thickness large enough to prevent entry of impurities such as hydrogen and water from the outside. For example, the thickness can be greater than or equal to 50 nm and less than or equal to 200 nm, preferably greater than or equal to 50 nm and less than or equal to 150 nm, further preferably greater than or equal to 50 nm and less than or equal to 100 nm.

The use of a nitride insulating film as the insulating film 132 over the insulating film 131 can suppress entry of impurities such as hydrogen and water into the oxide semiconductor film 111 from the outside. Moreover, the use of a nitride insulating film with a low hydrogen content as the insulating film 132 can suppress changes in electrical characteristics of the transistor 103.

Alternatively, a silicon oxide film formed by a CVD method using an organosilane gas may be provided between the insulating film 131 and the insulating film 132. The silicon oxide film has excellent step coverage and thus it can be advantageously used as a protective insulating film of the transistor 103. The silicon oxide film can be formed to a thickness greater than or equal to 300 nm and less than or equal to 600 nm. As the organosilane gas, any of the following silicon-containing compound can be used: tetraethyl orthosilicate (TEOS) (chemical formula: Si(OC$_2$H$_5$)$_4$); tetramethylsilane (TMS) (chemical formula: Si(CH$_3$)$_4$); tetramethylcyclotetrasiloxane (TMCTS); octamethylcyclotetrasiloxane (OMCTS); hexamethyldisilazane (HMDS); triethoxysilane (SiH(OC$_2$H$_5$)$_3$); trisdimethylaminosilane (SiH(N(CH$_3$)$_2$)$_3$); or the like.

The pixel electrode 121 can be provided using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

For the substrate 150, a material which can be used for the substrate 102 can be used.

The light-blocking film 152 is also referred to as a black matrix and is provided in a liquid crystal display device to suppress leakage of light of a light source such as a backlight or suppress contrast reduction due to mixing of colors when color display is performed using a color filter, for example. A general-purpose light-blocking film can be used as the light-blocking film 152. A metal and an organic resin including a pigment can be given as examples of a light-blocking material. Alternatively, the light-blocking film 152 may be provided in a region outside the pixel portion 100, such as over the scan line driver circuit 104 and over the signal line driver circuit 106 (see FIG. 1A), as well as in a region which overlaps with the transistor 103.

Further, a coloring film which transmits light with a predetermined wavelength may be provided between light-blocking films provided in each pixel in the pixel portion 100. In addition, an overcoat film may be provided between the counter electrode, and the light-blocking films and the coloring film.

For the counter electrode 154, materials which can be used for the pixel electrode 121 can be used as appropriate.

The alignment films 156 and 158 can be formed using a general-purpose material such as polyamide.

For the liquid crystal 160, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, a liquid crystal exhibiting a blue phase for which an alignment film is unnecessary may be used for the liquid crystal 160. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed is used in order to improve the temperature range. Note that a material of the alignment film is an organic resin, which contains hydrogen, water, or the like; therefore, the electrical characteristics of the transistor in the semiconductor device of one embodiment of the present invention might be degraded. In view of the above, the use of liquid crystal which exhibits a blue phase for the liquid crystal 160 enables manufacture of the semiconductor device of one embodiment of the present invention without an organic resin, so that the semiconductor device can be highly reliable.

Note that the structure of the liquid crystal element 108 can be changed as appropriate, as follows, in accordance with the display mode of the liquid crystal element 108: the shapes of the pixel electrode 121 and the counter electrode 154 are changed, or a protrusion referred to as a rib is formed.

Further, in the semiconductor device of one embodiment of the present invention, the aperture ratio of a pixel can be improved even in the case where the size of one pixel is small as in a display device having high pixel density. Further, the aperture ratio can be further improved by using the light-transmitting storage capacitor.

<Manufacturing Method of Semiconductor Device>

Next, a method for manufacturing the above semiconductor device is described with reference to FIGS. 8A and 8B and FIGS. 9A and 9B.

First, the scan line 107 and the capacitor line 115 are formed over the substrate 102. An insulating film 126 which is to be processed into the gate insulating film 127 later is formed so as to cover the scan line 107 and the capacitor line 115. The oxide semiconductor film 111 is formed over a portion of the insulating film 126 which overlaps with the scan line 107. The oxide semiconductor film 119 is formed so as to overlap with a region where the pixel electrode 121 is to be formed later (see FIG. 8A).

The scan line 107 and the capacitor line 115 can be formed in such a manner that a conductive film is formed using any of the materials given above, a mask is formed over the conductive film, and the conductive film is processed using the mask. The conductive film can be formed by any of a variety of deposition methods such as an evaporation method, a CVD method, a sputtering method, and a spin coating method. Nota that there is no particular limitation on the thickness of the conductive film, and the thickness of the conductive film can be determined in consideration of time needed for the formation, desired resistivity, or the like. As the mask, a resist mask formed through a photolithography process can be used, for example. The conductive film can be processed by one or both of dry etching and wet etching.

The insulating film 126 can be formed using a material which can be used for the gate insulating film 127, by any of a variety of deposition methods such as a CVD method and a sputtering method. In the case where gallium oxide is used for the gate insulating film 127, the insulating film 126 can be formed by a metal organic chemical vapor deposition (MOCVD) method.

The oxide semiconductor film 111 and the oxide semiconductor film 119 can be formed in such a manner that any of the oxide semiconductor films given above is formed, a mask is formed over the oxide semiconductor film, and the oxide semiconductor film is processed using the mask. The oxide semiconductor film can be formed by a sputtering method, a coating method, a pulsed laser deposition method, a laser ablation method, or the like. By employing a printing method, the oxide semiconductor films 111 and 119 subjected to element isolation can be formed directly on the gate insulating film 127. In the case where the oxide semiconductor film is formed by a sputtering method, an RF power supply device, an AC power supply device, a DC power supply device, or the like can be used as appropriate as a power supply device for generating plasma. As a sputtering gas, a rare gas (typically argon), oxygen, or a mixed gas of a rare gas and oxygen is used as appropriate. In the case of using the mixed gas of a rare gas and oxygen, the proportion of oxygen is preferably higher than that of a rare gas. Further, a target may be selected as appropriate in accordance with the composition of the oxide semiconductor film to be formed. As the mask, a resist mask formed through a photolithography process can be used, for example. The oxide semiconductor film can be processed by one or both of dry etching and wet etching. The etching conditions (e.g., an etching gas or an etching solution, etching time, and temperature) are set as appropriate depending on the material so that the oxide semiconductor films 111 and 119 can be etched to have a desired shape.

Heat treatment is preferably performed after the formation of the oxide semiconductor films 111 and 119 to dehydrate or dehydrogenate the oxide semiconductor films 111 and 119. The temperature of the heat treatment is typically higher than or equal to 150° C. and lower than the strain point of the substrate, preferably higher than or equal to 200° C. and lower than or equal to 450° C., further preferably higher than or equal to 300° C. and lower than or equal to 450° C. Note that the heat treatment may be performed on the oxide semiconductor film which has not been processed into the oxide semiconductor films 111 and 119.

In the heat treatment, a heat treatment apparatus is not limited to an electric furnace; the heat treatment apparatus can be an apparatus that heats an object using thermal conduction or thermal radiation given by a medium such as a heated gas or the like. For example, an RTA (rapid thermal annealing) apparatus such as a GRTA (gas rapid thermal annealing) apparatus or an LRTA (lamp rapid thermal annealing) apparatus can be used. The LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. The GRTA apparatus is an apparatus for heat treatment using a high-temperature gas.

The heat treatment may be performed in an atmosphere of nitrogen, oxygen, ultra-dry air (air in which the water content is 20 ppm or less, preferably 1 ppm or less, further preferably 10 ppb or less), or a rare gas (argon, helium, or the like). The atmosphere of nitrogen, oxygen, or a rare gas preferably does not contain hydrogen, water, and the like. Alternatively, the heat treatment may be performed under an inert gas atmosphere first, and then under an oxygen atmosphere. Note that the treatment time is from 3 minutes to 24 hours.

In the case where a base insulating film is provided between the substrate 102, and the scan line 107, the capacitor line 115, and the gate insulating film 127, the base insulating film can be formed using any of silicon oxide, silicon oxynitride, silicon nitride, silicon nitride oxide, gallium oxide, hafnium oxide, yttrium oxide, aluminum oxide, aluminum oxynitride, and the like. Note that when a film of silicon nitride, gallium oxide, hafnium oxide, yttrium oxide, aluminum oxide, or the like is used as the base insulating film, it is possible to suppress diffusion of impurities, typically an alkali metal, water, and hydrogen into the oxide semiconductor film 111 from the substrate 102. The base insulating film can be formed by a sputtering method or a CVD method.

In the case where the oxide semiconductor film 119 is an oxide semiconductor film including a region having increased carrier density and conductivity, a step of adding the dopant given above to the oxide semiconductor film 119 is performed.

A method of adding a dopant to the oxide semiconductor film 119 is as follows: a mask is provided in a region except the oxide semiconductor film 119 and one or more dopants selected from hydrogen, boron, nitrogen, fluorine, aluminum, phosphorus, arsenic, indium, tin, antimony, and a rare gas element is added to the oxide semiconductor film 119 by an ion implantation method, an ion doping method, or the like. Alternatively, the oxide semiconductor film 119 may be exposed to plasma containing the dopant to add the dopant to the oxide semiconductor film 119, instead of employing an ion implantation method or an ion doping method. Heat treatment may be performed after the dopant is added to the oxide semiconductor film 119. The heat treatment can be performed as appropriate with reference to the details of the above heat treatment for dehydration or dehydrogenation of the oxide semiconductor films 111 and 119.

Note that the step of adding the dopant may be performed after the formation of the signal line 109 and the conductive film 113, which will be performed later.

In the case where the oxide semiconductor film 119 is an oxide semiconductor film including a region having increased carrier density and conductivity, the oxide semiconductor film 119 may be irradiated with electromagnetic waves such as visible light, ultraviolet light, or X-rays instead of addition of the dopant given above. Note that it is preferable that the oxide semiconductor film 111 of the transistor 103 be not irradiated with the electromagnetic waves, and it is preferable to emit electromagnetic waves from the rear side of the substrate 102 over which the transistor 103 is provided in such a manner that the gate electrode is provided to have a larger region than the oxide semiconductor film 111 in the plane view of the transistor 103. Alternatively, in the case where electromagnetic waves are emitted from the surface of the substrate 102 over which the transistor 103 is provided, a mask which blocks the electromagnetic waves is provided in a region where the transistor 103 is provided.

Further, in the case where the oxide semiconductor film 119 is an oxide semiconductor film including a region having increased carrier density (n-type conductivity) and conductivity, the oxide semiconductor film 119 functions as one electrode of the storage capacitor 105. Thus, the threshold voltage of the storage capacitor 105 having a MOS capacitor structure can be shifted in the negative direction; accordingly, the storage capacitor 105 can be stably operated with time.

In the case where the oxide semiconductor film 111 is an In—Ga—Zn-based oxide with an atomic ratio of In to Ga and Zn being 1:1:1, the oxide semiconductor film 111 has an optical band gap of 3.15 eV. When the oxide semiconductor film 119 has n-type conductivity, the optical band gap of the oxide semiconductor film 119 can be, for example, 2.4 eV or more and 3.1 eV or less or 2.6 eV or more and 3.0 eV or less. Further, indium tin oxide used for the pixel electrode 121 or the like has an optical band gap of 3.7 eV or more and 3.9 eV or less. Accordingly, the highest energy visible light (e.g., a wavelength of 420 nm or less) and ultraviolet light which pass through the pixel electrode 121 can be absorbed in the oxide semiconductor film 119. Since an adverse effect of the highest energy visible light and ultraviolet light on eyes has been concerned, it can be said that the semiconductor device including the oxide semiconductor film 119 having n-type conductivity in the pixel 101 is an eye-friendly device. Note that the oxide semiconductor film 119 having n-type conductivity does not need to overlap with all the area of the pixel 101. The highest energy visible light and ultraviolet light can be absorbed when the oxide semiconductor film 119 having n-type conductivity overlaps at least with part of the pixel 101.

After the formation of an opening 123 reaching the capacitor line 115 in the insulating film 126 to form the gate insulating film 127, the signal line 109 including the source electrode of the transistor 103, the conductive film 113 including the drain electrode of the transistor 103, and the conductive film 125 which electrically connects the oxide semiconductor film 119 and the capacitor line 115 are formed (see FIG. 8B).

The signal line 109 and the conductive film 113 can be formed in such a manner that a conductive film is formed using a material which can be used for the signal line 109 and the conductive film 113, a mask is formed over the conductive film, and the conductive film is processed using the mask. The formation of the mask and the processing with the mask can be performed in manners similar to those of the scan line 107 and the capacitor line 115. Note that a surface of the oxide semiconductor film 111 is cleaned after the formation of the signal line 109 and the conductive film 113, so that changes in electrical characteristics of the transistor 103 can be reduced. For example, a diluted phosphoric acid solution can be used; specifically, a phosphoric acid solution in which 85% phosphoric acid is diluted with water by 100 times can be used.

Then, an insulating film 128 is formed over the oxide semiconductor film 111, the oxide semiconductor film 119, the signal line 109, the conductive film 113, and the gate insulating film 127, an insulating film 130 is formed over the insulating film 128, and an insulating film 133 is formed over the insulating film 130 (see FIG. 9A). The insulating film 128, the insulating film 130, and the insulating film 133 are preferably formed successively, in which case entry of impurities into each interface can be suppressed.

The insulating film 128 can be formed using a material which can be used for the insulating film 129 by any of a variety of deposition methods such as a CVD method and a sputtering method. The insulating film 130 can be formed using a material which can be used for the insulating film 131. The insulating film 133 can be formed using a material which can be used for the insulating film 132.

In the case where an oxide insulating film which is capable of reducing the interface state density between the oxide semiconductor film 111 and the oxide insulating film is used as the insulating film 129, the insulating film 128 can be formed under the following formation conditions. Here, as the oxide insulating film, a silicon oxide film or a silicon oxynitride film is formed. As for the formation conditions, the substrate placed in a treatment chamber of a plasma CVD apparatus, which is vacuum-evacuated, is held at a temperature higher than or equal to 180° C. and lower than or equal to 400° C., preferably higher than or equal to 200° C. and lower than or equal to 370° C., a deposition gas containing silicon and an oxidizing gas are introduced as a source gas into the treatment chamber, the pressure in the treatment chamber is greater than or equal to 20 Pa and less than or equal to 250 Pa, preferably greater than or equal to 40 Pa and less than or equal to 200 Pa, and high-frequency power is supplied to an electrode provided in the treatment chamber.

Typical examples of the deposition gas containing silicon include silane, disilane, trisilane, and silane fluoride. Examples of the oxidizing gas include oxygen, ozone, dinitrogen monoxide, and nitrogen dioxide.

By setting the ratio of the amount of the oxidizing gas to the amount of the deposition gas containing silicon 100 or higher, the hydrogen content of the insulating film 128 can be reduced and the number of dangling bonds in the insulating film 128 can be reduced. Oxygen transferred from the insulating film 130 is trapped by the dangling bonds in the insulating film 128 in some cases; thus, in the case where the dangling bonds in the insulating film 128 are reduced, oxygen in the insulating film 130 can be transferred to the oxide semiconductor film 111 efficiently to compensate the oxygen vacancies in the oxide semiconductor film 111. Note that the same applies to the insulating film 129 and the insulating film 131 formed by processing the insulating film 128 and the insulating film 130, respectively. As a result, the amount of hydrogen entering the oxide semiconductor film 111 can be reduced and the oxygen vacancies in the oxide semiconductor film 111 can be reduced.

In the case where the above oxide insulating film which includes an oxygen excess region or the above oxide insulating film which contains oxygen at a higher proportion than oxygen in the stoichiometric composition is used as the insulating film 130, the insulating film 130 can be formed under the following formation conditions. Here, as the oxide insulating film, a silicon oxide film or a silicon oxynitride film is formed. As for the formation conditions, the substrate placed in a treatment chamber of a plasma CVD apparatus, which is vacuum-evacuated, is held at a temperature higher than or equal to 180° C. and lower than or equal to 260° C., preferably higher than or equal to 180° C. and lower than or equal to 230° C., the pressure in the treatment chamber is greater than or equal to 100 Pa and less than or equal to 250 Pa, preferably greater than or equal to 100 Pa and less than or equal to 200 Pa with introduction of a source gas into the treatment chamber, and high-frequency power that is higher than or equal to 0.17 W/cm$^2$ and lower than or equal to 0.5 W/cm$^2$, preferably higher than or equal to 0.25 W/cm$^2$ and lower than or equal to 0.35 W/cm$^2$ is supplied to an electrode provided in the treatment chamber.

As the source gas of the insulating film 130, the source gas which can be used to form the insulating film 128 can be used.

Under the formation conditions of the insulating film 130, the high-frequency power having the above power density is supplied to the treatment chamber having the above pressure; accordingly, the decomposition efficiency of the source gas in plasma is increased, oxygen radicals are increased, and oxidation of the source gas proceeds, whereby the oxygen is contained in the insulating film 130 at a higher proportion than oxygen in the stoichiometric composition. However, in the case where the substrate temperature is within the above temperature range, the bond between silicon and oxygen is weak, and accordingly, part of oxygen is released by heating. Thus, it is possible to form an oxide insulating film which contains oxygen at a higher proportion than oxygen in the stoichiometric composition and from which part of oxygen is released by heating. Moreover, the insulating film 128 is provided over the oxide semiconductor film 111. Therefore, in the formation process of the insulating film 130, the insulating film 128 serves as a protective film of the oxide semiconductor film 111. Thus, even when the insulating film 130 is formed using the high-frequency power having a high power density, damage to the oxide semiconductor film 111 can be suppressed.

By increasing the thickness of the insulating film 130, a larger amount of oxygen is released by heating; thus, the insulating film 130 is preferably formed thicker than the insulating film 128. Since the insulating film 128 is provided, favorable coverage can be achieved even when the insulating film 130 is formed thick.

In the case where a nitride insulating film with a low hydrogen content is used as the insulating film 132, the insulating film 133 can be formed under the following formation conditions. Here, as the nitride insulating film, a silicon nitride film is formed. As for the formation conditions, the substrate placed in a treatment chamber of the plasma CVD apparatus, which is vacuum-evacuated, is held at a temperature higher than or equal to 80° C. and lower than or equal to 400° C., preferably higher than or equal to 200° C. and lower than or equal to 370° C., the pressure in the treatment chamber is greater than or equal to 100 Pa and less than or equal to 250 Pa, preferably greater than or equal to 100 Pa and less than or equal to 200 Pa with introduction of a source gas into the treatment chamber, and high-frequency power is supplied to an electrode provided in the treatment chamber.

As the source gas of the insulating film 133, a deposition gas containing silicon, nitrogen, and ammonia are preferably used. Typical examples of the deposition gas containing silicon include silane, disilane, trisilane, and silane fluoride. Further, the flow rate of nitrogen is preferably 5 times to 50 times that of ammonia, further preferably 10 times to 50 times that of ammonia. The use of ammonia as the source gas facilitates decomposition of nitrogen and the deposition gas containing silicon. This is because ammonia is dissociated by plasma energy or heat energy, and energy generated by the dissociation contributes to decomposition of a bond of the deposition gas molecules containing silicon and a bond of nitrogen molecules. Under the above conditions, a silicon nitride film which has a low hydrogen content and can suppress entry of impurities such as hydrogen and water from the outside can be formed.

In the case where a silicon oxide film formed using an organosilane gas by a CVD method is formed between the insulating film 131 and the insulating film 132, the silicon oxide film is formed using any of the organosilane gases given above by a CVD method over the insulating film 130.

It is preferable that heat treatment be performed at least after the formation of the insulating film 130 so that oxygen contained in the insulating film 128 or the insulating film 130 is transferred to at least the oxide semiconductor film 111 to compensate oxygen vacancies in the oxide semiconductor film 111. The heat treatment can be performed as appropriate with reference to the details of the heat treatment for dehydration or dehydrogenation of the oxide semiconductor films 111 and 119.

One of preferable formation processes of the transistor 103 is as follows: an oxide insulating film which contains oxygen at a higher proportion than oxygen in the stoichiometric composition and from which part of oxygen is released by heating is formed as the insulating film 130, the insulating film 130 is subjected to heat treatment at 350° C., a silicon oxide film is formed using any of the organosilane gases given above by a CVD method with the substrate temperature kept at 350° C., and a nitride insulating film in which the hydrogen content is low is formed as the insulating film 132 at a substrate temperature of 350° C.

Next, the opening 117 reaching the conductive film 113 is formed in a region of the insulating films 128, 130, and 133, which overlaps with the conductive film 113, so that the insulating films 129, 131, and 132 are formed (see FIG. 9B); and then the pixel electrode 121 is formed over the insulating film 132 and in and over the opening 117 (see FIG. 7).

The opening 117 can be formed in a manner similar to that of the opening 123. The pixel electrode 121 is formed in such a manner that a conductive film is formed using any of the materials given above in contact with the conductive film 113 through the opening 117, a mask is formed over the conductive film, and the conductive film is processed using the mask. The formation of the mask and the processing can be performed in manners similar to those of the scan line 107 and the capacitor line 115.

Next, the alignment film 158 is formed over the insulating film 132 and the pixel electrode 121, and the light-blocking film 152 is formed over the substrate 150. In addition, the counter electrode 154 is formed so as to cover the light-blocking film 152, and the alignment film 156 is formed over the counter electrode 154. The liquid crystal 160 is provided over the alignment film 158, the substrate 150 is provided above the substrate 102 so that the alignment film 156 is in contact with the liquid crystal 160, and the substrate 102 and the substrate 150 are fixed to each other with a sealant (not illustrated).

The alignment films 156 and 158 can be formed using the above material by any of a variety of deposition methods such as a spin coating method and a printing method.

The light-blocking film 152 can be formed by a sputtering method using any of the materials given above and can be processed using a mask.

The counter electrode 154 can be formed using the material which can be used for the pixel electrode 121 by any of a variety of deposition methods such as a CVD method and a sputtering method.

The liquid crystal 160 can be directly provided on the alignment film 158 by a dispenser method (a dropping method). Alternatively, the liquid crystal 160 may be injected by using capillary action or the like after the substrate 102 and the substrate 150 are attached to each other. Further, the alignment films 156 and 158 are preferably subjected to rubbing treatment so that alignment of the liquid crystal 160 is easily performed.

Through the above process, the semiconductor device of one embodiment of the present invention can be manufactured (see FIG. 7).

Modification Example 1

In the semiconductor device of one embodiment of the present invention, connection between the semiconductor film (specifically, the oxide semiconductor film 119) functioning as one electrode of the storage capacitor and the capacitor line can be changed as appropriate. For example, to improve the aperture ratio, a structure where the semiconductor film is in contact with the capacitor line without the conductive film provided therebetween can be employed. Specific examples of this structure is described with reference to FIG. 10 and FIG. 11.

Note that in the drawings illustrating modification examples below, the substrate 150, the light-blocking film 152, the counter electrode 154, the alignment films 156 and 158, and the liquid crystal 160 are omitted for simplicity of drawing. Further, in the drawings illustrating the modification examples, the reference numerals used in FIG. 6 or FIG. 7 are used as appropriate. In the modification examples below, only portions different from those in the structure illustrated in FIG. 6 and FIG. 7 are described.

Figure 10:
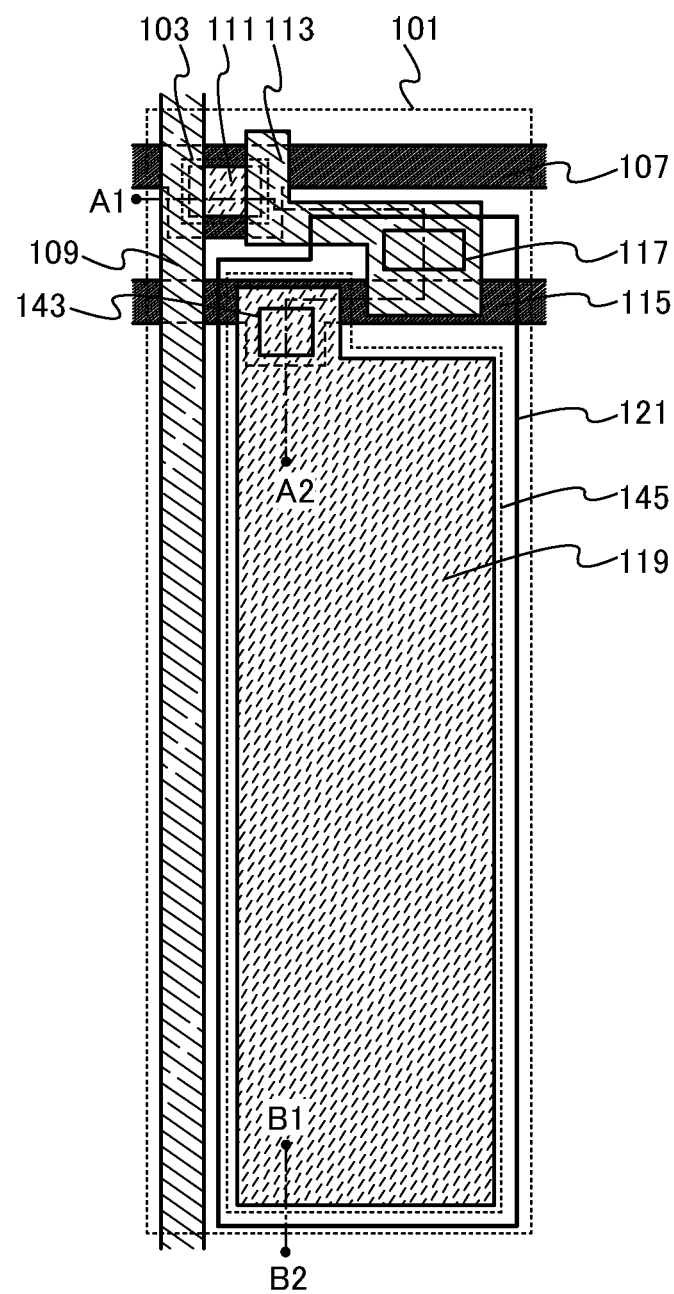
FIG. 10 is a top view illustrating a pixel of a semiconductor device.
Figure 11:
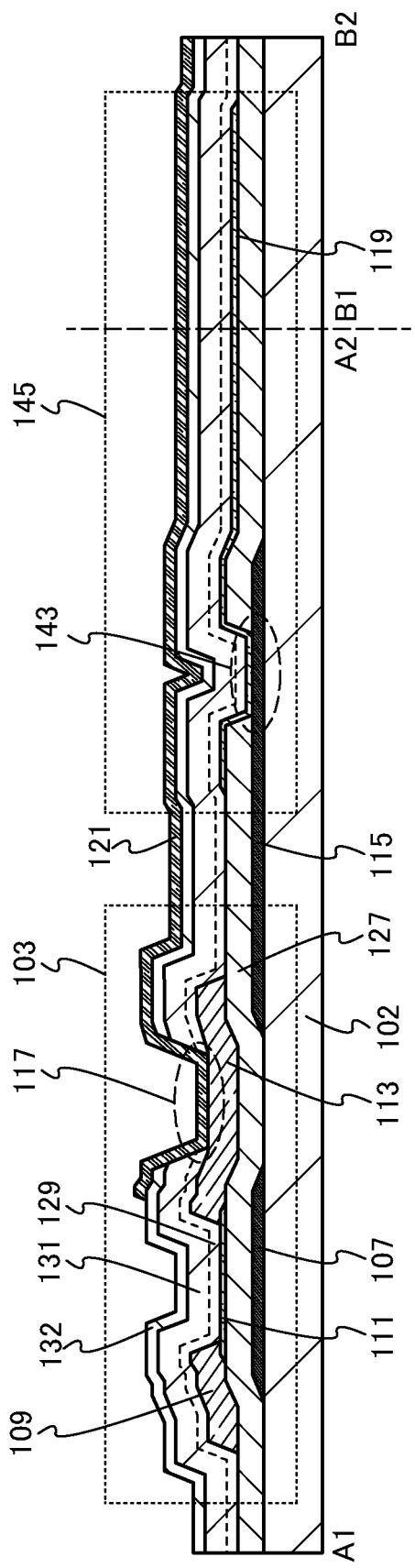
FIG. 11 is a cross-sectional view illustrating the pixel of the semiconductor device.

FIG. 10 is a top view of a pixel 101, and FIG. 11 is a cross-sectional view taken along dashed-dotted line A1-A2 and dashed-dotted line B1-B2 in FIG. 10.

In the pixel 101 in FIG. 10 and FIG. 11, an oxide semiconductor film 119 functioning as one electrode of a storage capacitor 145 is in direct contact with the capacitor line 115 through an opening 143. Unlike in the storage capacitor 105 in FIG. 6 and FIG. 7, the oxide semiconductor film 119 is in direct contact with the capacitor line 115 without the conductive film 125 provided therebetween and the conductive film 125 functioning as a light-blocking film is not formed, so that a higher aperture ratio of the pixel 101 can be achieved.

Figure 12:
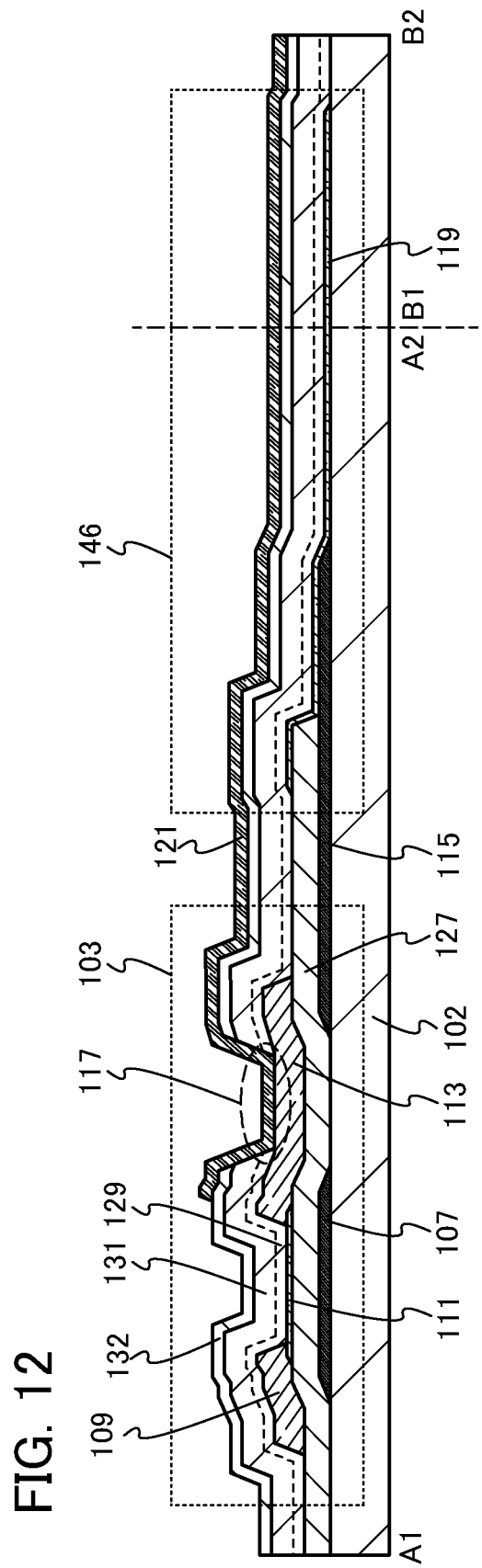
FIG. 12 is a cross-sectional view illustrating a pixel of the semiconductor device.

Although the opening 143 is formed only over the capacitor line 115 in FIG. 11, a gate insulating film 127 may be formed so as to expose part of the capacitor line 115 and part of the substrate 102 and an oxide semiconductor film 119 may be formed over the capacitor line 115 and the substrate 102 including the exposed parts as illustrated in FIG. 12, in order to increase the area where the oxide semiconductor film 119 is in contact with the capacitor line 115. Thus, the aperture ratio can be increased, the conductivity of the oxide semiconductor film 119 can be increased, and the oxide semiconductor film 119 can be brought into conduction easily; therefore, a storage capacitor 146 can function easily.

Modification Example 2

In the semiconductor device of one embodiment of the present invention, connection between the semiconductor film (specifically, the oxide semiconductor film 119) functioning as one electrode of the storage capacitor and the capacitor line can be changed as appropriate. For example, to reduce contact resistance between the semiconductor film and a conductive film, the conductive film can be provided in contact with the semiconductor film along the outer periphery thereof. Specific examples of this structure are described with reference to FIG. 13 and FIGS. 14A and 14B. Note that FIG. 13 is a top view of a pixel 101 in this structure, FIG. 14A is a cross-sectional view taken along dashed-dotted line A1-A2 and dashed-dotted line B1-B2 in FIG. 13, and FIG. 14B is a cross-sectional view taken along dashed-dotted line D1-D2 in FIG. 13.

Figure 13:
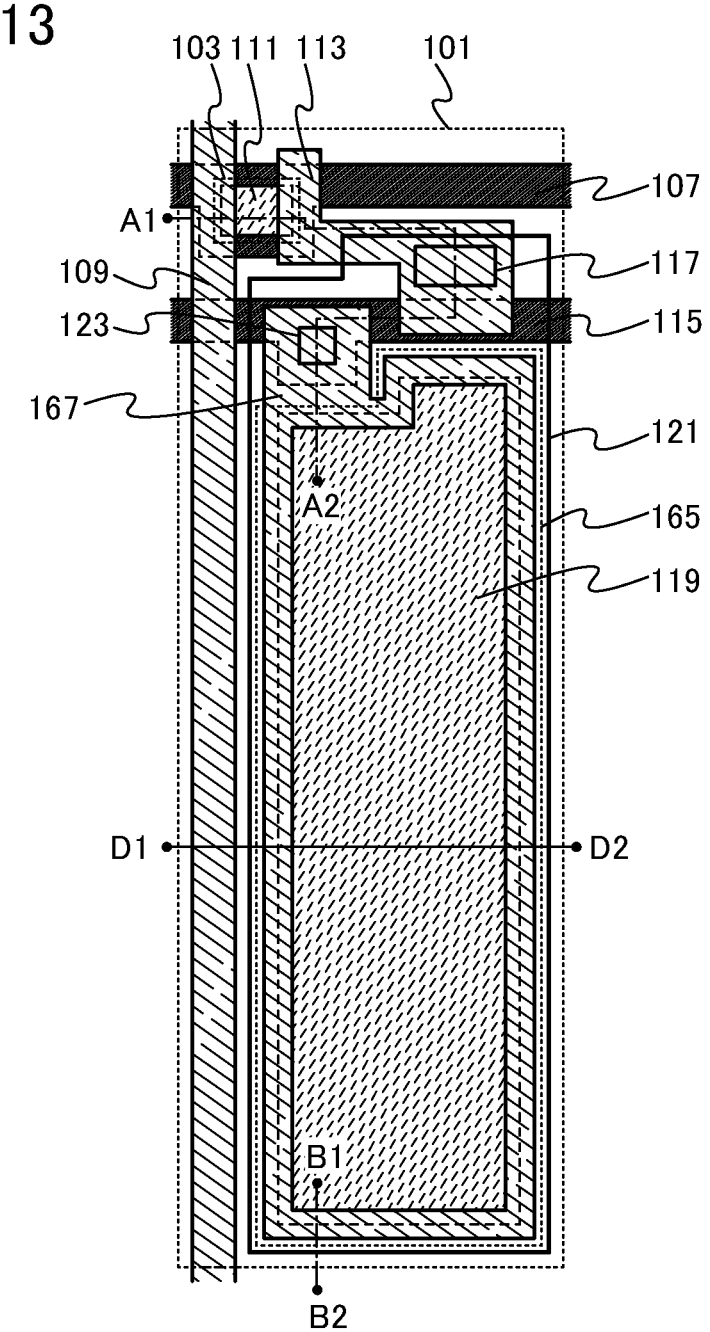
FIG. 13 is a top view illustrating a pixel of a semiconductor device.

In the pixel 101 in FIG. 13 and FIGS. 14A and 14B, a conductive film 167 is provided in contact with the oxide semiconductor film 119 along the outer periphery thereof and is in contact with the capacitor line 115 through the opening 123. The conductive film 167 is provided so as to cover an edge portion of the oxide semiconductor film 119. The conductive film 167 can be formed by utilizing the formation process of the signal line 109 and the conductive film 113. This means that the conductive film 167 has a light-blocking property in some cases and thus preferably has a loop shape. Note that a larger contact area between the conductive film 167 and the oxide semiconductor film 119 increases the conductivity of the oxide semiconductor film 119 and enables the oxide semiconductor film 119 to be brought into conduction easily; therefore, the oxide semiconductor film 119 easily functions as one electrode of the storage capacitor 165.

Further, in the pixel 101 in FIG. 13 and FIGS. 14A and 14B, the shape of the oxide semiconductor film 119 can be changed as appropriate.

Alternatively, the conductive film 167 may be provided in contact with the oxide semiconductor film 119 in a loop shape with a gap.

Modification Example 3

In the semiconductor device of one embodiment of the present invention, connection between the semiconductor film (specifically, the oxide semiconductor film 119) functioning as one electrode of the storage capacitor and the capacitor line can be changed as appropriate. For example, as in a pixel 101 in FIG. 15 and FIG. 16, a capacitor line 175 can be formed by utilizing the formation process of the signal line 109.

Figure 15:
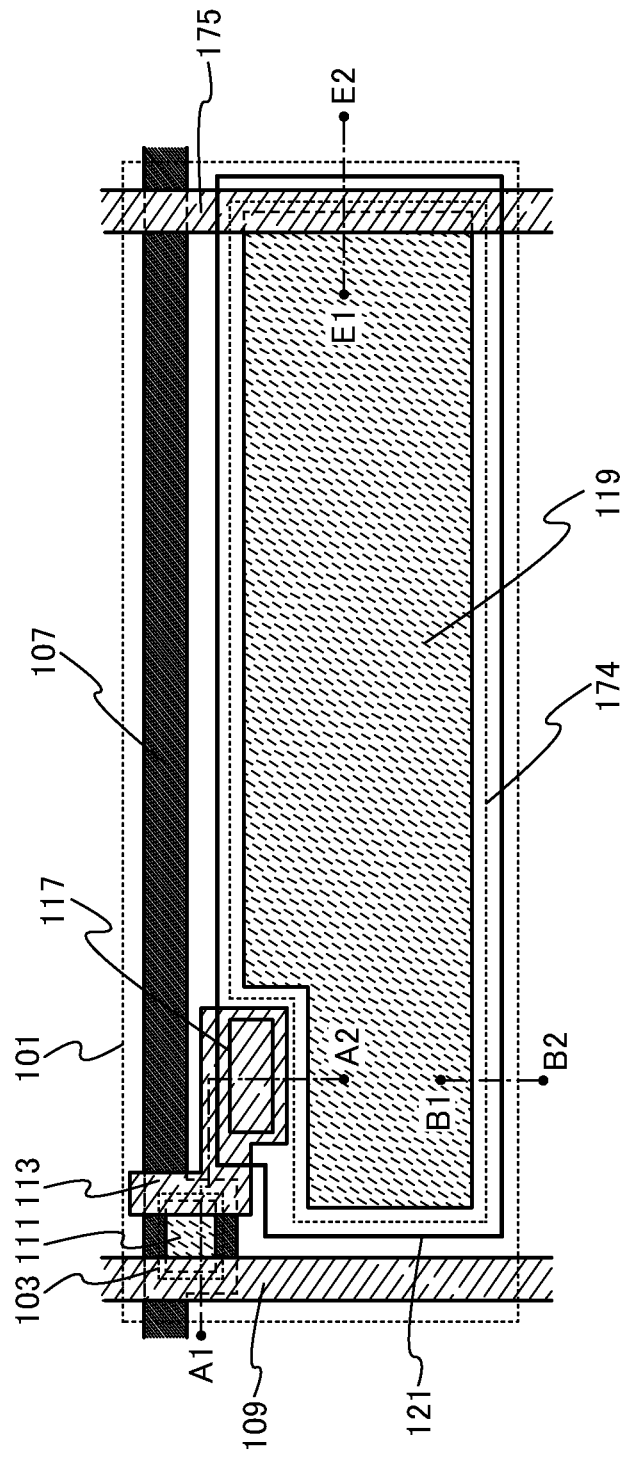
FIG. 15 is a top view illustrating a pixel of a semiconductor device.
Figure 16:
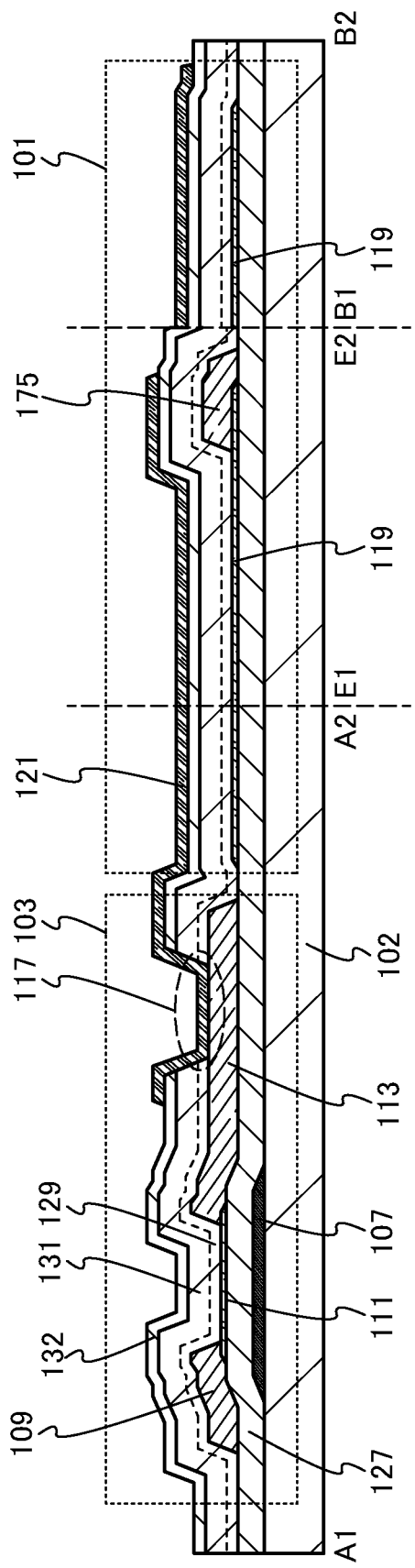
FIG. 16 is a cross-sectional view illustrating the pixel of the semiconductor device.

Note that FIG. 15 is a top view of the pixel 101 in this structure, and FIG. 16 is a cross-sectional view taken along dashed-dotted line A1-A2, dashed-dotted line B1-B2, and dashed-dotted line E1-E2 in FIG. 15.

The capacitor line 175 extends in the direction parallel to the signal line 109. The signal line 109 and the capacitor line 175 are electrically connected to the signal line driver circuit 106 (see FIG. 1A).

In the pixel 101 in FIG. 15 and FIG. 16, a region where the oxide semiconductor film 119 and the pixel electrode 121 overlap with each other with the insulating films 129, 131, and 132 over the oxide semiconductor film 119 provided therebetween functions as the storage capacitor 174.

In the case where a capacitor line extends in the direction parallel to the signal line 109 like the capacitor line 175, like the pixel 101 in FIG. 15, the pixel 101 may have a shape in which a side parallel to the scan line 107 is preferably longer than a side parallel to the signal line 109. This is because as compared to the case where the pixel 101 has a shape in which a side parallel to the signal line 109 is longer than a side parallel to the scan line 107, the area where the pixel electrode 121 overlaps with the capacitor line 175 can be reduced, resulting in a higher aperture ratio.

Modification Example 4

Figure 17:
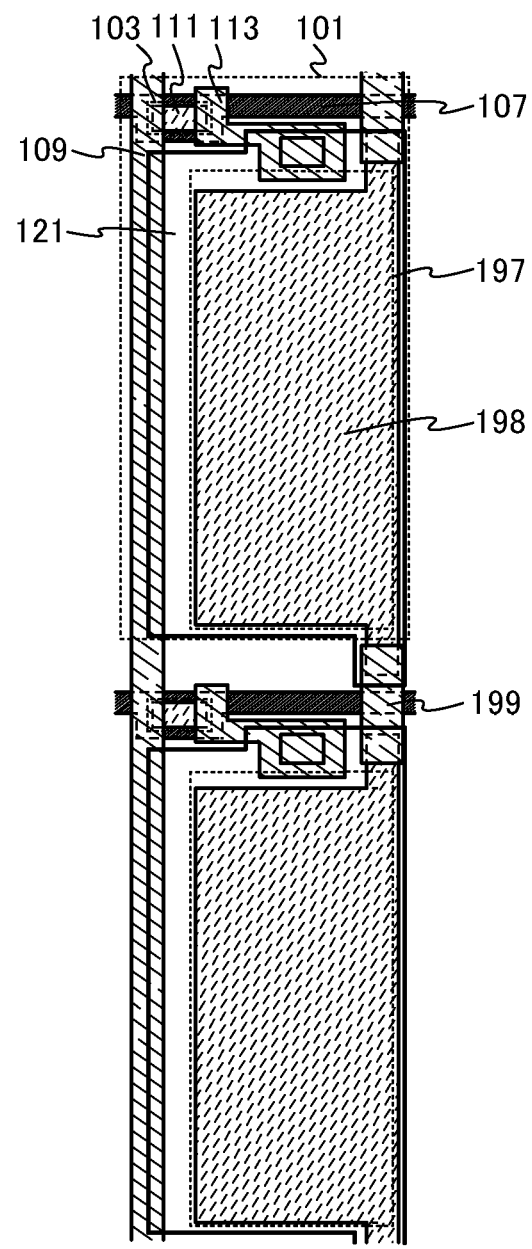
FIG. 17 is a top view illustrating a pixel of a semiconductor device.

In the semiconductor device of one embodiment of the present invention, one electrode of the storage capacitor and the capacitor line can be formed using a semiconductor film (specifically, an oxide semiconductor film). A specific example is described with reference to FIG. 17. Here, only an oxide semiconductor film 198 different from the oxide semiconductor film 119 and the capacitor line 115 described with reference to FIG. 6 and FIG. 7 is described. FIG. 17 is a top view of a pixel 101 in this modification example, where the oxide semiconductor film 198 functioning as one electrode of a storage capacitor 197 and a capacitor line is provided in the pixel 101. The oxide semiconductor film 198 has a region which extends in the direction parallel to the signal line 109, and the region functions as the capacitor line. A region where the oxide semiconductor film 198 overlaps with the pixel electrode 121 serves as one electrode of the storage capacitor 197. The oxide semiconductor film 198 can be formed by utilizing the formation process of the oxide semiconductor film 111 of the transistor 103 provided in the pixel 101 in FIG. 17.

One oxide semiconductor film can be provided as the oxide semiconductor film 198 for the pixels 101 so as to overlap with the scan lines 107. In other words, a continuous oxide semiconductor film can be provided as the oxide semiconductor film 198 for the pixels 101 in one row.

In the case where a continuous oxide semiconductor film is provided as the oxide semiconductor film 198 for the pixels 101 in one row, the oxide semiconductor film 198 overlaps with the scan lines 107. For this reason, the oxide semiconductor film 198 in some cases does not serve as the capacitor line and one electrode of the storage capacitor 197 because of an effect of a change in the potential of the scan line 107. Thus, as illustrated in FIG. 17, the oxide semiconductor films 198 are preferably separated from each other between the pixels 101, and the separated oxide semiconductor films 198 are preferably electrically connected to each other through a conductive film 199 which can be formed by utilizing the formation process of the signal line 109 and the conductive film 113.

In FIG. 17, a region of the oxide semiconductor film 198, which serves as the capacitor line, extends in the direction parallel to the signal line 109; however, the region which serves as the capacitor line may extend in the direction parallel to the scan line 107. In the case where the region of the oxide semiconductor film 198, which serves as the capacitor line, extends in the direction parallel to the scan line 107, it is necessary that the oxide semiconductor film 111 and the oxide semiconductor film 198 be electrically insulated from the signal line 109 and the conductive film 113 by providing an insulating film between the oxide semiconductor film 111 and the oxide semiconductor film 198, and the signal line 109 and the conductive film 113, in the transistor 103 and the storage capacitor 197.

As described above, when an oxide semiconductor film is provided as one electrode of a storage capacitor provided in a pixel and a capacitor line as in the pixel 101 in FIG. 17, the pixel can have a higher aperture ratio.

Modification Example 5

Further, in any of the pixels 101 described in the above modification examples, an organic insulating film can be provided in a region between the pixel electrode 121 and the insulating film 131 (e.g., a region between the pixel electrode 121 and the insulating film 132 or a region between the insulating film 132 and the insulating film 131). In other words, the organic insulating film can be provided partly in the pixel 101.

For the organic insulating film, a photosensitive organic resin or a non-photosensitive organic resin can be used; for example, an acrylic resin, a benzocyclobutene-based resin, an epoxy resin, or a siloxane-based resin can be used. Alternatively, polyamide can be used for the organic insulating film.

To provide the organic insulating film partly, an insulating film is formed using any of the materials given above and then in some cases the insulating film needs to be processed. A formation method of the organic insulating film is not particularly limited and can be selected as appropriate in accordance with a material which is used. For example, spin coating, dipping, spray coating, a droplet discharge method (an ink-jet method), screen printing, offset printing, or the like can be employed. When a photosensitive organic resin is used for the organic insulating film, a resist mask is unnecessary in formation of the organic insulating film; thus, the process can be simplified.

Modification Example 6

In the semiconductor device of one embodiment of the present invention, the shape of a transistor provided in a pixel is not limited to the shape of the transistor illustrated in FIG. 6 and FIG. 7 and can be changed as appropriate. For example, in the transistor, a source electrode included in the signal line 109 may have a U shape (or a C shape, a square-bracket-like shape, or a horseshoe shape) which surrounds the conductive film including a drain electrode. With such a shape, a sufficient channel width can be ensured even when the area of the transistor is small, and accordingly, the amount of drain current flowing at the time of conduction of the transistor (also referred to as an on-state current) can be increased.

Modification Example 7

Although in the pixel 101 described in the above modification example, the transistor where the oxide semiconductor film 111 is provided between the gate insulating film 127, and the signal line 109 including a region functioning as a source electrode and the conductive film 113 including a region functioning as a drain electrode is used, instead of the transistor, a transistor where an oxide semiconductor film 111 is provided between the insulating film 129, and the signal line 109 including a region functioning as a source electrode and the conductive film 113 including a region functioning as a drain electrode can be used.

Modification Example 8

Although in the pixel 101 described in the above modification example, a channel-etched transistor is used as the transistor 103, instead of the transistor, a channel protective transistor can be used. Further, when a channel protective film is provided, a surface of the oxide semiconductor film 111 is not exposed to an etchant or an etching gas used in a formation process of the signal line 109 and the conductive film 113, so that impurities between the oxide semiconductor film 111 and the channel protective film can be reduced. Accordingly, a leakage current flowing between the source electrode and the drain electrode of the transistor 103 can be reduced.

Modification Example 9

Although in the pixel 101 described in the above modification example, a transistor having one gate electrode is used as the transistor 103, a transistor having two gate electrodes facing each other with the oxide semiconductor film 111 provided therebetween (a dual-gate transistor) can be used.

The dual-gate transistor includes a conductive film (also referred to as a back gate electrode) formed over the insulating film 129 of the transistor 103 described in this embodiment. The conductive film overlaps with at least a channel formation region of the oxide semiconductor film 111. The width of the conductive film in the channel length direction can be shorter than the width between the signal line 109 including a region functioning as a source electrode and the conductive film 113 functioning as a drain electrode of the transistor, for example. When the conductive film is provided so as to overlap with the channel formation region of the oxide semiconductor film 111, the potential of the conductive film is preferably set to the same potential as the minimum potential of the video signal input to the signal line 109. In that case, current flowing between the source electrode and the drain electrode in the surface of the oxide semiconductor film 111 facing the conductive film can be controlled, and fluctuations in the electrical characteristics of the transistors can be reduced. In addition, the conductive film reduces an influence of a change in ambient electric field on the oxide semiconductor film 111, which enables the reliability of the transistor 103 to be improved.

The conductive film can be formed using a material and a method similar to those of the scan line 107, the signal line 109, the pixel electrode 121, or the like. The conductive film can be formed by utilizing the formation process of the pixel electrode 121.

Accordingly, a semiconductor film is formed as one electrode of a storage capacitor in the same process as a semiconductor film of a transistor, whereby a semiconductor device in which the aperture ratio and the charge capacity of the storage capacitor are increased can be manufactured. Further, the semiconductor device can have an excellent display quality by improving the aperture ratio.

Further, a transistor including an oxide semiconductor is used as a transistor in a pixel and oxygen vacancies and impurities such as hydrogen and nitrogen in the oxide semiconductor film included in the transistor are reduced, so that a semiconductor device having favorable electrical characteristics can be obtained.

Note that the structure and the like described in this embodiment can be used as appropriate in combination with any of the structures and the like in the other embodiments.

Embodiment 2

In this embodiment, a semiconductor device of one embodiment of the present invention, which has a structure different from those described in the above embodiment, will be described with reference to drawings. In the semiconductor device described in this embodiment, the structure of a storage capacitor is different from that of the storage capacitor in the above embodiment. The above embodiment can be referred to for components in the semiconductor device in this embodiment, which are similar to those of the semiconductor device in the above embodiment.

<Top View Structure and Cross-Sectional View Structure of Semiconductor Device>

Figure 18:
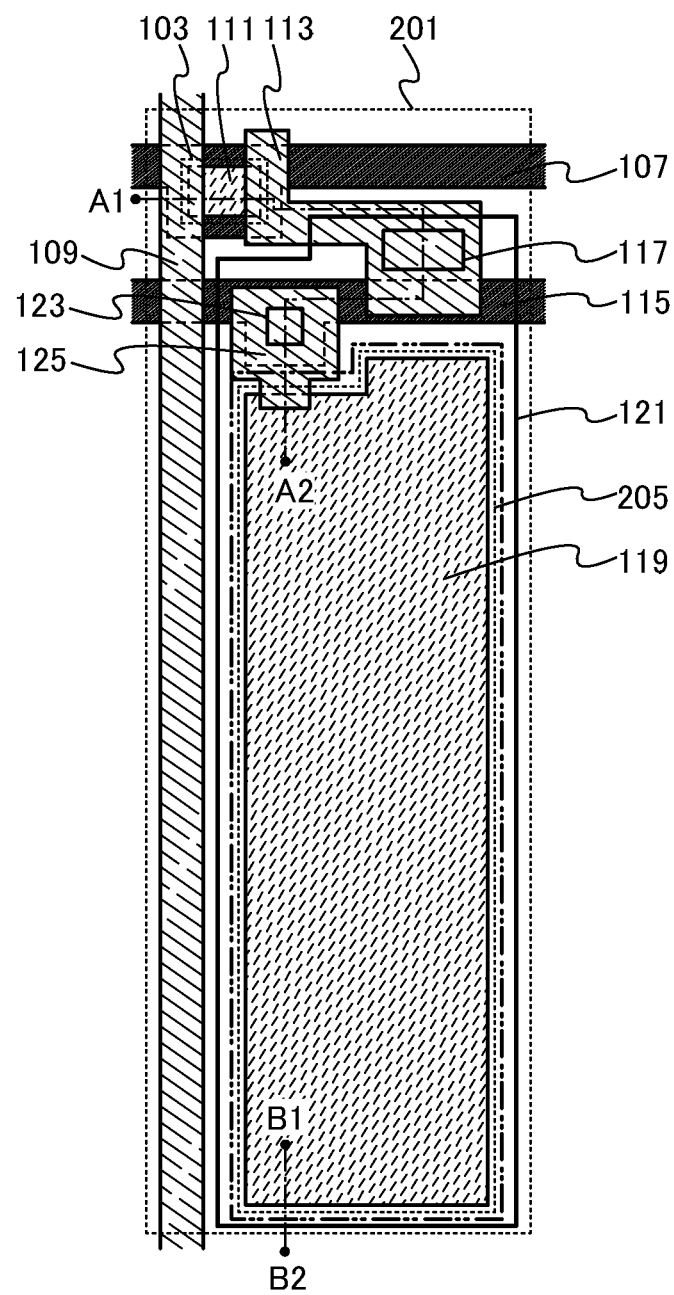
FIG. 18 is a top view illustrating a pixel of a semiconductor device.

FIG. 18 is a top view of a pixel described in this embodiment. A pixel 201 in FIG. 18 has a structure in which a storage capacitor 205 is provided instead of the storage capacitor 105 in the pixel 101 in FIG. 6. In the pixel 201 in FIG. 18, an insulating film 232 (not illustrated) is provided in contact with the oxide semiconductor film 119 in a region indicated by dashed-two dotted lines unlike in the pixel 101 in FIG. 6. That is, an insulating film 229 (not illustrated) and an insulating film 231 (not illustrated) are not provided in the region indicated by dashed-two dotted lines in the pixel 201 in FIG. 18. This means that the storage capacitor 205 includes the oxide semiconductor film 119 functioning as one electrode, the pixel electrode 121 functioning as the other electrode, and the insulating film 232 (not illustrated) functioning as a dielectric film.

Figure 19:
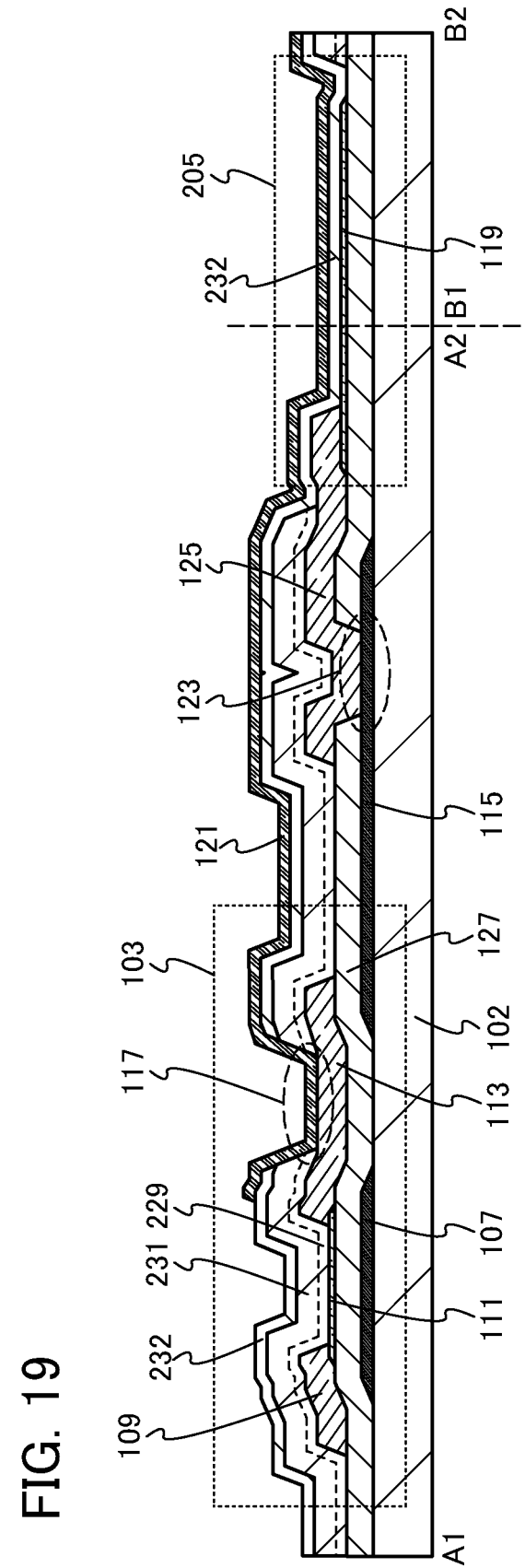
FIG. 19 is a cross-sectional view illustrating a pixel of a semiconductor device.

Next, a cross-sectional view taken along dashed-dotted line A1-A2 and dashed-dotted line B1-B2 in FIG. 18 is illustrated in FIG. 19.

The cross-sectional structure of the pixel 201 in FIG. 18 is as follows. Over the substrate 102, the scan line 107 including a region functioning as the gate electrode and the capacitor line 115 are provided. The gate insulating film 127 is provided over the scan line 107 and the capacitor line 115. The oxide semiconductor film 111 is provided over a region of the gate insulating film 127, which overlaps with the scan line 107, and the oxide semiconductor film 119 is provided over the gate insulating film 127. The signal line 109 including a region functioning as the source electrode and the conductive film 113 including a region functioning as the drain electrode are each provided over the oxide semiconductor film 111 and the gate insulating film 127. The opening 123 reaching the capacitor line 115 is formed in part of the gate insulating film 127 in contact with the capacitor line 115, and the conductive film 125 is provided in and over the opening 123 and over the gate insulating film 127, and the oxide semiconductor film 119. The insulating film 229, the insulating film 231, and the insulating film 232 which serve as a protective insulating film of the transistor 103 are provided over the gate insulating film 127, the signal line 109, the oxide semiconductor film 111, the conductive film 113, the conductive film 125, and the oxide semiconductor film 119. Further, at least in a region which is to be the storage capacitor 205, the insulating film 232 is provided over the oxide semiconductor film 119. The opening 117 reaching the conductive film 113 is provided in the insulating films 229, 231, and 232, and the pixel electrode 121 is provided in and over the opening 117 and over the insulating film 232. Note that a base insulating film may be provided between the substrate 102, and the scan line 107, the capacitor line 115, and the gate insulating film 127.

The insulating film 229 is similar to the insulating film 129 described in Embodiment 1. The insulating film 231 is similar to the insulating film 131 described in Embodiment 1. The insulating film 232 is similar to the insulating film 132 described in Embodiment 1.

When the insulating film 232 serves as a dielectric film provided between the oxide semiconductor film 119 functioning as one electrode and the pixel electrode 121 functioning as the other electrode in the storage capacitor 205 in this embodiment, the thickness of the dielectric film can be made thinner than that of the dielectric film of the storage capacitor 105 in Embodiment 1. Thus, the storage capacitor 205 in this embodiment can have larger charge capacity per unit area than the storage capacitor 105 in Embodiment 1.

Since the storage capacitor 205 has larger charge capacity per unit area than the storage capacitor 105, the area of the oxide semiconductor film 119 which is necessary to obtain the charge capacity equivalent to that of the storage capacitor 105 can be made small. Accordingly, a region on which the oxide semiconductor film 119 is not formed can be obtained in the pixel 201. Thus, light extraction efficiency (transmittance) of a light source such as a backlight can be improved in the semiconductor device of one embodiment of the present invention and as a result, the display quality can be improved.

The insulating film 232 is preferably a nitride insulating film which is similar to the insulating film 132 in Embodiment 1. The insulating film 232 is in contact with the oxide semiconductor film 119, so that one or both of nitrogen and hydrogen contained in the nitride insulating film can be transferred to the oxide semiconductor film 119 and thus the oxide semiconductor film 119 can have increased carrier density and conductivity. Further, when the insulating film 232 is formed using a nitride insulating film and is subjected to heat treatment while it is in contact with the oxide semiconductor film 119, one or both of nitrogen and hydrogen contained in the nitride insulating film can be transferred to the oxide semiconductor film 119.

As described above, in the semiconductor device of this embodiment, the oxide semiconductor film 119 includes a region having a higher conductivity than the oxide semiconductor film 111. At least a region of the oxide semiconductor film 119 which is in contact with the insulating film 232 has higher carrier density (a higher concentration of one or both of nitrogen and hydrogen) and therefore has a higher conductivity than a region of the oxide semiconductor film 111 which is in contact with the insulating film 229.

Further, in the semiconductor device of this embodiment, the oxide semiconductor film 119 functioning as one electrode of the storage capacitor 205 has increased carrier density and conductivity similar to those of the oxide semiconductor film to which a dopant is added, which is described in Embodiment 1; thus, the threshold voltage ($Vth_{\_205}$) is shifted in the negative direction. Accordingly, the operation method of the storage capacitor 205 is similar to that in Embodiment 1.

The oxide semiconductor film 119 functioning as one electrode of the storage capacitor 205 is made to have increased carrier density and conductivity as in this embodiment, so that the threshold voltage is shifted in the negative direction. Thus, the range of the potential needed for operating the storage capacitor 205 can be made broader than the range of the potential needed for operating the capacitor 105 in Embodiment 1. Thus, the storage capacitor 205 of this embodiment can be stably operated with time.

<Manufacturing Method of Semiconductor Device>

Next, a method for manufacturing a semiconductor device of this embodiment is described with reference to FIGS. 20A and 20B and FIG. 21.

First, the scan line 107 and the capacitor line 115 are formed over the substrate 102. An insulating film which is to be processed into the gate insulating film 127 is formed over the substrate 102, the scan line 107, and the capacitor line 115. The oxide semiconductor film 111 and the oxide semiconductor film 119 are formed over the insulating film. The opening 123 reaching the capacitor line 115 is formed in the insulating film to form the gate insulating film 127 and then the signal line 109, the conductive film 113, and the conductive film 125 are formed. The insulating film 128 is formed over the gate insulating film 127, the signal line 109, the conductive film 113, the conductive film 125, and the oxide semiconductor film 119. The insulating film 130 is formed over the insulating film 128 (see FIG. 20A). Note that the above steps can be performed with reference to Embodiment 1.

Next, a mask is formed over a region of the insulating film 130. The insulating film 128 and the insulating film 130 are processed using the mask to form an insulating film 228 and an insulating film 230, respectively, and to expose the oxide semiconductor film 119. An insulating film 233 is formed over the exposed region and the insulating film 230 (see FIG. 20B). As the mask, a resist mask formed through a photolithography process can be used, and the processing can be performed by one or both of dry etching and wet etching. The insulating film 233 is similar to the insulating film 133 described in Embodiment 1. Note that heat treatment may be performed while the insulating film 233 is in contact with the oxide semiconductor film 119, for example, after the formation of the insulating film 233. Note that the above steps can be performed with reference to Embodiment 1.

Figure 21:
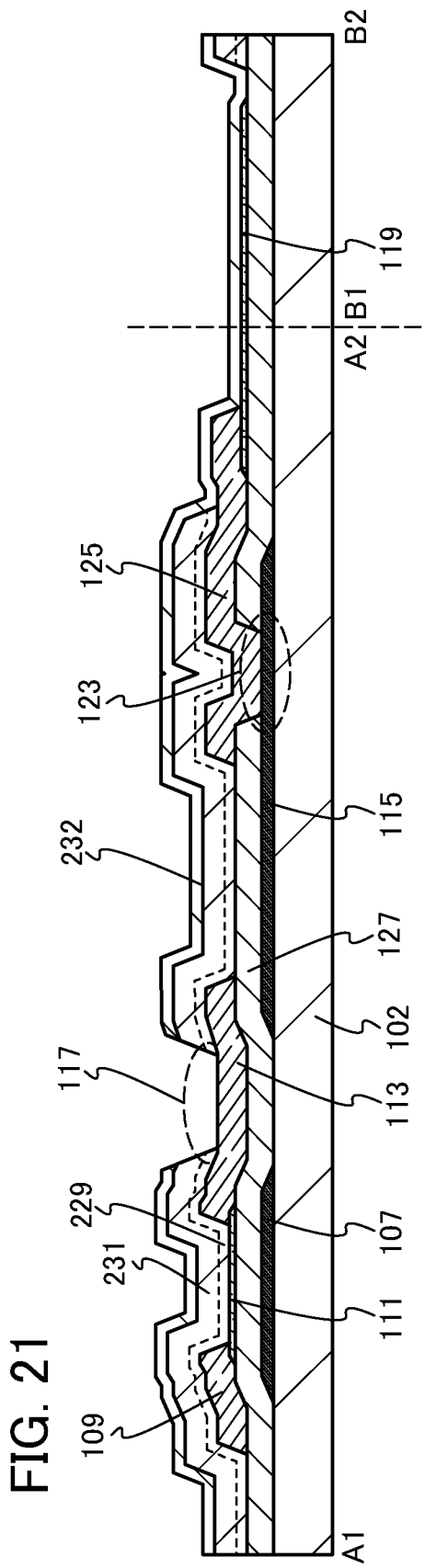
FIG. 21 is a cross-sectional view illustrating the method for manufacturing the pixel of the semiconductor device.

Next, the opening 117 reaching the conductive film 113 is formed in the insulating film 228, the insulating film 230, and the insulating film 233 to form the insulating film 229, the insulating film 231, and the insulating film 232 (see FIG. 21). Then, the pixel electrode 121 in contact with the conductive film 113 through the opening 117 is formed (see FIG. 22). Note that the above steps can be performed with reference to Embodiment 1.

Through the above process, the semiconductor device in this embodiment can be manufactured.

Modification Example

In the semiconductor device described in this embodiment, the structure of a region where a storage capacitor is provided can be changed as appropriate. A specific example is described with reference to FIG. 22. The pixel 201 in FIG. 22 has a storage capacitor 245 including a gate insulating film 127, the structure of which is different from that in the storage capacitor 105 of the pixel 101 in FIG. 6 and FIG. 7 in a region where the storage capacitor 105 is provided.

Figure 22:
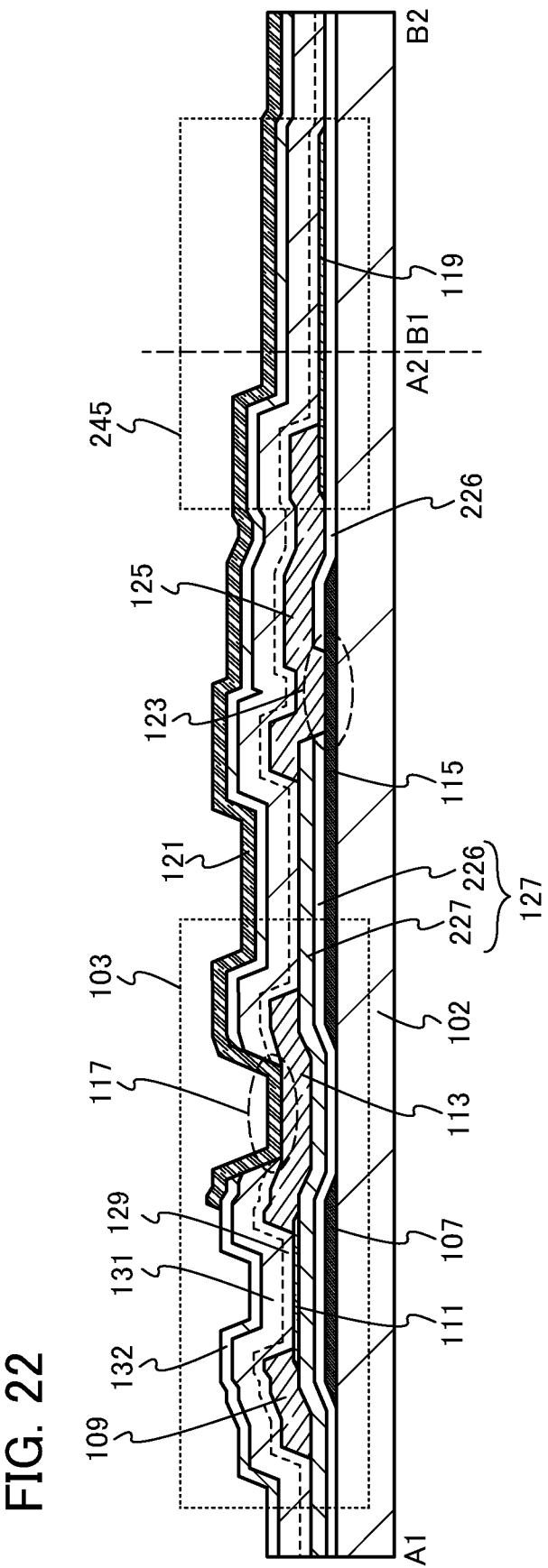
FIG. 22 is a cross-sectional view illustrating a pixel of the semiconductor device.

The cross-sectional structure of the pixel 201 in FIG. 22 is as follows. The gate insulating film 127 is a stack of an insulating film 226 formed using a nitride insulating film and an insulating film 227 formed using an oxide insulating film and only the insulating film 226 is provided in a region where at least the oxide semiconductor film 119 is provided. With such a structure, the nitride insulating film for forming the insulating film 226 is in contact with the bottom surface of the oxide semiconductor film 119, so that the oxide semiconductor film 119 can have increased carrier density and conductivity. FIG. 6 can be referred to for the top view corresponding to FIG. 22. In that case, a dielectric film of the storage capacitor 245 is the insulating film 129, the insulating film 131, and the insulating film 132. As the insulating films 226 and 227, the insulating films which can be used as the gate insulating film 127 can be used as appropriate, and the insulating film 227 may be formed using an insulating film similar to the insulating film 132. Further, to obtain this structure, the insulating film 227 is processed as appropriate with reference to Embodiment 1.

In the structure in FIG. 22, the top surface of the oxide semiconductor film 119 may be in contact with the insulating film 132 in a manner similar to that of the insulating film 232 in the structure of FIG. 19. That is, regions of the insulating films 129 and 131 in FIG. 22 which are in contact with the oxide semiconductor film 119 may be removed. In that case, the dielectric film of the storage capacitor 245 is the insulating film 132. When the top and bottom surfaces of the oxide semiconductor film 119 are in contact with the nitride insulating film, the oxide semiconductor film 119 can be made to have increased carrier density and conductivity more efficiently and sufficiently than the oxide semiconductor film 119, only one of the surfaces of which is in contact with the nitride insulating film.

Further, the thickness of the dielectric film of the storage capacitor 245 can be made smaller than that of the dielectric film of the capacitor 105 in Embodiment 1. Thus, the storage capacitor 245 in this modification example can have larger charge capacity per unit area than the storage capacitor 105 in Embodiment 1.

Since the storage capacitor 245 has larger charge capacity per unit area than the storage capacitor 105, the area of the oxide semiconductor film 119 which is necessary to obtain the charge capacity equivalent to that of the storage capacitor 105 can be made small. Accordingly, a region on which the oxide semiconductor film 119 is not formed can be obtained in the storage capacitor in this modification example. Thus, light extraction efficiency (transmittance) of a light source such as a backlight can be improved in the semiconductor device of one embodiment of the present invention and as a result, the display quality can be improved.

In the semiconductor device in FIGS. 20A and 20B and FIG. 21, a reduction in thickness of the oxide semiconductor film 119 due to etching of the insulating film 229 and the insulating film 231 can be prevented; thus, the yield of the semiconductor device is improved as compared to the semiconductor device in FIG. 17 and FIG. 18.

Accordingly, a semiconductor film is formed as one electrode of a storage capacitor in the same process as a semiconductor film of a transistor, whereby a semiconductor device in which the aperture ratio and the charge capacity of the storage capacitor are increased can be manufactured. For example, when the pixel density of the semiconductor device in this embodiment is 300 ppi or more (specifically, about greater than or equal to 300 ppi and less than or equal to 330 ppi), the aperture ratio of the pixel can be 50% or higher, 55% or higher, or even 60% or higher. Further, the semiconductor device can have an excellent display quality by improving the aperture ratio.

Further, oxygen vacancies and impurities such as hydrogen and nitrogen in the semiconductor film (specifically, the oxide semiconductor film) of the transistor are reduced, so that the semiconductor device of one embodiment of the present invention has favorable electrical characteristics.

Note that the structure and the like described in this embodiment can be used as appropriate in combination with any of the structures, the modification examples, and the like in the other embodiments.

Embodiment 3

In this embodiment, one embodiment applicable to an oxide semiconductor film, which is a semiconductor film, in the transistor and the storage capacitor included in any of the semiconductor devices described in the above embodiments will be described.

The oxide semiconductor film may be in a single-crystal state or a non-single-crystal state. The non-single-crystal state is, for example, structured by at least one of c-axis aligned crystal (CAAC), polycrystal, microcrystal, and an amorphous part. The defect level density of an amorphous part is higher than those of microcrystal and CAAC. The defect level density of microcrystal is higher than that of CAAC. Note that an oxide semiconductor including CAAC is referred to as a CAAC-OS (c-axis aligned crystalline oxide semiconductor).

For example, the oxide semiconductor film may include a CAAC-OS. In the CAAC-OS, for example, c-axes are aligned, and a-axes and/or b-axes are not macroscopically aligned.

For example, the oxide semiconductor film may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example.

For example, the oxide semiconductor film may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that the oxide semiconductor film may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked-layer structure including a region of an amorphous oxide semiconductor, a region of a microcrystalline oxide semiconductor, and a region of a CAAC-OS, for example.

The oxide semiconductor film preferably includes a plurality of crystal parts. In each of the crystal parts, a c-axis is preferably aligned in a direction parallel to a normal vector of a surface on which the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

Note that in most cases, a crystal part in the CAAC-OS film fits inside a cube whose one side is less than 100 nm. In an image obtained with a transmission electron microscope (TEM), a boundary between crystal parts in the CAAC-OS film is not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface on which the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification and the like, a simple term "perpendicular" includes a range from 80° to 100°, preferably 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from the surface side of the oxide semiconductor film, the proportion of crystal parts in the vicinity of the surface of the oxide semiconductor film is sometimes higher than that in the vicinity of the surface on which the oxide semiconductor film is formed. Further, when an impurity is added to the CAAC-OS film, crystallinity of the crystal part in a region to which the impurity is added is in some cases lowered.

Since the c-axes of the crystal parts included in the CAAC-OS film are aligned in the direction parallel to a normal vector of a surface on which the CAAC-OS film is formed or a normal vector of a surface of the CAAC-OS film, the directions of the c-axes may be different from each other depending on the shape of the CAAC-OS film (the cross-sectional shape of the surface on which the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface on which the CAAC-OS film is formed or a normal vector of the surface of the CAAC-OS film.

With the use of the CAAC-OS film in a transistor, a change in electrical characteristics of the transistor due to irradiation with visible light or ultraviolet light is small. Thus, the transistor has high reliability.

As a method for forming a CAAC-OS, for example, an oxide semiconductor film is formed at a temperature in the range of 100° C. to 450° C., so that it is possible to form, in the oxide semiconductor film, crystal parts in which the c-axes are aligned in the direction parallel with a normal vector of a surface on which the oxide semiconductor film is formed or a normal vector of a surface of the oxide semiconductor film.

Alternatively, an oxide semiconductor film with a small thickness is formed and then subjected to heat treatment at a temperature higher than or equal to 200° C. and lower than or equal to 700° C., whereby crystal parts in which the c-axes are aligned in the direction parallel to a normal vector of a surface on which the oxide semiconductor film is formed or a normal vector of a surface of the oxide semiconductor film may be formed in the oxide semiconductor film.

Further alternatively, a first oxide semiconductor film is formed with a small thickness and then subjected to heat treatment at a temperature higher than or equal to 200° C. and lower than or equal to 700° C., and further a second oxide semiconductor film is formed, whereby crystal parts in which the c-axes are aligned in the direction parallel to a normal vector of a surface on which the oxide semiconductor film is formed or a normal vector of a surface of the oxide semiconductor film can be formed in the oxide semiconductor film.

Further, it is preferable that the CAAC-OS is formed by a sputtering method with a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like sputtered particle or the pellet-like sputtered particle reaches a surface on which the CAAC-OS is formed while maintaining its crystal state, whereby the CAAC-OS can be deposited.

The conditions described below are preferably employed for the formation of the CAAC-OS film.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in a deposition chamber may be reduced. Furthermore, the concentration of impurities in a deposition gas may be reduced. Specifically, a deposition gas whose dew point is −80° C. or lower, preferably −100° C. or lower is used.

By increasing the heating temperature of the surface on which the CAAC-OS film is formed (e.g., the substrate heating temperature) during the deposition, migration of a sputtered particle is likely to occur after the sputtered particle reaches the surface on which the CAAC-OS film is formed. Specifically, the temperature of the surface on which the CAAC-OS film is formed during the deposition is higher than or equal to 100° C. and lower than or equal to 740° C., preferably higher than or equal to 150° C. and lower than or equal to 500° C. By increasing the temperature of the surface on which the CAAC-OS film is formed during the deposition, when the flat-plate-like or pellet-like sputtered particle reaches the surface on which the CAAC-OS film is formed, migration occurs on the surface on which the CAAC-OS film is formed, so that a flat plane of the sputtered particle is attached to the surface on which the CAAC-OS film is formed.

Furthermore, it is preferable that the proportion of oxygen in the deposition gas be increased and the power be optimized in order to reduce plasma damage at the deposition. The proportion of oxygen in the deposition gas is higher than or equal to 30 vol %, preferably 100 vol %.

As an example of the sputtering target, an In—Ga—Zn—O compound target is described below.

The polycrystalline In—Ga—Zn-based metal oxide target is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. This pressure treatment may be performed while cooling is performed or may be performed while heating is performed. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on a desired sputtering target.

Further, the oxide semiconductor film may have a structure in which a plurality of oxide semiconductor films are stacked. For example, the oxide semiconductor film may have a stacked-layer structure of a first oxide semiconductor film and a second oxide semiconductor film which are formed using metal oxides with different atomic ratios. For example, the first oxide semiconductor film may be formed using one of an oxide containing two kinds of metals, an oxide containing three kinds of metals, and an oxide containing four kinds of metals, and the second oxide semiconductor film may be formed using one of the above which is different from the one used for the first oxide semiconductor film.

Alternatively, the oxide semiconductor film may have a two-layer structure of the first oxide semiconductor film and the second oxide semiconductor film, in which the constituent elements thereof are made the same and the atomic ratios of the constituent elements of the first oxide semiconductor film and the second oxide semiconductor film are made different. For example, the first oxide semiconductor film may contain In, Ga, and Zn at an atomic ratio of 1:1:1, and the second oxide semiconductor film may contain In, Ga, and Zn at an atomic ratio of 1:3:2. Note that the proportion of each atom in the atomic ratio of the oxide semiconductor varies within a range of ±20% as an error.

At this time, in one of the first oxide semiconductor film and the second oxide semiconductor film, which is closer to the gate electrode (on the channel side), the atomic ratio of In to Ga preferably satisfies the relation In≥Ga. In the other oxide semiconductor film, which is farther from the gate electrode (on the back channel side), the atomic ratio of In to Ga preferably satisfies the relation In<Ga. With a stacked-layer structure of these oxide semiconductor films, a transistor having high field-effect mobility can be formed. On the other hand, the atomic ratio of In to Ga in the oxide semiconductor film closer to the gate electrode (the oxide semiconductor film on the channel side) satisfies the relation In<Ga and the atomic ratio of In to Ga in the oxide semiconductor film on the back channel side satisfies the relation In≥Ga, whereby the amount of change of the threshold voltage of a transistor due to change over time or a reliability test can be reduced.

Further, the oxide semiconductor film may have a three-layer structure of a first oxide semiconductor film, a second oxide semiconductor film, and a third oxide semiconductor film, in which the constituent elements thereof are made the same and the atomic ratios of the constituent elements of the first oxide semiconductor film, the second oxide semiconductor film, and the third oxide semiconductor film are made different. The case where the oxide semiconductor film has a three-layer structure is described with reference to FIG. 23.

Figure 23:
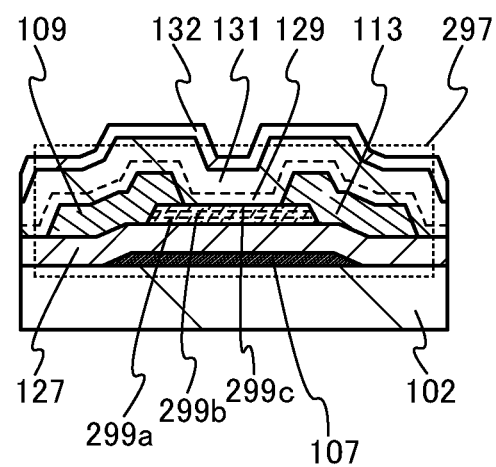
FIG. 23 is a cross-sectional view illustrating a transistor applicable to a pixel of a semiconductor device.

In a transistor 297 illustrated in FIG. 23, a first oxide semiconductor film 299a, a second oxide semiconductor film 299b, and a third oxide semiconductor film 299c are stacked in this order from the gate insulating film 127 side. Note that the structure of the transistor 297 is the same as those of the transistors described in the above embodiments (e.g., the transistor 103 in Embodiment 1) except that the first oxide semiconductor film 299a, the second oxide semiconductor film 299b, and the third oxide semiconductor film 299c are included.

As a material forming the second oxide semiconductor film 299b, an oxide semiconductor which is represented by an In—M—Zn oxide (M is a metal such as Al, Ga, Ge, Y, Zr, Sn, La, Ce, or Hf) is used.

Further, as a material forming the first oxide semiconductor film 299a and the third oxide semiconductor film 299c, an oxide semiconductor which is represented by an In—M—Zn oxide (M is a metal such as Al, Ga, Ge, Y, Zr, Sn, La, Ce, or Hf) and which has a higher proportion of M in atomic ratio than the second oxide semiconductor film 299b is used. Specifically, the amount of the element M in the first oxide semiconductor film 299a or the third oxide semiconductor film 299c in an atomic ratio is 1.5 times or more, preferably 2 times or more, further preferably 3 times or more as much as that in the second oxide semiconductor film 299b in an atomic ratio. Any of the above elements is more strongly bonded to oxygen than indium is, and thus has a function of suppressing generation of an oxygen vacancy in the oxide semiconductor film. That is, an oxygen vacancy is more unlikely to be generated in the first oxide semiconductor film 299a and the third oxide semiconductor film 299c than in the second oxide semiconductor film 299b. In addition, as the proportion of the element M to indium or zinc is higher, the oxide semiconductor has a larger band gap. Thus, the first oxide semiconductor film 299a and the third oxide semiconductor film 299c are each an oxide layer having a band gap larger than that of the second oxide semiconductor film 299b. Note that the atomic ratio of M is preferably adjusted such that the band gap allowing the first oxide semiconductor film 299a and the third oxide semiconductor film 299c to each function as a semiconductor can be maintained.

Materials of the first oxide semiconductor film 299a, the second oxide semiconductor film 299b, and the third oxide semiconductor film 299c are selected as appropriate so that a well structure is formed in which the conduction band minimum energy of the second oxide semiconductor film 299b is deeper from the vacuum level than the conduction band minimum energies of the first oxide semiconductor film 299a and the third oxide semiconductor film 299c.

Note that as described in Embodiment 1, diffusion of silicon or carbon, which belongs to Group 14, generates an oxygen vacancy in an oxide semiconductor film. Therefore, silicon or carbon contained in an oxide semiconductor film makes it n-type. Thus, the concentration of silicon contained in the oxide semiconductor films each functioning as a channel of the transistor and the concentration of carbon contained in the oxide semiconductor films are each less than or equal to $3 \times 10^{18}/cm^3$, preferably less than or equal to $3 \times 10^{17}/cm^3$. It is particularly preferable to employ a structure where the first oxide semiconductor film 299a and the third oxide semiconductor film 299c sandwich or surround the second oxide semiconductor film 299b serving as a carrier path so that a large number of Group 14 elements do not enter the second oxide semiconductor film 299b. That is, the first oxide semiconductor film 299a and the third oxide semiconductor film 299c can also be called barrier films which prevent Group 14 elements such as silicon and carbon from entering the second oxide semiconductor film 299b.

For example, the first oxide semiconductor film 299a may contain In, Ga, and Zn at an atomic ratio of 1:3:2, the second oxide semiconductor film 299b may contain In, Ga, and Zn at an atomic ratio of 3:1:2, and the third oxide semiconductor film 299c may contain In, Ga, and Zn at an atomic ratio of 1:1:1.

Alternatively, a three-later structure may be employed in which the first oxide semiconductor film 299a contains In, Ga, and Zn at an atomic ratio of 1:3:2, the second oxide semiconductor film 299b contains In, Ga, and Zn at an atomic ratio of 1:1:1 or 1:3:2, and the third oxide semiconductor film 299c contains In, Ga, and Zn at an atomic ratio of 1:3:2.

Since at least two constituent elements of the first oxide semiconductor film 299a, the second oxide semiconductor film 299b, and the third oxide semiconductor film 299c are the same, the second oxide semiconductor film 299b has fewer defect levels (trap levels) at the interface with the first oxide semiconductor film 299a. Specifically, the defect levels (trap levels) are fewer than those at the interface between the gate insulating film 127 and the first oxide semiconductor film 299a. For this reason, when the oxide semiconductor films are stacked in the above manner, the amount of change of the threshold voltage of the transistor due to change over time or a reliability test can be reduced.

Further, when materials of the first oxide semiconductor film 299a, the second oxide semiconductor film 299b, and the third oxide semiconductor film 299c are selected as appropriate so that a well structure is formed in which the conduction band minimum energy of the second oxide semiconductor film 299b is deeper from the vacuum level than the conduction band minimum energies of the first oxide semiconductor film 299a and the third oxide semiconductor film 299c, the field-effect mobility of the transistor can be increased and the amount of change of the threshold voltage of the transistor due to change over time or a reliability test can be reduced.

Further, the first oxide semiconductor film 299a, the second oxide semiconductor film 299b, and the third oxide semiconductor film 299c may be formed using oxide semiconductors having different crystallinity. That is, the first oxide semiconductor film 299a, the second oxide semiconductor film 299b, and the third oxide semiconductor film 299c may be formed using any of a single crystal oxide semiconductor, a polycrystalline oxide semiconductor, a microcrystalline oxide semiconductor, an amorphous oxide semiconductor, and a CAAC-OS, as appropriate.

At least the second oxide semiconductor film 299b, which can serve as a channel formation region, is preferably a CAAC-OS film. Such a structure enables the amount of change of the threshold voltage of the transistor due to change over time or a reliability test to be reduced.

Note that the structure and the like described in this embodiment can be used as appropriate in combination with any of the structures and the like in the other embodiments.

Embodiment 4

A semiconductor device (also referred to as a display device) having a display function can be manufactured using the transistor and the storage capacitor, examples of which are shown in the above embodiments. Moreover, some or all of driver circuits which include the transistor can be formed over a substrate where a pixel portion is formed, whereby a system-on-panel can be obtained. In this embodiment, an example of a display device using the transistor, examples of which are shown in the above embodiments, is described with reference to drawings.

Figure 24A:
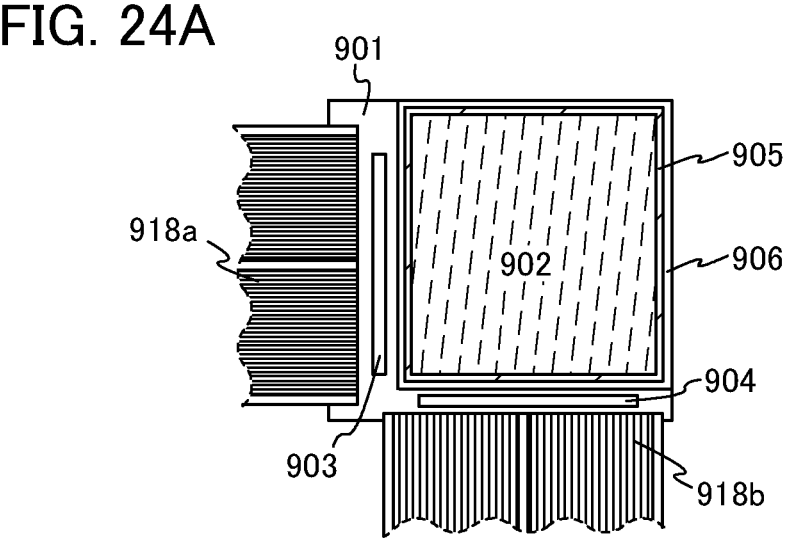
FIGS. 24A to 24C are top views each illustrating a semiconductor device.

In FIG. 24A, a sealant 905 is provided so as to surround a pixel portion 902 provided over a first substrate 901, and the pixel portion 902 is sealed with a second substrate 906. In FIG. 24A, a signal line driver circuit 903 and a scan line driver circuit 904 are each formed using a single crystal semiconductor or a polycrystalline semiconductor over a substrate prepared separately, and mounted in a region different from the region surrounded by the sealant 905 over the first substrate 901. Further, various signals and potentials are supplied to the signal line driver circuit 903, the scan line driver circuit 904, and the pixel portion 902 from flexible printed circuits (FPCs) 918a and 918b.

Figure 24B:
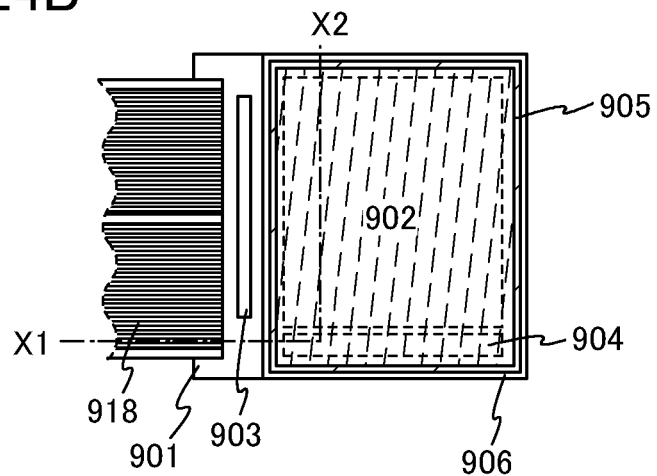
Figure 24C:
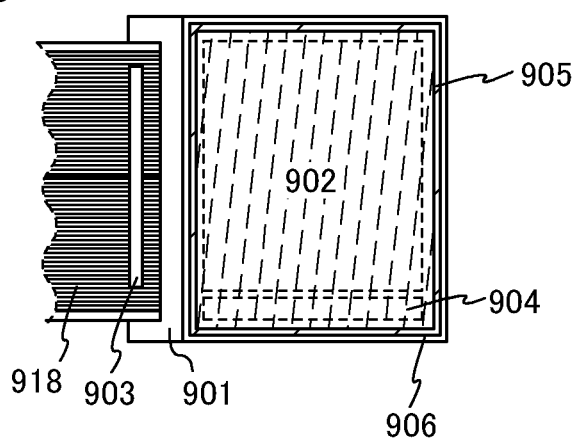

In FIGS. 24B and 24C, the sealant 905 is provided so as to surround the pixel portion 902 and the scan line driver circuit 904 which are provided over the first substrate 901. The second substrate 906 is provided over the pixel portion 902 and the scan line driver circuit 904. Thus, the pixel portion 902 and the scan line driver circuit 904 are sealed together with a display element by the first substrate 901, the sealant 905, and the second substrate 906. In FIGS. 24B and 24C, a signal line driver circuit 903 which is formed using a single crystal semiconductor or a polycrystalline semiconductor over a substrate separately prepared is mounted in a region different from the region surrounded by the sealant 905 over the first substrate 901. In FIGS. 24B and 24C, various signals and potentials are supplied to the signal line driver circuit 903, the scan line driver circuit 904, and the pixel portion 902 from an FPC 918.

Although FIGS. 24B and 24C each illustrate an example in which the signal line driver circuit 903 is formed separately and mounted on the first substrate 901, one embodiment of the present invention is not limited to this structure. The scan line driver circuit may be separately formed and then mounted, or only part of the signal line driver circuit or part of the scan line driver circuit may be separately formed and then mounted.

Note that a connection method of a separately formed driver circuit is not particularly limited, and a chip on glass (COG) method, a wire bonding method, a tape automated bonding (TAB) method, or the like can be employed. FIG. 24A illustrates an example in which the signal line driver circuit 903 and the scan line driver circuit 904 are mounted by a COG method. FIG. 24B illustrates an example in which the signal line driver circuit 903 is mounted by a COG method. FIG. 24C illustrates an example in which the signal line driver circuit 903 is mounted by a TAB method.

The display device includes in its category a panel in which a display element is sealed and a module in which an IC including a controller or the like is mounted on the panel.

A display device in this specification refers to an image display device or a light source (including a lighting device). Further, the display device also includes the following modules in its category: a module to which a connector such as an FPC or a TCP is attached; a module having a TCP at the tip of which a printed wiring board is provided; and a module in which an integrated circuit (IC) is directly mounted on a display element by a COG method.

The pixel portion 902 and the scan line driver circuit 904 provided over the first substrate 901 include a plurality of transistors and any of the transistors which are described in the above embodiments can be applied.

As the display element provided in the display device, a liquid crystal element (also referred to as a liquid crystal display element) or a light-emitting element (also referred to as a light-emitting display element) can be used. A light-emitting element includes, in its scope, an element whose luminance is controlled by current or voltage, and specifically includes an organic electroluminescent (EL) element, an inorganic EL element, and the like. Further, a display medium whose contrast is changed by an electric effect, such as electronic ink, can be used. An example of a liquid crystal display device using a liquid crystal element as the display element is illustrated in FIGS. 25A and 25B.

FIGS. 25A and 25B are cross-sectional views each taken along dashed-dotted line X1-X2 in FIG. 24B. Note that in FIGS. 25A and 25B, only part of the structure of the pixel portion is illustrated.

The display devices illustrated in FIGS. 25A and 25B are liquid crystal display devices of a vertical electric field mode. The liquid crystal display device includes a connection terminal electrode 915 and a terminal electrode 916. The connection terminal electrode 915 and the terminal electrode 916 are electrically connected to a terminal included in the FPC 918 through an anisotropic conductive agent 919.

The connection terminal electrode 915 is formed using the same conductive film as a first electrode 930, and the terminal electrode 916 is formed using the same conductive film as a source electrode and a drain electrode of each of a transistor 910 and a transistor 911.

Each of the pixel portion 902 and the scan line driver circuit 904 which are provided over the first substrate 901 includes a plurality of transistors. FIGS. 25A and 25B illustrate the transistor 910 included in the pixel portion 902 and the transistor 911 included in the scan line driver circuit 904. An insulating film 924 corresponding to the insulating films 129, 131, and 132 described in Embodiment 1 is provided over oxide semiconductor films of the transistors 910 and 911. Note that an insulating film 923 is an insulating film functioning as a base film.

In this embodiment, any of the transistors described in the above embodiments can be used as the transistors 910 and 911. A storage capacitor 926 is formed using an oxide semiconductor film 927, the insulating film 924, and the first electrode 930. Note that the oxide semiconductor film 927 is electrically connected to a capacitor line 929 through an opening formed in a gate insulating film 922. The capacitor line 929 is formed using the same conductive film as scan lines including regions functioning as gate electrodes of the transistor 910 and the transistor 911. Although the storage capacitor described in Embodiment 1 is illustrated as the storage capacitor 926 here, any of the storage capacitors in the other embodiments may be used as appropriate.

Further, FIG. 25A illustrates a structure in which a conductive film 917 is provided in a region of the insulating film 924 in the transistor 911 included in the scan line driver circuit 904 so as to overlap with a channel formation region of the oxide semiconductor film. FIG. 25B illustrates a structure in which an insulating film 951 is provided over the insulating film 924 and the conductive film 917 is provided in the region of the insulating film 951 so as to overlap with the channel formation region of the oxide semiconductor film.

The conductive film 917 can supply a potential and can serve as the gate electrode of the transistor 911. This means that the transistor 911 is a dual-gate transistor. Note that the conductive film 917 can be formed using the same conductive film as the first electrode 930. In addition, the width of the conductive film 917 in the channel length direction can be shorter than the width between the source electrode and the drain electrode of the transistor 911.

Owing to the conductive film 917, a change in gate voltage (rising gate voltage) at which on-state current starts flowing at different drain voltages can be reduced in the transistor 911 included in the scan line driver circuit 904. Further, with the conductive film 917, current which flows in a region of the oxide semiconductor film on the conductive film 917 side and between the source electrode and the drain electrode of the transistor 911 can be controlled. Accordingly, changes in electrical characteristics between a plurality of transistors included in the scan line driver circuit 904 can be reduced. In addition, when the potential of the conductive film 917 is set to the same or substantially the same potential as the minimum potential of the scan line driver circuit 904 of the transistor 911, a change in threshold voltage of the transistor 911 can be reduced; thus, the reliability of the transistor 911 can be improved. Note that the minimum potential of the scan line driver circuit 904 is the minimum potential among potentials supplied for operating the scan line driver circuit 904. In the case where the potential of the source electrode of the transistor 911 is used as a reference of the potential supplied for operating the scan line driver circuit 104, for example, the potential of the source electrode (Vss) is the minimum potential.

When the thickness of the insulating film 924 in the transistor 911 included in the scan line driver circuit 904 is small, an electric field generated from the conductive film 917 adversely affects the oxide semiconductor film and accordingly electrical characteristics of the transistor 911 are changed in some cases. Thus, owing to the insulating film 951 provided as in the structure in FIG. 25B, the adverse effect of the electric field can be controlled and accordingly the transistor 911 can have favorable electrical characteristics.

The insulating film 951 can be formed using the material which can be used for the insulating film 924. As the insulating film 951, an organic insulating film can be used. For the organic insulating film, a photosensitive organic resin or a non-photosensitive organic resin can be given; for example, an acrylic resin, a benzocyclobutene-based resin, an epoxy resin, a siloxane-based resin, or the like can be used. Alternatively, polyamide can be used for the organic insulating film. Note that a formation method of the organic insulating film is not particularly limited and can be selected as appropriate in accordance with a material which is used. For example, spin coating, dipping, spray coating, a droplet discharge method (an ink-jet method), screen printing, offset printing, or the like can be employed.

In addition, the conductive film 917 also has a function of blocking an external electric field. In other words, the conductive film 917 has a function of preventing an external electric field (particularly, a function of preventing static electricity) from affecting the inside (a circuit portion including the transistor). The function of preventing static electricity of the conductive film 917 can suppress changes in electrical characteristics of the transistor 911 due to the influence of an external electric field such as static electricity; thus, the reliability of the transistor 911 can be improved.

Although the transistor included in the scan line driver circuit is illustrated in FIGS. 25A and 25B, a transistor included in a signal line driver circuit can also be a dual-gate transistor similarly to the transistor 911. In the case where a dual-gate transistor is used as the transistor included in the signal line driver circuit, the transistor has an effect similar to that of the transistor 911.

Accordingly, the semiconductor device of one embodiment of the present invention has high reliability.

Figure 26A:
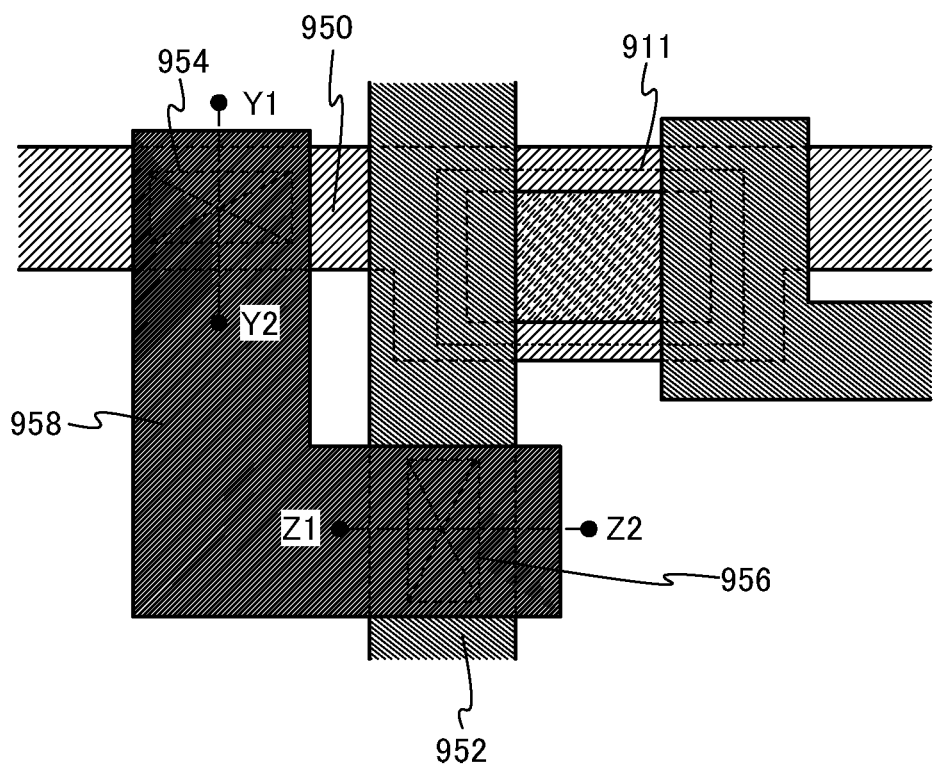
FIGS. 26A and 26B are a top view and a cross-sectional view each illustrating part of a scan line driver circuit of a semiconductor device.

Here, a structure of a transistor included in the semiconductor device of one embodiment of the present invention, for example, a plurality of transistors included in the scan line driver circuit 904, in which a wiring including a gate electrode and a wiring including a source electrode or a drain electrode are electrically connected to each other through a conductive film is described. FIG. 26A illustrates a top view of the structure, and FIG. 26B illustrates a cross-sectional view taken along dashed-dotted line Y1-Y2 and dashed-dotted line Z1-Z2 in FIG. 26A.

As illustrated in FIG. 26A, a wiring 950 including the gate electrode of the transistor 911 and a wiring 952 including the source electrode or the drain electrode of the transistor 911 are in contact with a conductive film 958 provided in and over an opening 954 and an opening 956.

Figure 26B:
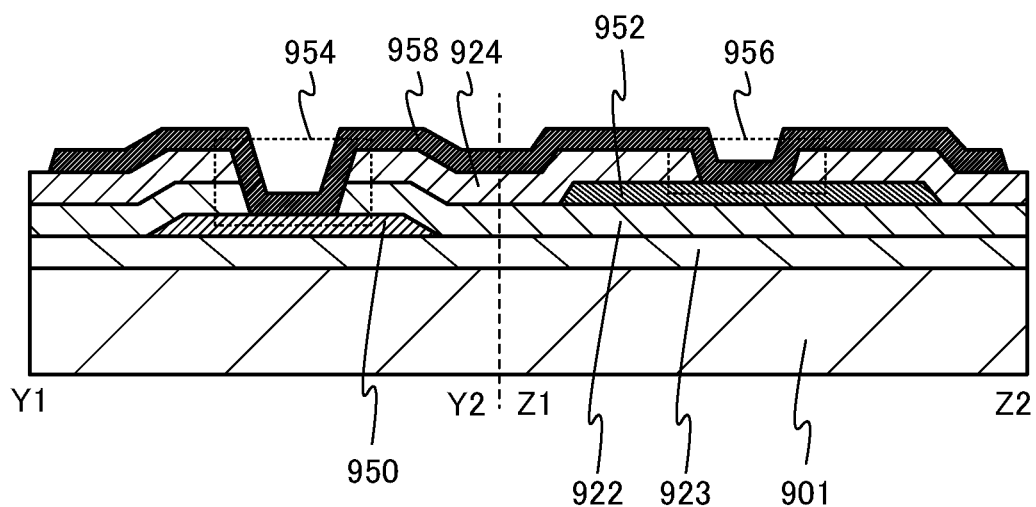

As illustrated in the cross-sectional structure in FIG. 26B, the insulating film 923 is provided over the first substrate 901, the gate insulating film 922 is provided over the wiring 950 and the insulating film 923, the wiring 952 is provided over the gate insulating film 922, and the insulating film 924 is provided over the gate insulating film 922 and the wiring 952. Further, in a region along dashed-dotted line Y1-Y2, the opening 954 reaching the wiring 950 is provided in the gate insulating film 922 and the insulating film 924, and in a region along dashed-dotted line Z1-Z2, the opening 956 reaching the wiring 952 is provided in the insulating film 924. Furthermore, the conductive film 958 is provided over the insulating film 924 and in and over the opening 954 and the opening 956.

According to the above, the wiring 950 including the gate electrode and the wiring 952 including the source electrode or the drain electrode are electrically connected to each other through the conductive film 958.

The conductive film 958 can be formed by utilizing the formation process of the conductive film 917 of the transistor 911.

The opening 954 and the opening 956 can be formed at the same time. The details are as follows. An insulating film which is to be processed into the gate insulating film 922 is formed over the wiring 950, the wiring 952 is formed over the insulating film, and an insulating film which is to be processed into the insulating film 924 is formed over the wiring 952. After that, a mask is formed over the insulating film 924, and the insulating films are processed using the mask to form the opening 954 and the opening 956. A resist mask can be used as the mask. The insulating films can be processed by dry etching. When the wiring 950 is formed using a metal material or the like, the etching selectivity ratio of the gate insulating film 922 with respect to the wiring 950 can be made high, and the opening 954 and the opening 956 can be formed at the same time by the dry etching.

The transistor 910 included in the pixel portion 902 is electrically connected to a display element.

A liquid crystal element 913 which is a display element includes the first electrode 930, a second electrode 931, and a liquid crystal 908. Note that an insulating film 932 and an insulating film 933 which serve as alignment films are provided so that the liquid crystal 908 is provided therebetween. The second electrode 931 is provided on the second substrate 906 side. The second electrode 931 overlaps with the first electrode 930 with the liquid crystal 908 provided therebetween. For the liquid crystal element 913, the description of the liquid crystal element 108 in Embodiment 1 can be referred to. The first electrode 930 corresponds to the pixel electrode 121 in Embodiment 1, the second electrode 931 corresponds to the counter electrode 154 in Embodiment 1, the liquid crystal 908 corresponds to the liquid crystal 160 in Embodiment 1, the insulating film 932 corresponds to the alignment film 158 in Embodiment 1, and the insulating film 933 corresponds to the alignment film 156 in Embodiment 1.

The first electrode 930 and the second electrode 931 (each of which are also referred to as a pixel electrode, a common electrode, a counter electrode, or the like) for applying voltage to the display element can have light-transmitting properties or light-reflecting properties, which depends on the direction in which light is extracted, the position where the electrodes are provided, and the pattern structure of the electrodes.

The first electrode 930 and the second electrode 931 can be formed using, as appropriate, a material similar to those of the pixel electrode 121 and the counter electrode 154 of Embodiment 1.

A spacer 935 is a columnar spacer obtained by selective etching of an insulating film and is provided in order to control a distance between the first electrode 930 and the second electrode 931 (a cell gap). Alternatively, a spherical spacer may be used.

The first substrate 901 and the second substrate 906 are fixed in place by a sealant 925. As the sealant 925, an organic resin such as a thermosetting resin or a photocurable resin can be used. In addition, the sealant 925 is in contact with the insulating film 924.

In the semiconductor device (display device) of one embodiment of the present invention, a light-blocking film (black matrix); an optical member (an optical substrate) such as a polarizing member, a retardation member, or an anti-reflection member; and the like are provided as appropriate. For example, circular polarization may be employed by using a polarizing substrate and a retardation substrate. In addition, a backlight, a sidelight, or the like may be used as a light source.

Since the transistor is easily broken because of static electricity or the like, a protective circuit for protecting the driver circuit is preferably provided. The protection circuit is preferably formed using a nonlinear element.

Figure 27A:
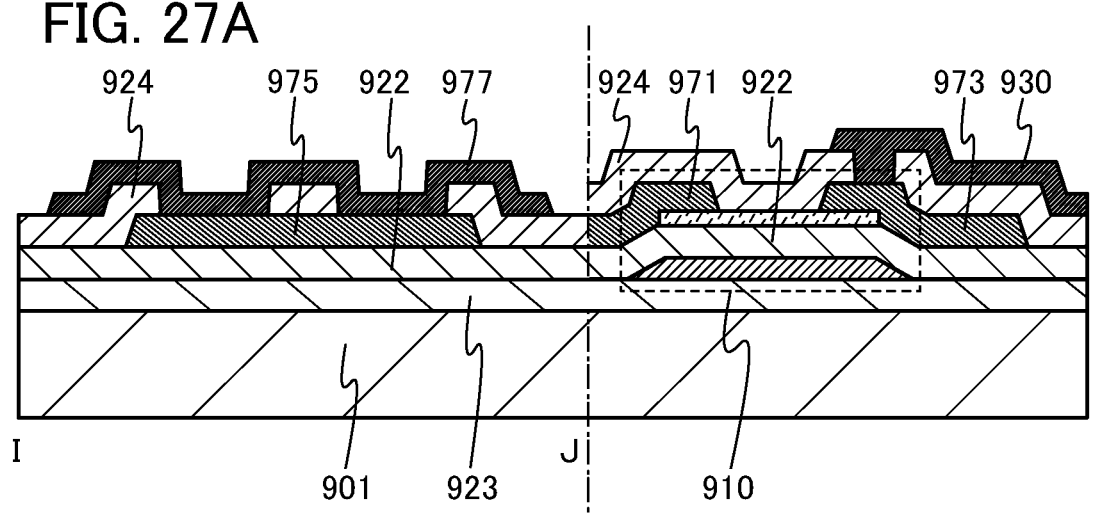
FIGS. 27A to 27C are a top view and cross-sectional views each illustrating a common connection portion of a semiconductor device.
Figure 27B:
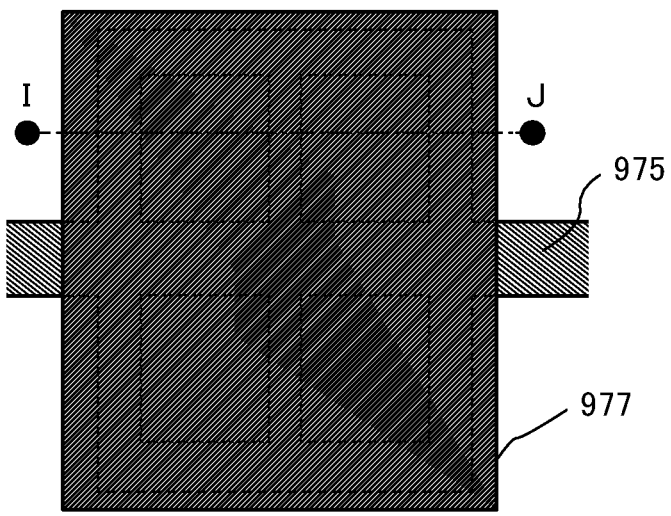
Figure 27C:
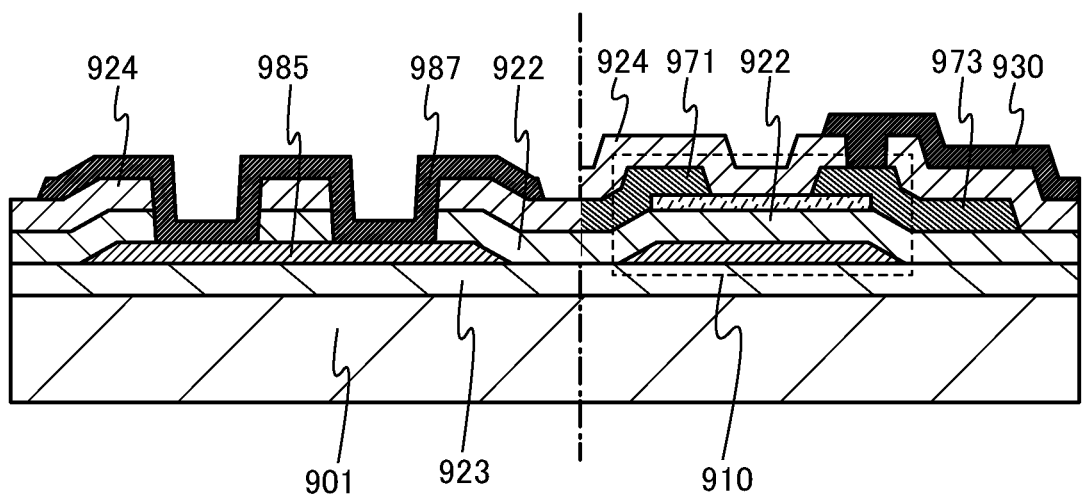

FIGS. 27A to 27C illustrate an example of the display device in FIGS. 24A to 24C and FIGS. 25A and 25B in which a common connection portion (pad portion) for being electrically connected to the second electrode 931 provided on the second substrate 906 is formed over the first substrate 901.

The common connection portion is provided in a position overlapping with the sealant for bonding the first substrate 901 and the second substrate 906, and is electrically connected to the second electrode 931 through conductive particles contained in the sealant. Alternatively, the common connection portion is provided in a position not overlapping with the sealant (except for the pixel portion) and a paste including conductive particles is provided separately from the sealant so as to overlap with the common connection portion, whereby the common connection portion is electrically connected to the second electrode 931.

FIG. 27A is a cross-sectional view of the common connection portion and a transistor in the pixel portion, and corresponds to a cross-sectional view taken along line I-J in the top view in FIG. 27B and the transistor 910 in FIGS. 25A and 25B.

A common potential line 975 is provided over the gate insulating film 922 and is formed using the same material and through the same steps as a source electrode 971 or a drain electrode 973 of the transistor 910 illustrated in FIGS. 27A to 27C.

Further, the common potential line 975 is covered with the insulating film 924, and the insulating film 924 has a plurality of openings at a position overlapping with the common potential line 975. These openings are formed through the same steps as a contact hole which connects the first electrode 930 and one of the source electrode 971 and the drain electrode 973 of the transistor 910.

Further, the common potential line 975 is connected to a common electrode 977 through the openings. The common electrode 977 is provided over the insulating film 924 and is formed using the same material and through the same steps as the connection terminal electrode 915 and the first electrode 930 in the pixel portion.

In this manner, the common connection portion can be formed through the same manufacturing process as the switching element in the pixel portion 902.

The common electrode 977 is an electrode in contact with the conductive particles contained in the sealant, and is electrically connected to the second electrode 931 of the second substrate 906.

Alternatively, as illustrated in FIG. 27C, a common potential line 985 may be formed using the same material and through the same steps as the gate electrode of the transistor 910.

In the common connection portion illustrated in FIG. 27C, the common potential line 985 is provided under the gate insulating film 922 and the insulating film 924; and the gate insulating film 922 and the insulating film 924 have a plurality of openings at a position overlapping with the common potential line 985. These openings are formed by etching the insulating film 924 through the same steps as a contact hole which connects the first electrode 930 and one of the source electrode 971 and the drain electrode 973 of the transistor 910, and then by further selectively etching the gate insulating film 922.

Further, the common potential line 985 is connected to a common electrode 987 through the openings. The common electrode 987 is provided over the insulating film 924 and is formed using the same material and through the same steps as the connection terminal electrode 915 and the first electrode 930 in the pixel portion.

Accordingly, a semiconductor film is formed as one electrode of a storage capacitor in the same process as a semiconductor film of a transistor, whereby a semiconductor device in which the aperture ratio and the charge capacity of the storage capacitor are increased can be manufactured. For example, when the pixel density of the semiconductor device in this embodiment is about 300 ppi, the aperture ratio of the pixel can be 50% or higher, 55% or higher, or even 60% or higher. Further, the semiconductor device can have an excellent display quality by improving the aperture ratio.

Further, oxygen vacancies and impurities such as hydrogen and nitrogen in the semiconductor film (specifically, the oxide semiconductor film) of the transistor are reduced, so that the semiconductor device of one embodiment of the present invention has favorable electrical characteristics.

Note that the structure and the like described in this embodiment can be used as appropriate in combination with any of the structures and the like in the other embodiments.

Embodiment 5

The semiconductor device of one embodiment of the present invention can be applied to any of a variety of electronic devices (including game machines). Examples of electronic devices include television sets (also referred to as televisions or television receivers), monitors of computers, cameras such as digital cameras or digital video cameras, digital photo frames, mobile phones, portable game consoles, portable information terminals, audio reproducing devices, game machines (e.g., pachinko machines or slot machines), housings of game machines, and the like. Examples of such electronic devices are illustrated in FIGS. 28A to 28C.

Figure 28A:
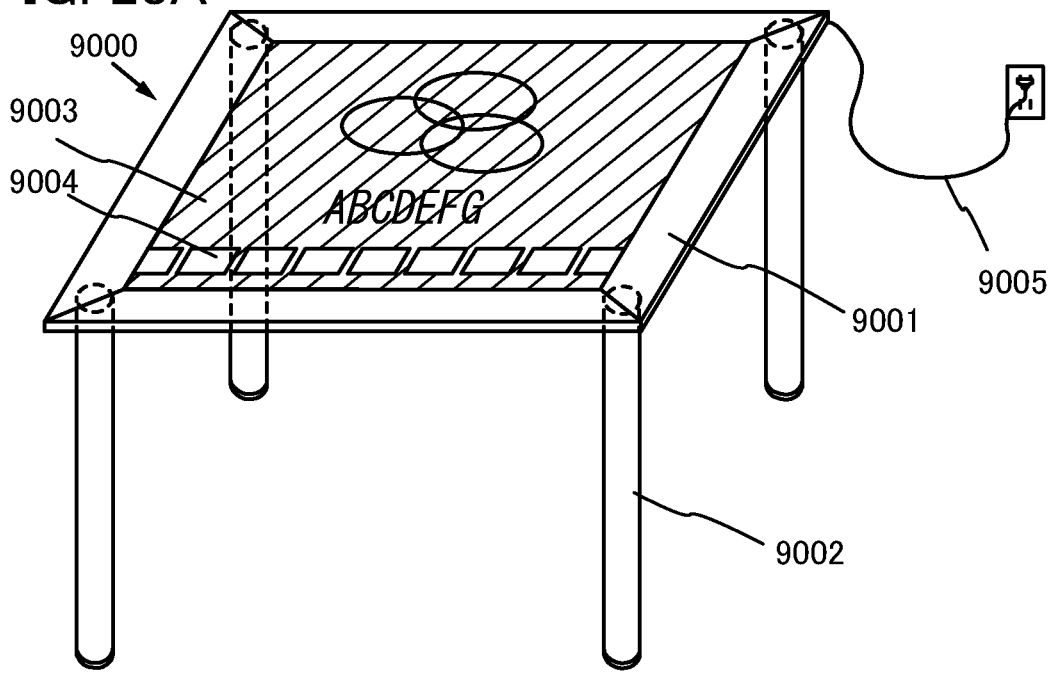
FIGS. 28A to 28C each illustrate an electronic device using a semiconductor device.
Figure 28B:
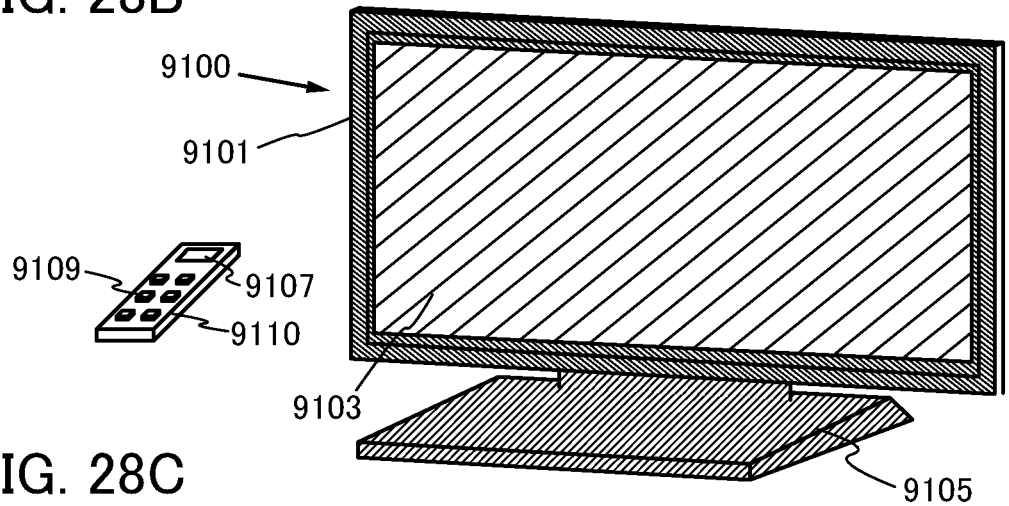
Figure 28C:
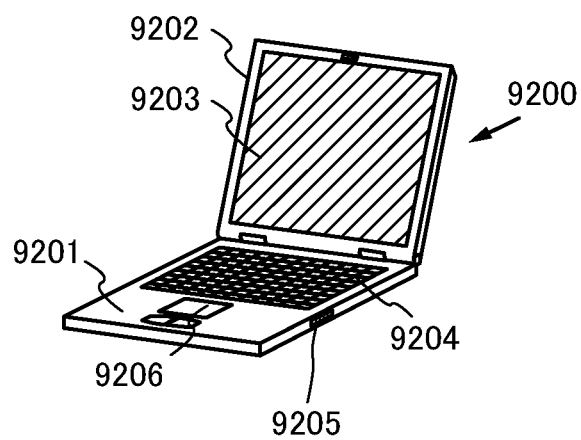

FIG. 28A illustrates a table 9000 having a display portion. In the table 9000, a display portion 9003 is incorporated in a housing 9001 and an image can be displayed on the display portion 9003. Note that the housing 9001 is supported by four leg portions 9002. Further, a power cord 9005 for supplying power is provided for the housing 9001.

The semiconductor device described in any of the above embodiments can be used for the display portion 9003. Thus, the display quality of the display portion 9003 can be improved.

The display portion 9003 has a touch-input function. When a user touches displayed buttons 9004 which are displayed on the display portion 9003 of the table 9000 with his/her finger or the like, the user can carry out operation of the screen and input of information. Further, when the table 9000 may be made to communicate with home appliances or control the home appliances, the table 9000 may serve as a control device which controls the home appliances by operation on the screen. For example, with the use of a semiconductor device having an image sensor function, the display portion 9003 can have a touch-input function.

Further, the screen of the display portion 9003 can be placed perpendicular to a floor with a hinge provided for the housing 9001; thus, the table 9000 can also be used as a television device. When a television device having a large screen is set in a small room, an open space is reduced; however, when a display portion is incorporated in a table, a space in the room can be efficiently used.

FIG. 28B illustrates a television set 9100. In the television set 9100, a display portion 9103 is incorporated in a housing 9101 and an image can be displayed on the display portion 9103. Note that here, the housing 9101 is supported by a stand 9105.

The television set 9100 can be operated with an operation switch of the housing 9101 or a separate remote controller 9110. Channels and volume can be controlled with an operation key 9109 of the remote controller 9110 so that an image displayed on the display portion 9103 can be controlled. Further, the remote controller 9110 may be provided with a display portion 9107 for displaying data output from the remote controller 9110.

The television set 9100 illustrated in FIG. 28B is provided with a receiver, a modem, and the like. With the use of the receiver, the television set 9100 can receive general TV broadcasts. Moreover, when the television set 9100 is connected to a communication network with or without wires via the modem, one-way (from a sender to a receiver) or two-way (between a sender and a receiver or between receivers) information communication can be performed.

The semiconductor device described in any of the above embodiments can be used for the display portions 9103 and 9107. Thus, the display quality of the television set can be improved.

FIG. 28C illustrates a computer 9200. The computer 9200 includes a main body 9201, a housing 9202, a display portion 9203, a keyboard 9204, an external connection port 9205, a pointing device 9206, and the like.

The semiconductor device described in any of the above embodiments can be used for the display portion 9203. Thus, the display quality of the computer can be improved.

Figure 29A:
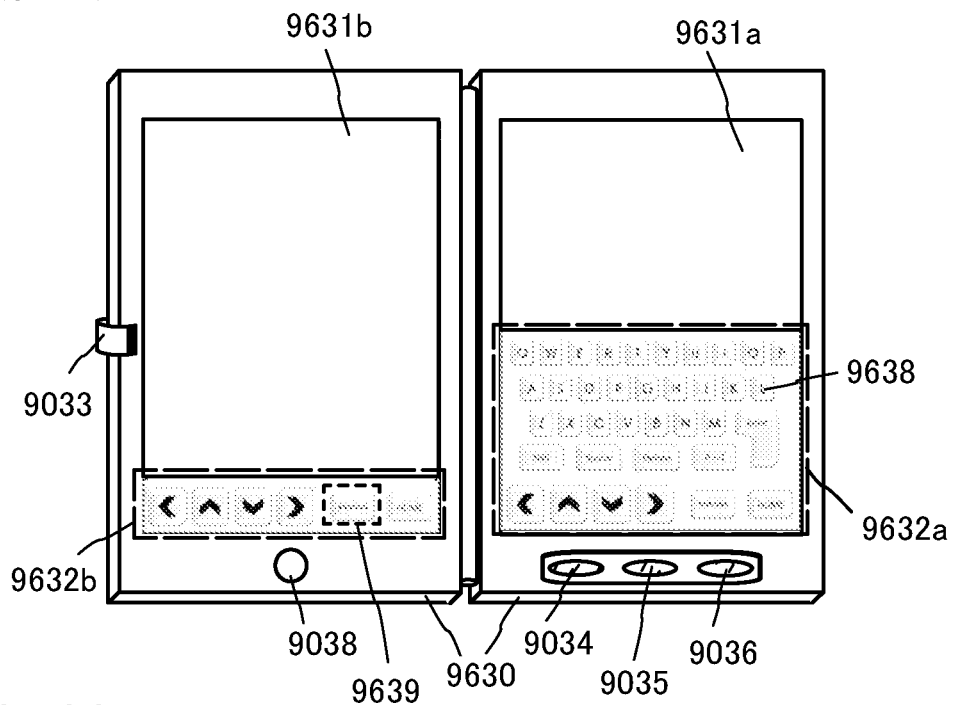
FIGS. 29A to 29C illustrate an electronic device using a semiconductor device.
Figure 29B:
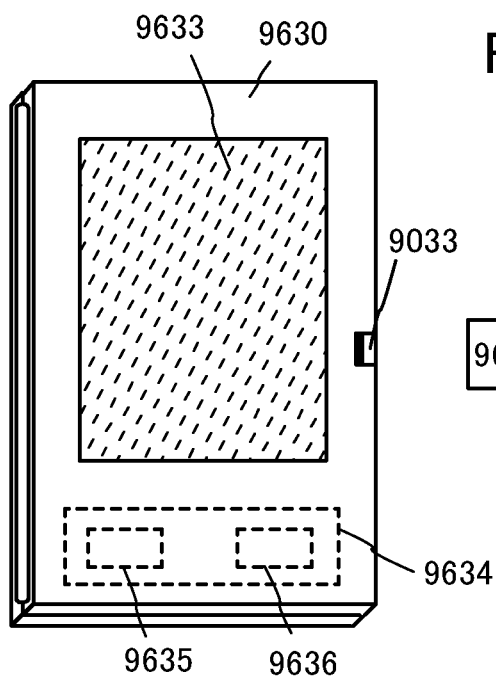

FIGS. 29A and 29B illustrate a foldable tablet terminal. In FIG. 29A, the tablet terminal is opened, and includes a housing 9630, a display portion 9631a, a display portion 9631b, a display-mode switching button 9034, a power button 9035, a power-saving-mode switching button 9036, a clip 9033, and an operation button 9038.

The semiconductor device described in any of the above embodiments can be used for the display portion 9631a and the display portion 9631b. Thus, the display quality of the tablet terminal can be improved.

Part of the display portion 9631a can be a touch panel region 9632a, and data can be input by touching operation keys 9638 that are displayed. Note that FIG. 29A shows, as an example, that half of the area of the display portion 9631a has only a display function, and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

In the display portion 9631b, as in the display portion 9631a, part of the display portion 9631b can be a touch panel region 9632b. When a finger, a stylus, or the like touches the place where a button 9639 for switching to keyboard display is displayed in the touch panel, keyboard buttons can be displayed on the display portion 9631b.

Touch input can be performed concurrently on the touch panel regions 9632a and 9632b.

The display-mode switching button 9034 allows switching between a portrait mode and a landscape mode, and between monochrome display and color display, for example. With the power-saving-mode switching button 9036 for switching to power-saving mode, the luminance of display can be optimized in accordance with the amount of external light at the time when the tablet terminal is in use, which is detected with an optical sensor incorporated in the tablet terminal. The tablet terminal may include another detection device such as a sensor for detecting orientation (e.g., a gyroscope or an acceleration sensor) in addition to the optical sensor.

Although the display portion 9631a and the display portion 9631b have the same display area in FIG. 29A, one embodiment of the present invention is not limited to this example. The display portion 9631a and the display portion 9631b may have different areas or different display quality. For example, one of them may be a display panel that can display higher-definition images than the other.

FIG. 29B illustrates the tablet terminal folded, which includes the housing 9630, a solar battery 9633, and a charge and discharge control circuit 9634. Note that FIG. 29B illustrates an example in which the charge and discharge control circuit 9634 includes a battery 9635 and a DCDC converter 9636.

Since the tablet terminal can be foldable, the housing 9630 can be closed when the tablet terminal is not in use. Thus, the display portions 9631a and 9631b can be protected, whereby a tablet terminal with high endurance and high reliability for long-term use can be provided.

The tablet terminal illustrated in FIGS. 29A and 29B can also have a function of displaying various kinds of data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar battery 9633, which is attached to the surface of the tablet terminal, supplies electric power to a touch panel, a display portion, an image signal processor, and the like. Note that the solar battery 9633 can be provided on one or both surfaces of the housing 9630, so that the battery 9635 can be charged efficiently. When a lithium ion battery is used as the battery 9635, there is an advantage of downsizing or the like.

Figure 29C:
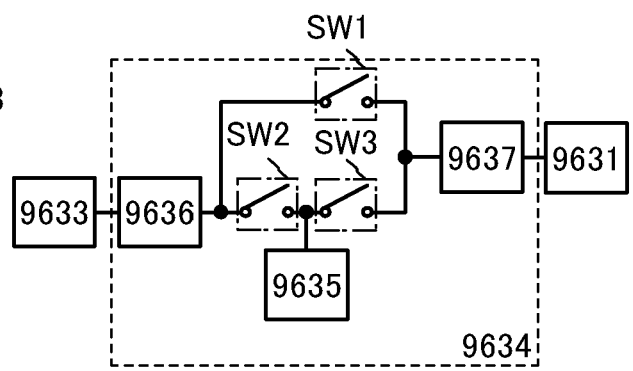

The structure and operation of the charge and discharge control circuit 9634 illustrated in FIG. 29B are described with reference to a block diagram of FIG. 29C. The solar battery 9633, the battery 9635, the DCDC converter 9636, a converter 9637, switches SW1, SW2, and SW3, and the display portion 9631 are illustrated in FIG. 29C, and the battery 9635, the DCDC converter 9636, the converter 9637, and the switches SW1 to SW3 correspond to the charge and discharge control circuit 9634 illustrated in FIG. 29B.

First, an example of operation in the case where power is generated by the solar battery 9633 using external light is described. The voltage of power generated by the solar battery 9633 is raised or lowered by the DCDC converter 9636 so that a voltage for charging the battery 9635 is obtained. When the display portion 9631 is operated with the power from the solar battery 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that charge of the battery 9635 may be performed.

Here, the solar battery 9633 is illustrated as an example of a power generation means; however, there is no particular limitation on a way of charging the battery 9635, and the battery 9635 may be charged with another power generation means such as a piezoelectric element or a thermoelectric conversion element (Peltier element). For example, the battery 9635 may be charged with a non-contact power transmission module which is capable of charging by transmitting and receiving power by wireless (without contact), or another charging means may be used in combination.

Note that the structure and the like described in this embodiment can be used as appropriate in combination with any of the structures and the like in the other embodiments.

This application is based on Japanese Patent Application serial No. 2013-046111 filed with the Japan Patent Office on Mar. 8, 2013, the entire contents of which are hereby incorporated by reference.

What is claimed is:

1. A method for driving a semiconductor device,
the semiconductor device comprising a pixel portion provided with a plurality of pixels each including a transistor and a storage capacitor,
the storage capacitor comprising:
a first electrode including a light-transmitting semiconductor film;
a second electrode; and
a dielectric film between the first electrode and the second electrode,
wherein in a period during which an image is displayed in the pixel portion, the method comprises steps of:
supplying a first potential to the second electrode;
supplying a second potential to the first electrode to form a potential difference between the first electrode and the second electrode being a threshold voltage of the storage capacitor or higher; and
holding the potential difference between the first electrode and the second electrode to the storage capacitor and displaying the image in the pixel portion, and
wherein in a period during which display of the image is stopped, the method comprises a step of supplying a third potential higher than the first potential to the first electrode.

2. The method for driving the semiconductor device according to claim 1,
wherein the third potential is higher than the first potential by the threshold voltage of the storage capacitor.

3. The method for driving the semiconductor device according to claim 1,
wherein the pixel portion comprises a display element including the second electrode and a conductive film which is provided to face the second electrode, and
wherein the same potential is supplied to the second electrode and the conductive film when supplying the third potential to the first electrode.

4. The method for driving the semiconductor device according to claim 1,
wherein a fourth potential higher than the first potential by the threshold voltage of the storage capacitor or higher is supplied the first electrode before power supply of the semiconductor device is stopped.

5. The method for driving the semiconductor device according to claim 1,
wherein the first electrode includes an oxide semiconductor.

6. The method for driving the semiconductor device according to claim 1,
wherein conductivity of the first electrode is higher than or equal to 10 S/cm and lower than or equal to 1000 S/cm.

7. The method for driving the semiconductor device according to claim 1,
wherein the transistor includes a light-transmitting semiconductor film, and the light-transmitting semiconductor film of the transistor is formed on the same surface as the first electrode.

8. The method for driving the semiconductor device according to claim 7,
wherein the light-transmitting semiconductor film included in the transistor contains an oxide semiconductor.

9. A method for driving a semiconductor device,
the semiconductor device comprising a pixel portion provided with a plurality of pixels each including a transistor, a storage capacitor, and a liquid crystal element electrically connected to the transistor and the storage capacitor, and
a light source emitting light to the pixel portion through the liquid crystal element,
the storage capacitor comprising:
a first electrode including a light-transmitting semiconductor film;
a second electrode; and
a dielectric film between the first electrode and the second electrode,
wherein in a period during which an image is displayed in the pixel portion, comprising the steps of:
turning on the light source;
supplying a first potential to the second electrode;
supplying a second potential to the first electrode to form a potential difference between the first electrode and the second electrode being a threshold voltage of the storage capacitor or higher; and holding the potential difference between the first electrode and the second electrode to the storage capacitor and displaying the image in the pixel portion through the liquid crystal element, and wherein in a period during which display of the image is stopped, comprising the step of supplying a third potential higher than the first potential to the first electrode.

10. The method for driving the semiconductor device according to claim 9, wherein the third potential is higher than the first potential by the threshold voltage of the storage capacitor.

11. The method for driving the semiconductor device according to claim 9, wherein the liquid crystal element includes the second electrode and a conductive film which is provided to face the second electrode, and wherein the same potential is supplied to the second electrode and the conductive film when supplying the third potential to the first electrode.

12. The method for driving the semiconductor device according to claim 9, wherein a fourth potential higher than the first potential by the threshold voltage of the storage capacitor or higher is supplied the first electrode before power supply of the semiconductor device is stopped.

13. The method for driving the semiconductor device according to claim 9, wherein the first electrode includes an oxide semiconductor.

14. The method for driving the semiconductor device according to claim 9, wherein conductivity of the first electrode is higher than or equal to 10 S/cm and lower than or equal to 1000 S/cm.

15. The method for driving the semiconductor device according to claim 9, wherein the transistor includes a light-transmitting semiconductor film, and the light-transmitting semiconductor film of the transistor is formed on the same surface as the first electrode.

16. The method for driving the semiconductor device according to claim 15, wherein the light-transmitting semiconductor film included in the transistor contains an oxide semiconductor.

17. A method for driving a semiconductor device, the semiconductor device comprising a pixel portion provided with a plurality of pixels each including a transistor and a storage capacitor, the storage capacitor comprising:

a first electrode;

a second electrode; and a dielectric film between the first electrode and the second electrode, wherein in a period during which an image is displayed in the pixel portion, the method comprises steps of:

supplying a first potential to the second electrode;

supplying a second potential to the first electrode to form a potential difference between the first electrode and the second electrode being a threshold voltage of the storage capacitor or higher; and holding the potential difference between the first electrode and the second electrode to the storage capacitor and displaying the image in the pixel portion, and wherein in a period during which display of the image is stopped, the method comprises a step of supplying a third potential to the first electrode.

18. The method for driving the semiconductor device according to claim 17, wherein the third potential is higher than the first potential by the threshold voltage of the storage capacitor.

19. The method for driving the semiconductor device according to claim 17, wherein the pixel portion comprises a display element including the second electrode and a conductive film which is provided to face the second electrode, and wherein the same potential is supplied to the second electrode and the conductive film when supplying the third potential to the first electrode.

20. The method for driving the semiconductor device according to claim 17, wherein a fourth potential higher than the first potential by the threshold voltage of the storage capacitor or higher is supplied the first electrode before power supply of the semiconductor device is stopped.

* * * * *